United States Patent [19]

Liptay

[11] 4,189,772
[45] Feb. 19, 1980

[54] OPERAND ALIGNMENT CONTROLS FOR VFL INSTRUCTIONS

[75] Inventor: John S. Liptay, Rhinebeck, N.Y.

[73] Assignee: International Business Machines Corporation, Armonk, N.Y.

[21] Appl. No.: 887,095

[22] Filed: Mar. 16, 1978

[51] Int. Cl.² .............................................. G06F 1/00
[52] U.S. Cl. ................................................... 364/200
[58] Field of Search ........................ 364/200 MS File

[56] References Cited

U.S. PATENT DOCUMENTS

| 3,496,550 | 2/1970 | Schachner | 364/200 |
| 3,588,829 | 6/1971 | Boland et al. | 364/200 |
| 3,599,938 | 3/1971 | Eden et al. | 364/200 |
| 3,806,888 | 4/1974 | Brickman et al. | 364/200 |
| 3,896,419 | 6/1975 | Lange et al. | 364/200 |

*Primary Examiner*—Harvey E. Springborn
*Attorney, Agent, or Firm*—Bernard M. Goldman

[57] ABSTRACT

Operand controls are provided in an I-unit which includes a plurality of address operand pairs (AOP's). Each AOP has an operand request register and an operand buffer. The AOP's are used to fetch the subline (e.g. doubleword) of operands in variable length field (VLF) instructions (such as LM, MVC, CLC, XC, etc.). Each AOP is capable of requesting and receiving a single subline fetched by a storage control. Each AOP buffers its received subline until needed for executing the instruction. The bytes of VLF operands are not aligned on subline boundaries. The AOP's are dynamically selected to fetch the sublines of current operand(s). The AOP's selected for a single operand are sequenced by a chain of back pointers held in latches, which respectively represent the AOP's. Each latch receives the identifier (ID) of the previous AOP in the chain for the operand. An associative search through the previous ID's in all latches obtains the forward order of AOP ID's. The AOP's are selected, started, and released dynamically so that the same AOP may be used more than once for different sublines of a single operand. Two AOP's receive the same first fetch request for an operand when required for operand alignment.

22 Claims, 53 Drawing Figures

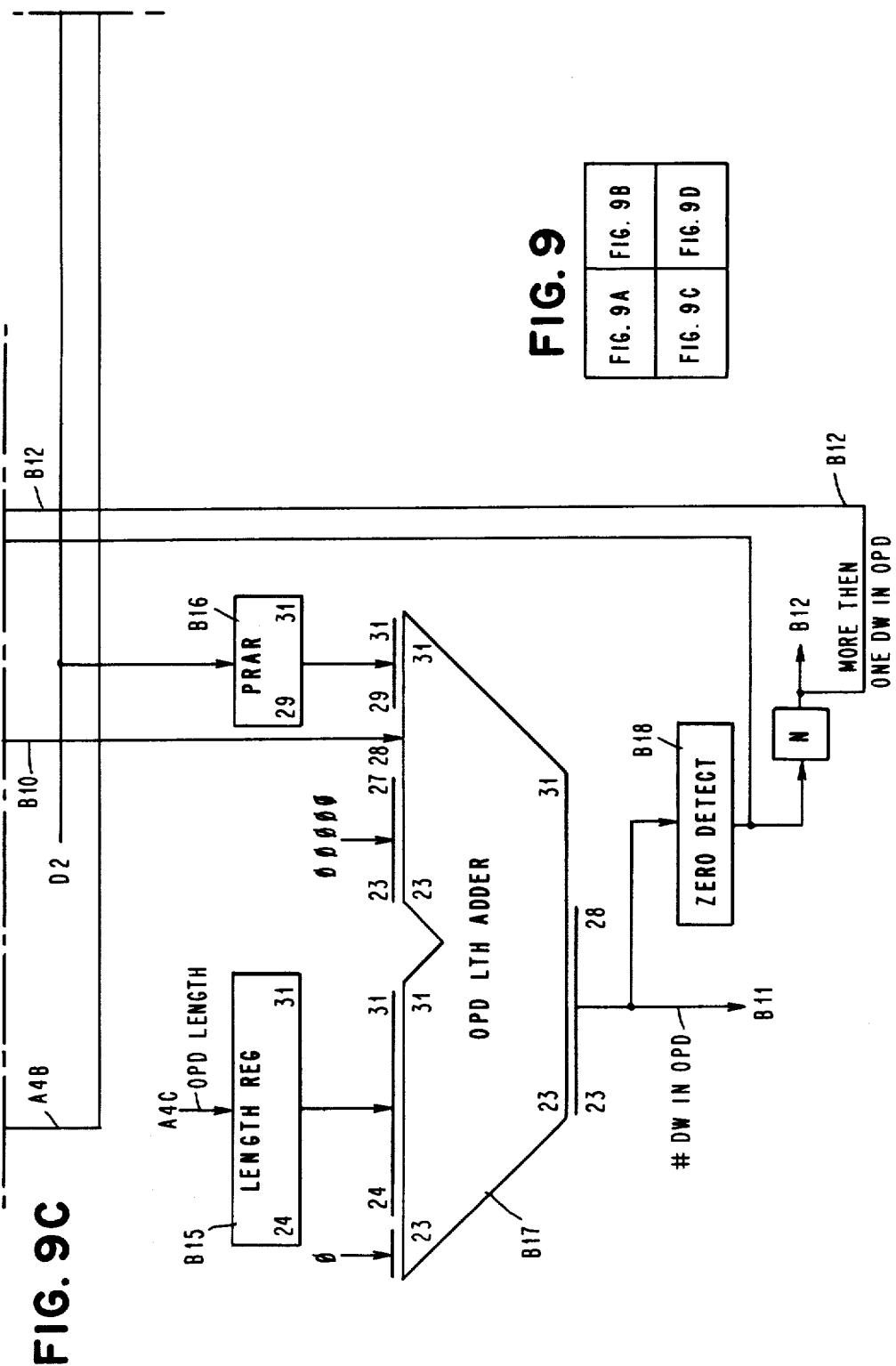

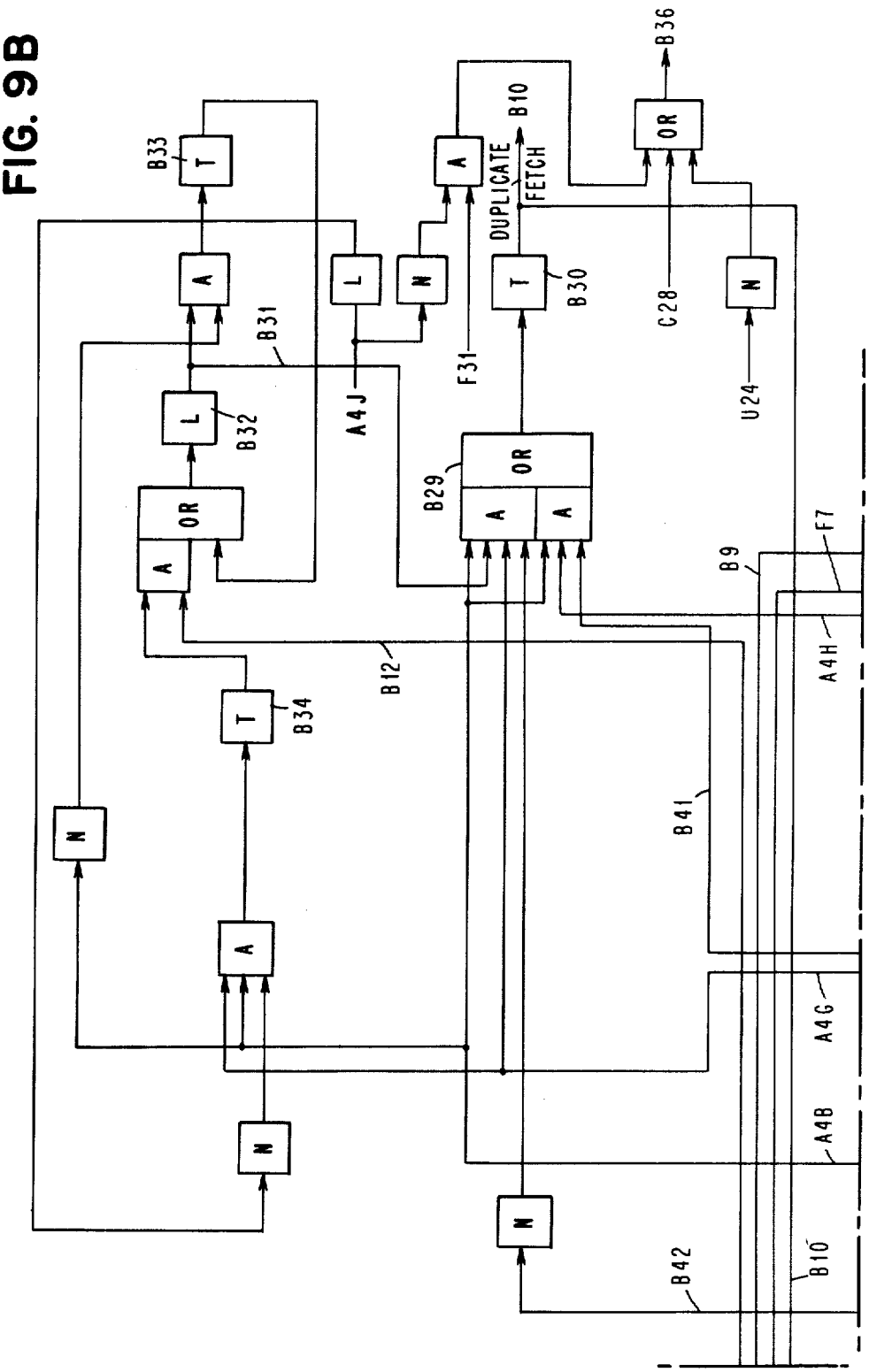

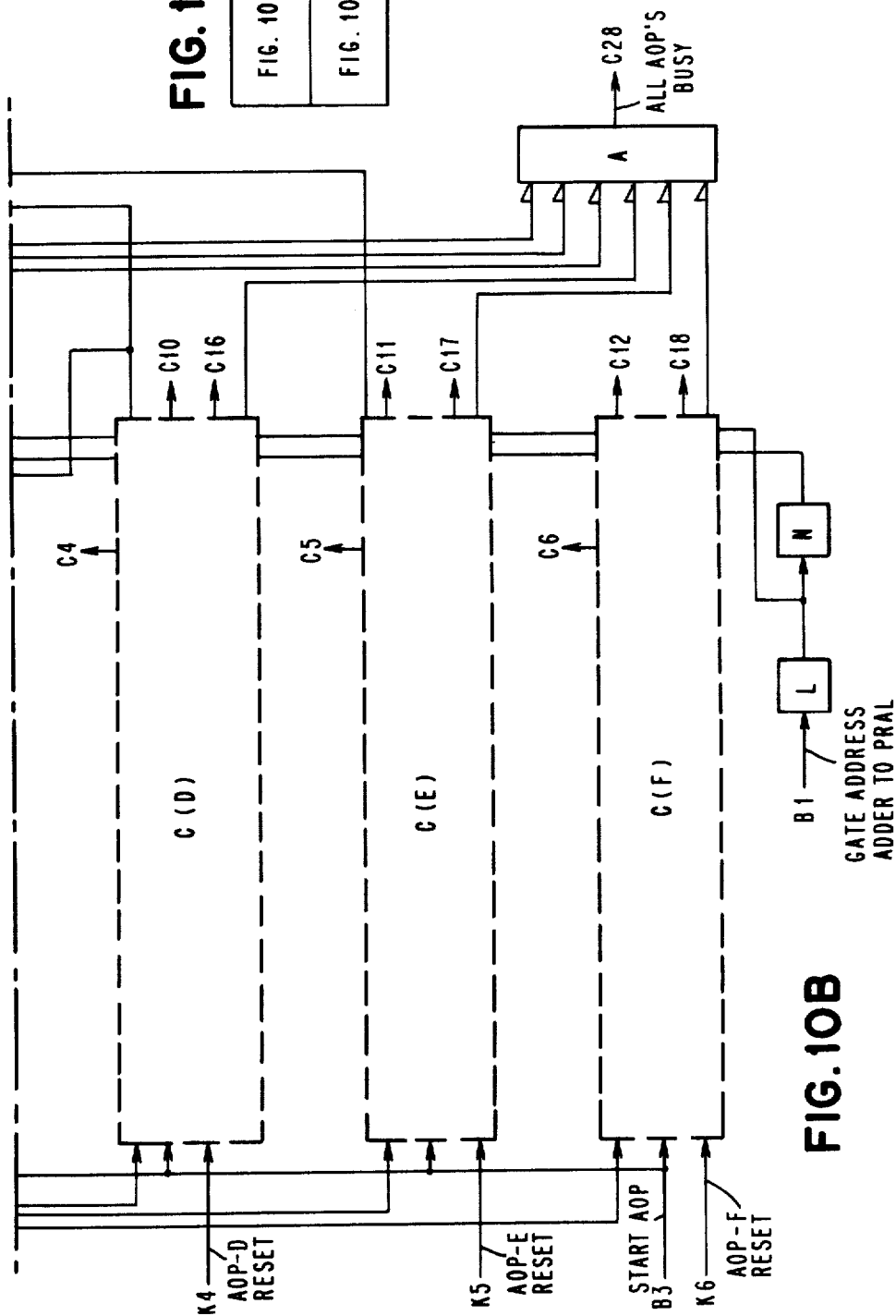

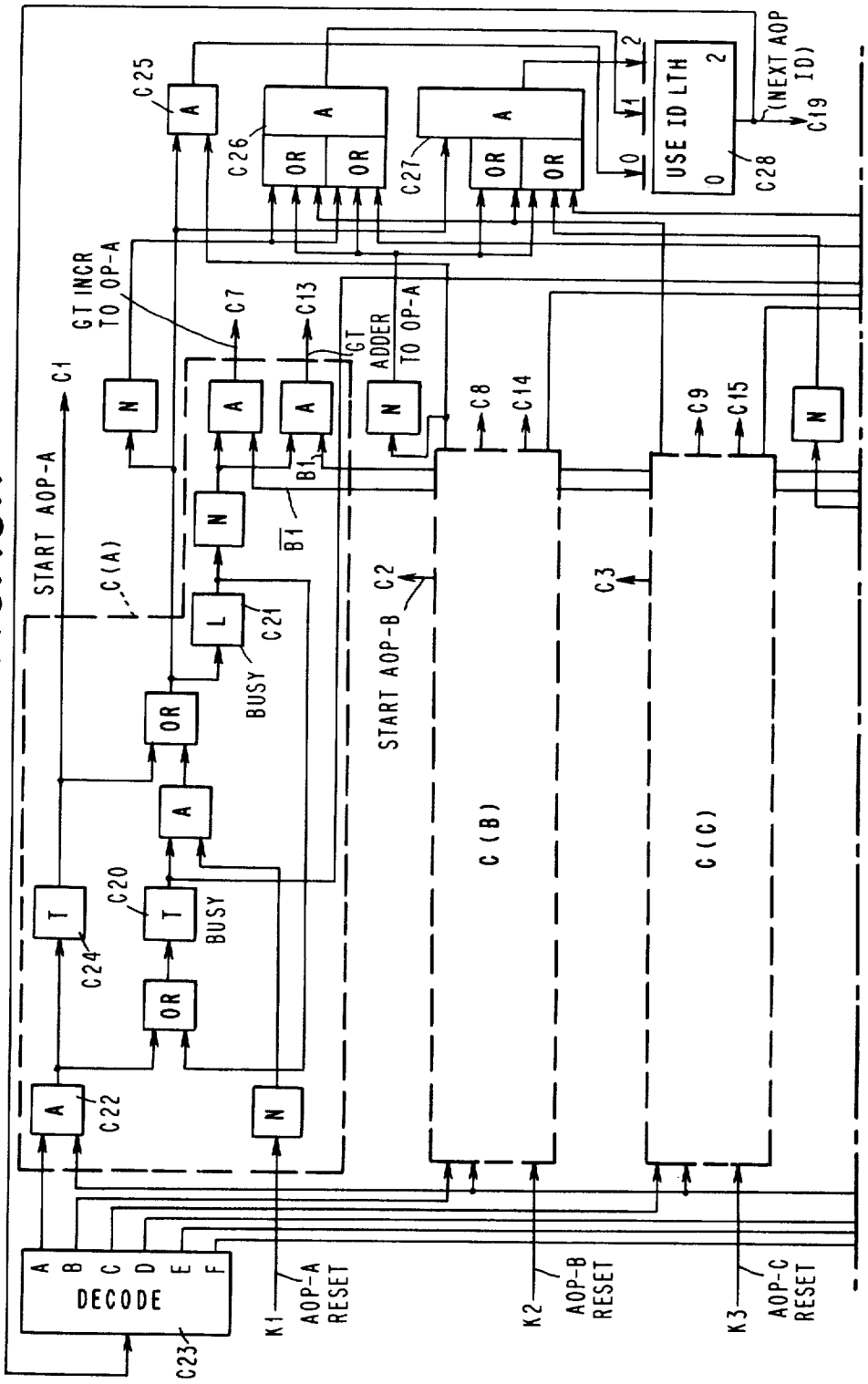

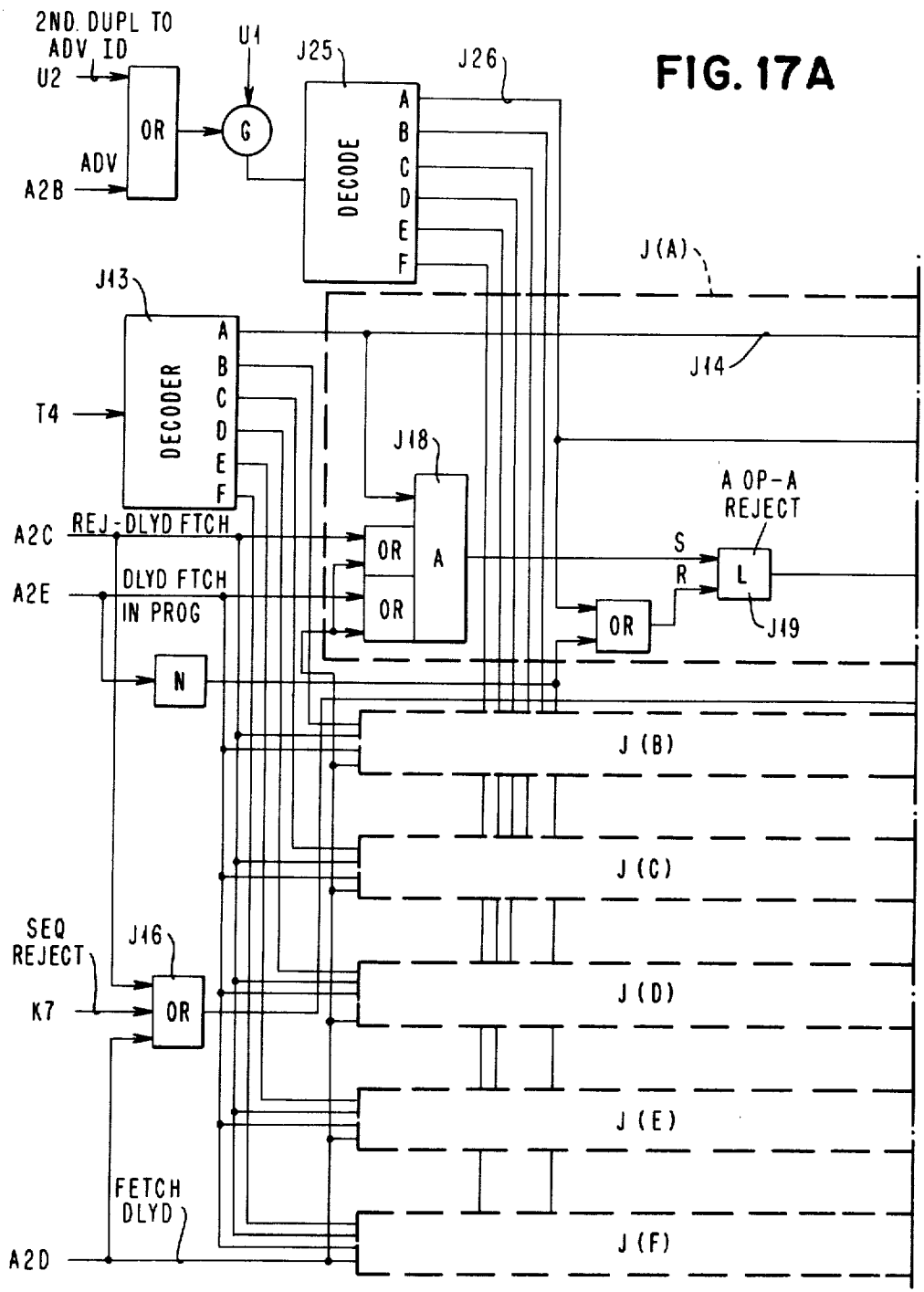

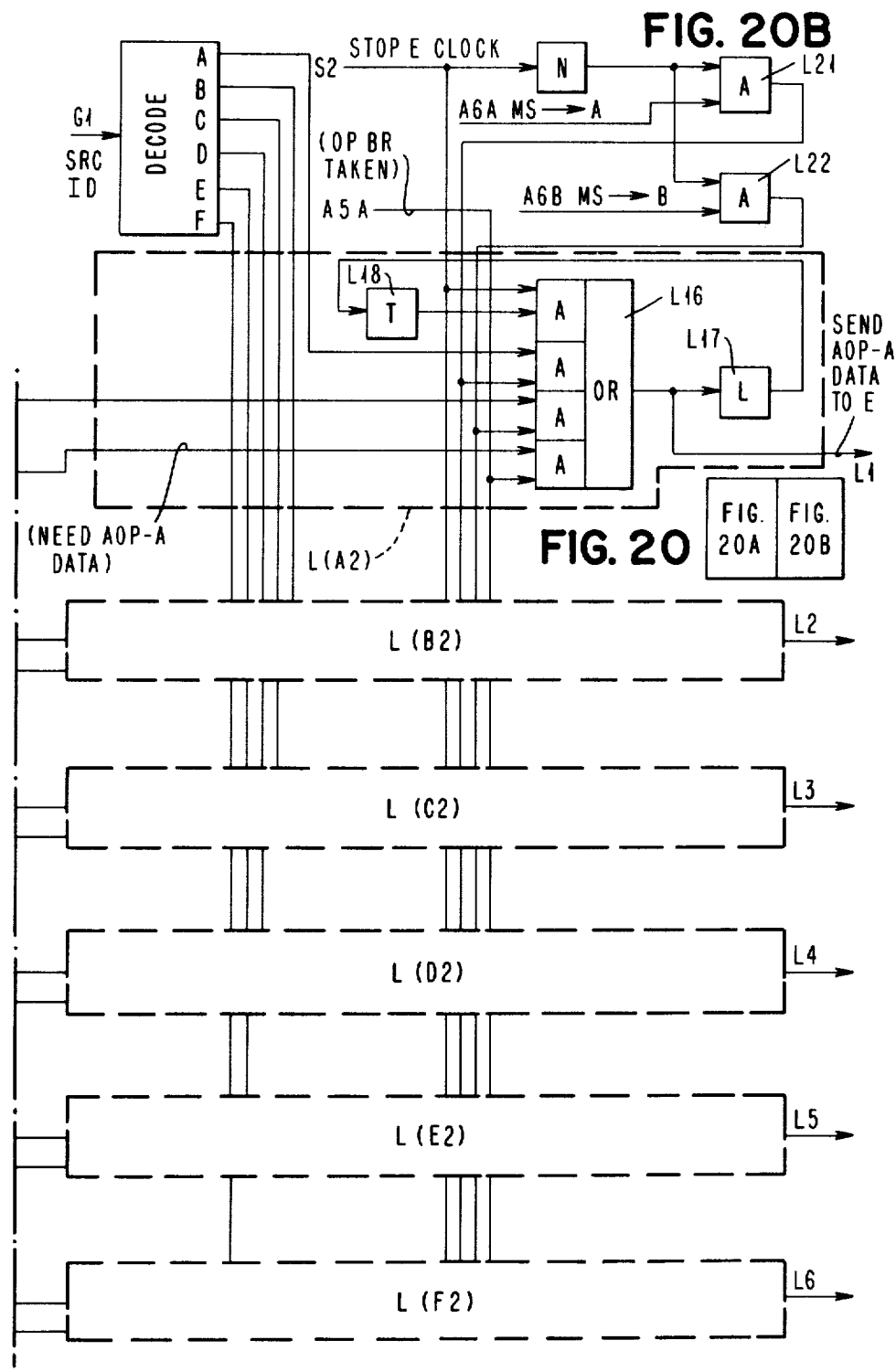

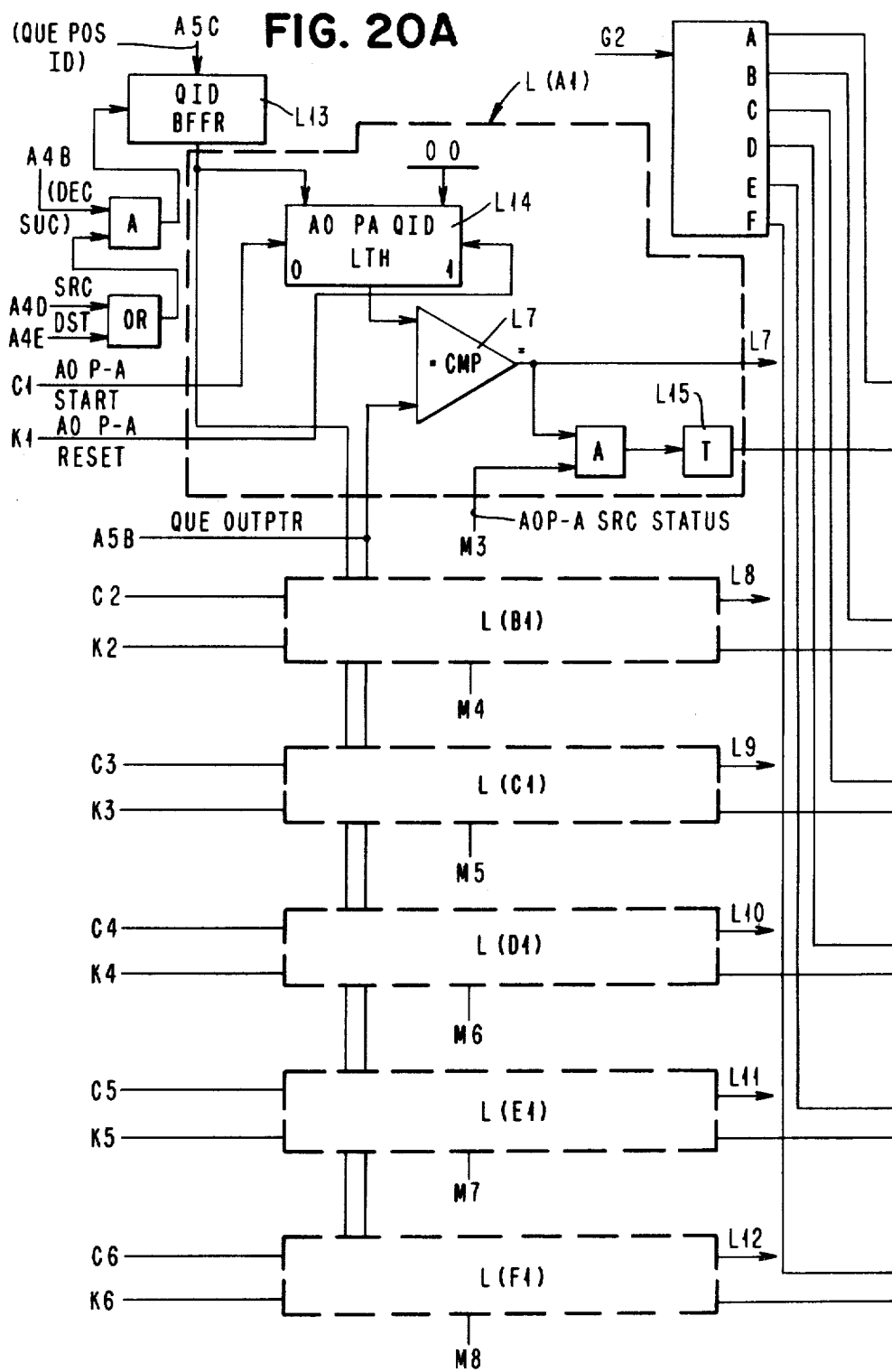

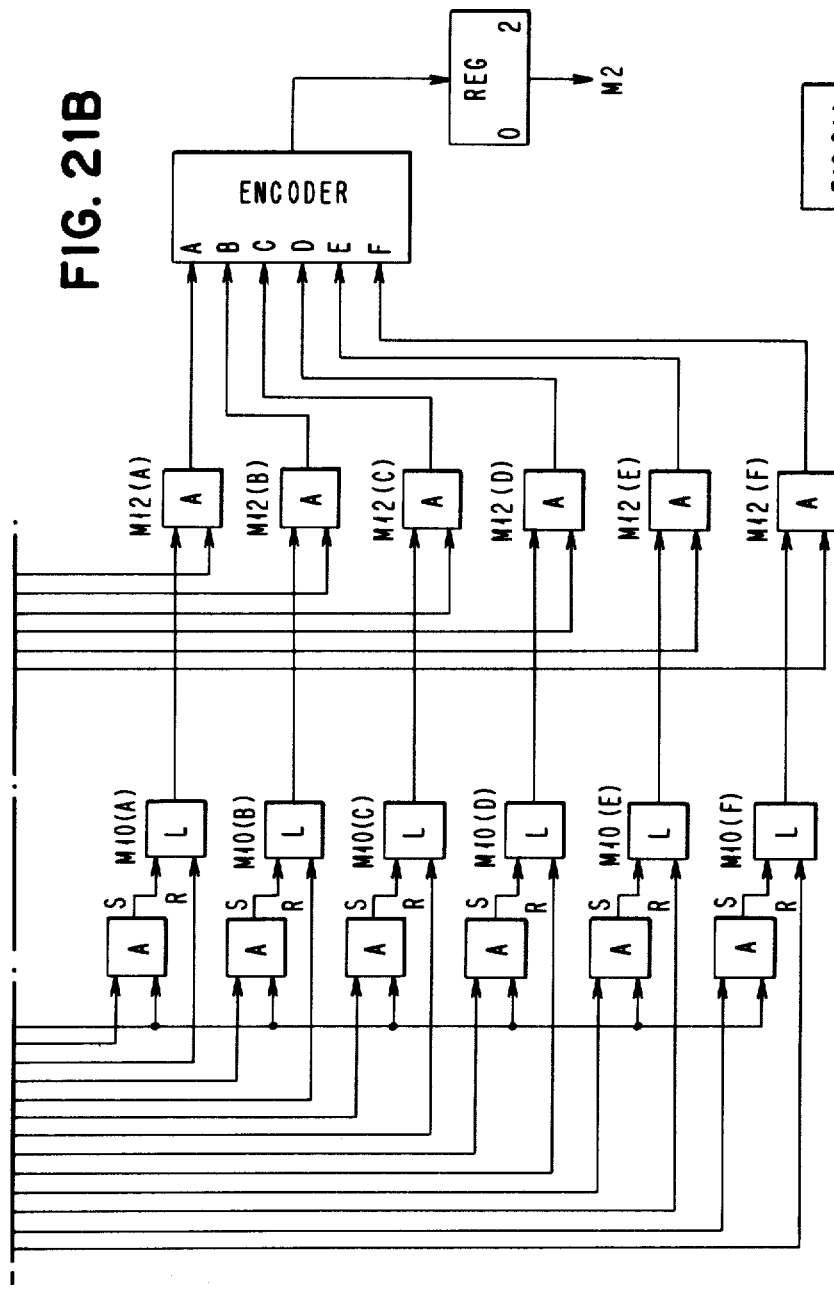

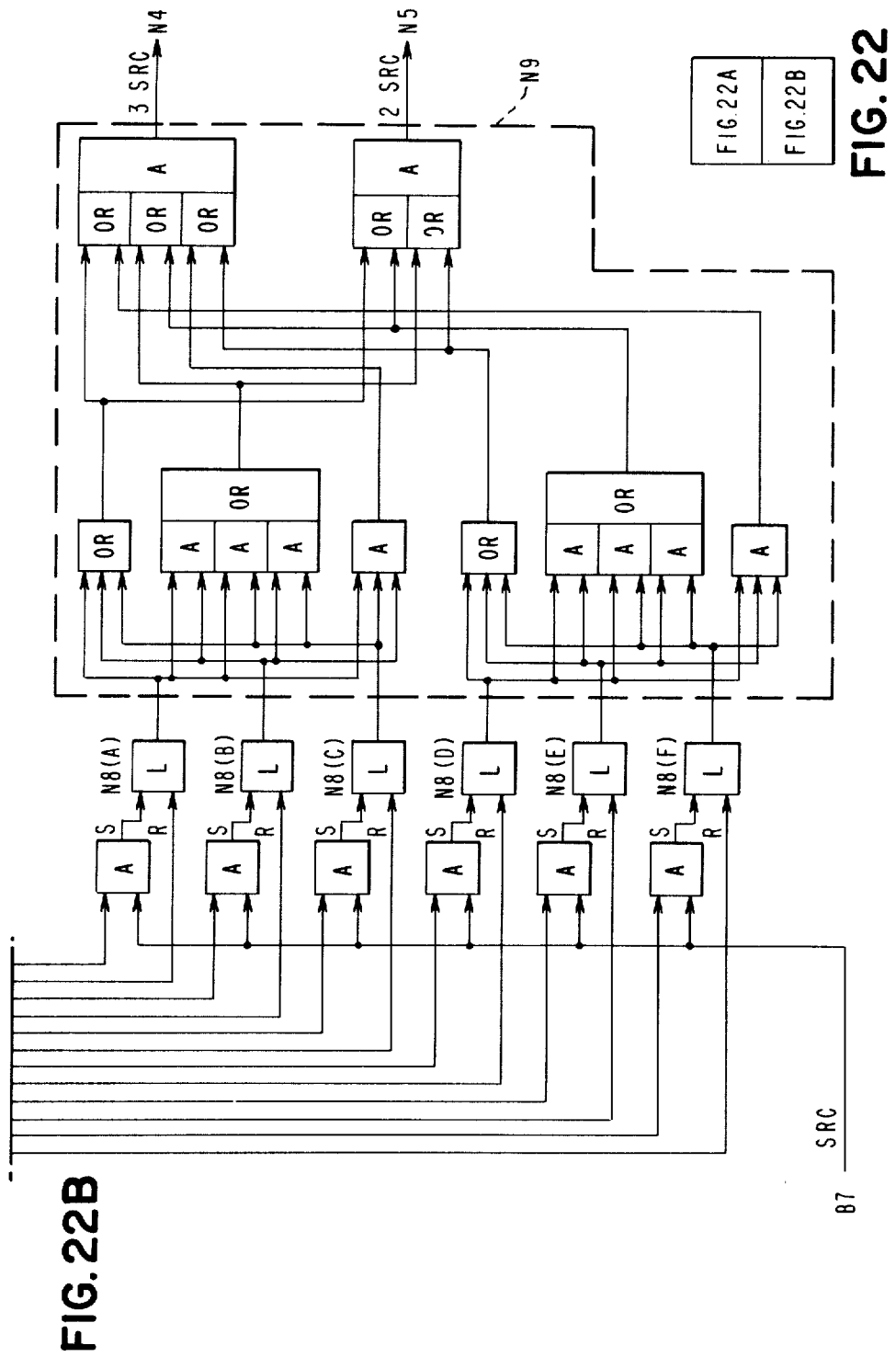

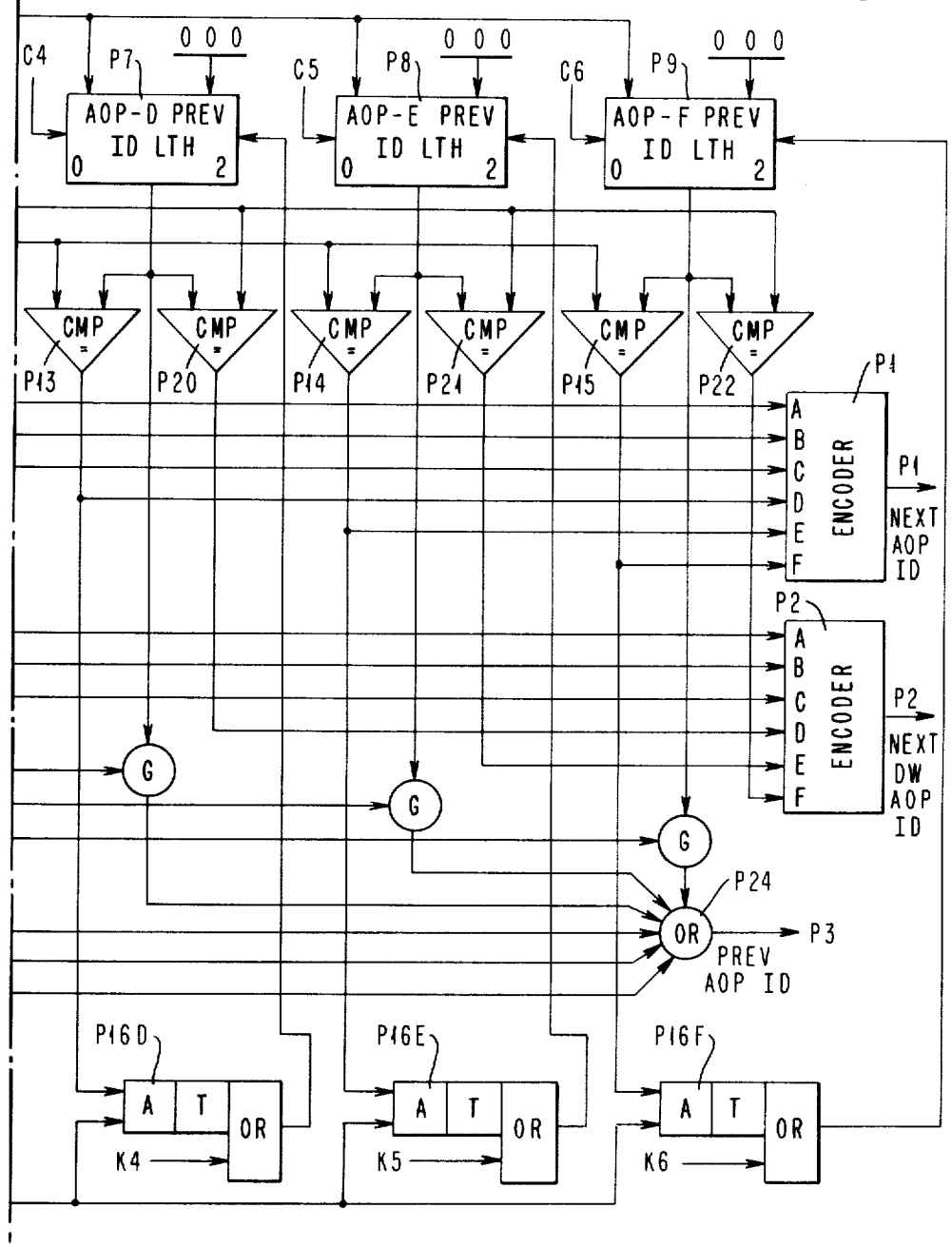

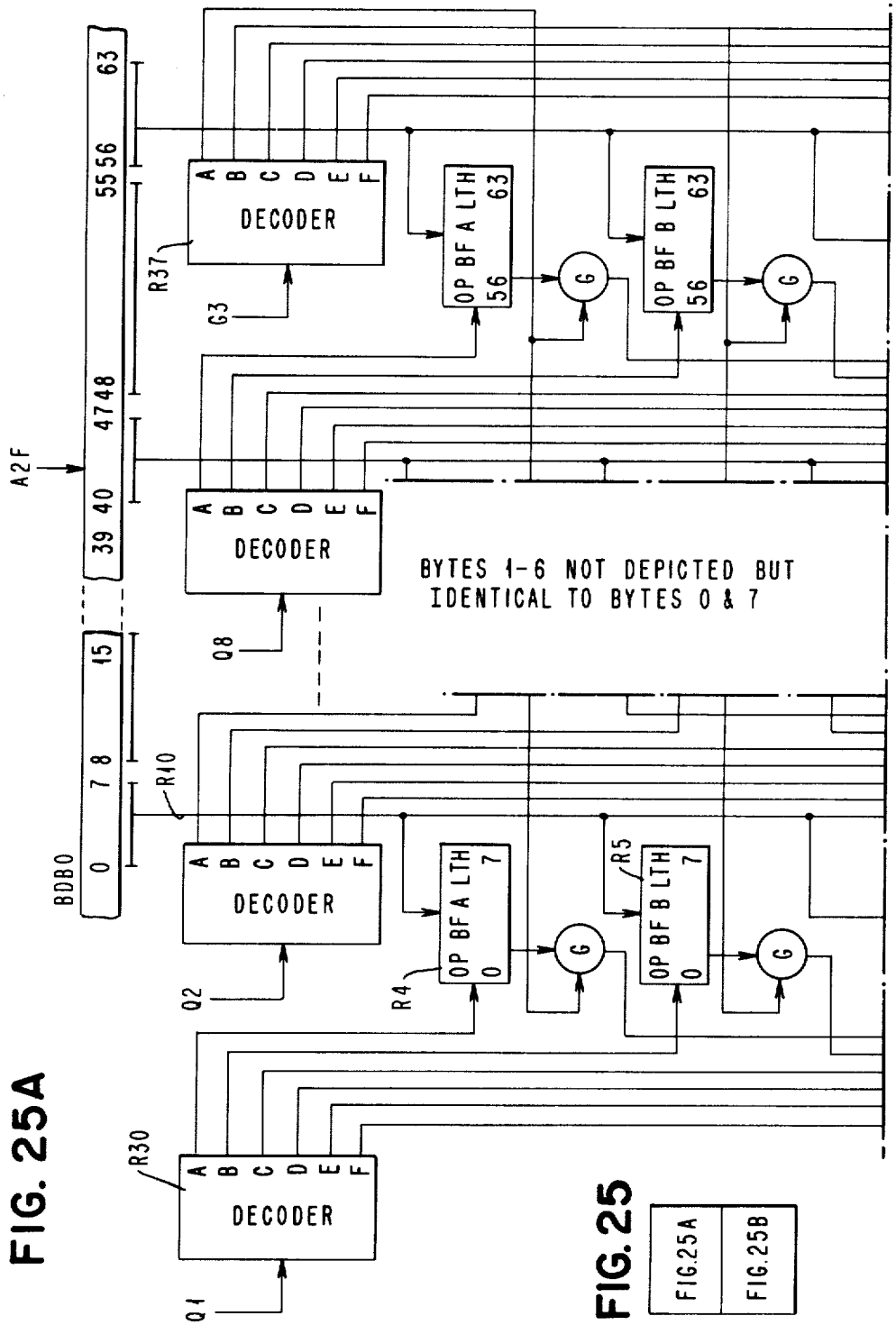

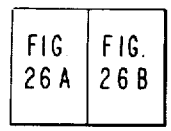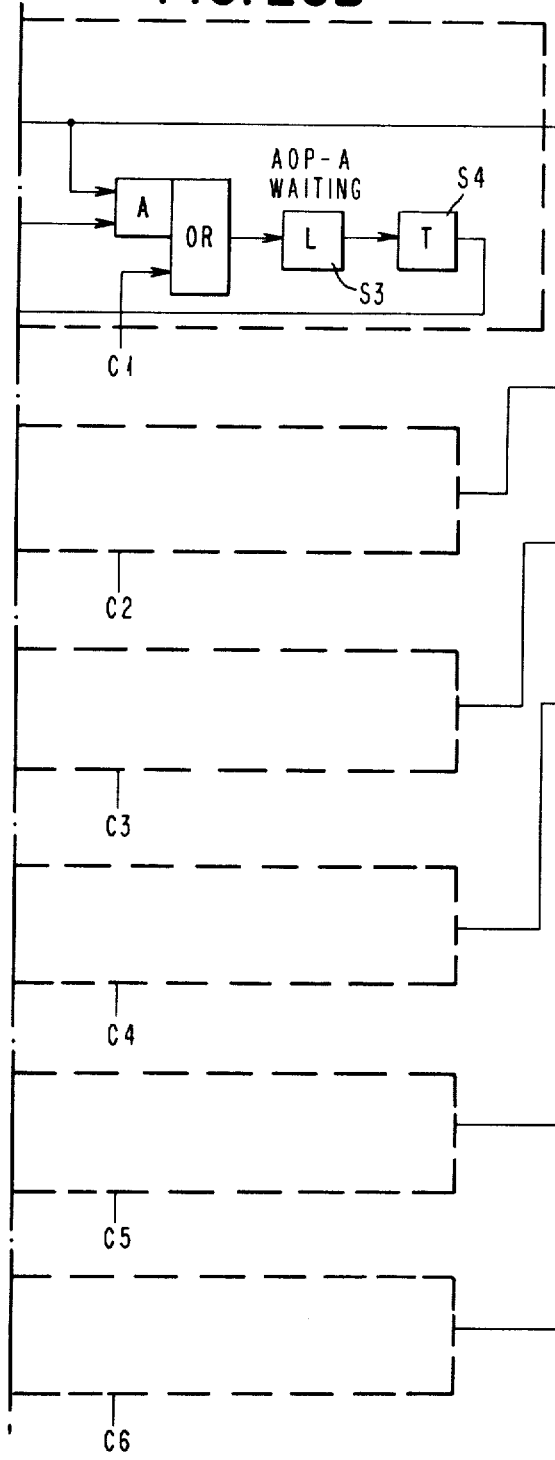

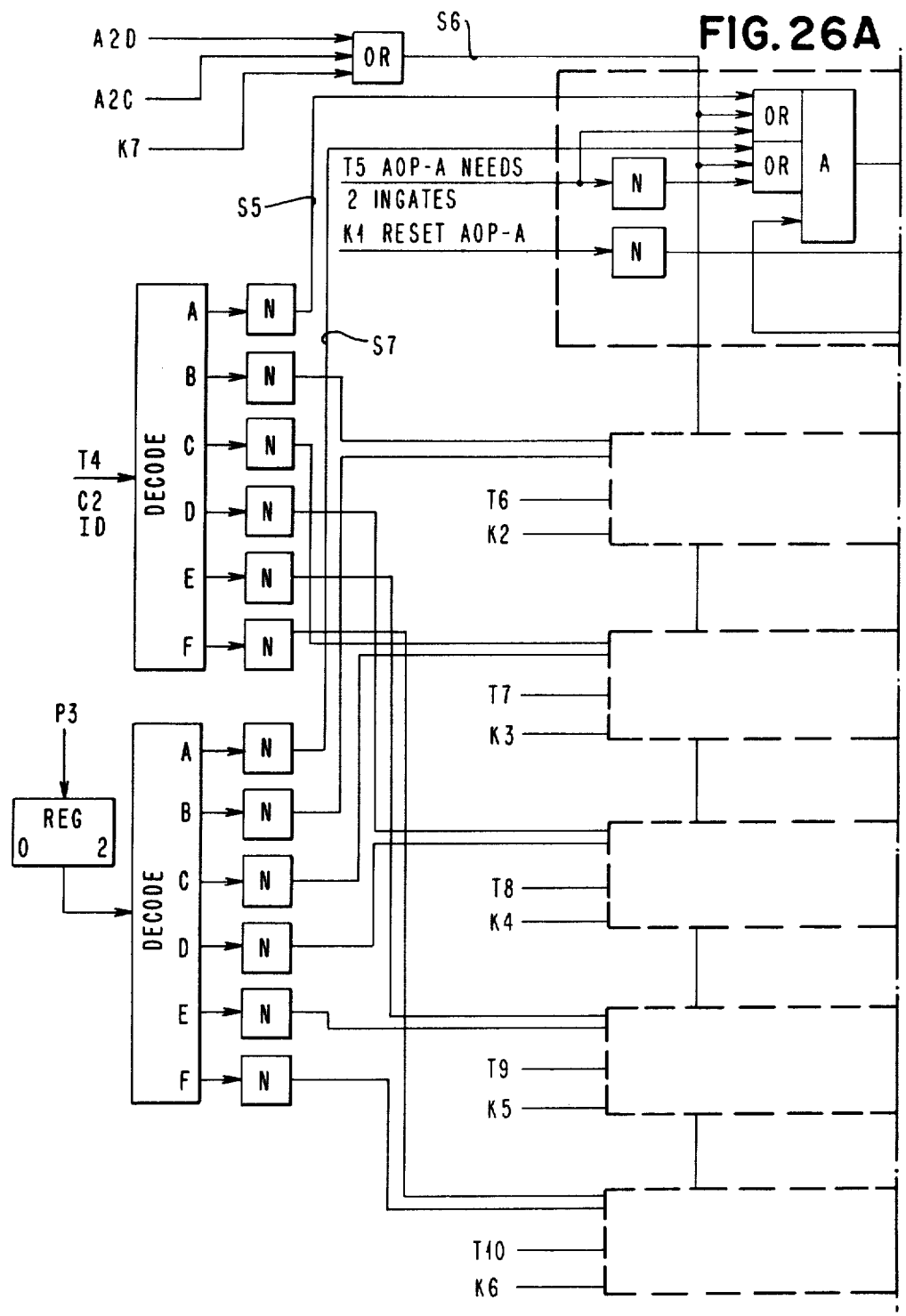

| FIG. 30A | FIG. 30B |
|---|---|

OPERAND ALIGNMENT CONTROLS FOR VFL INSTRUCTIONS

INTRODUCTION

The subject invention relates to means for managing the fetching of data from a cache and a cache bypass from main storage. The invention also relates to controlling the sequencing of floating operand registers and buffers, which request, receive and buffer the fetched data in the order required to transmit variable length operands for execution, while overlapping the decoding of a next instruction. This application is related to U.S.A. patent applications Ser. Nos.: 887,097 and 887,091, both filed on the same day as this application and assigned to the same assignee as this application.

BACKGROUND

In many large commercial data processors, such as the IBM System/370 Model 168, the bus width for each transfer of data between the processor storage control function (PSCF) and the instruction unit function (IPPF) is a double word (DW). When larger amounts of data are to be transferred, multiple DW cycles are taken. However, if a cache (i.e. buffer storage) is provided in the PSCF, it is common for the line size (smallest amount of data which can be loaded into the cache from main storage) to be several (2, 4, 8 or 16) double words. The line size is selected to optimize the performance of the system. A smaller size could cause performance loss because more lines would need to be transferred, and a larger size could cause performance loss because line transfers would take longer. Because of the mismatch between bus size and line size, it requires multiple cycles to load a line into a cache; and during those cycles, the line being transferred to the cache is unavailable to satisfy processor requests for data.

PRIOR ART

The use of a cache (also called a high speed buffer) to improve the access rate of storage data supplied to an instruction unit is well known in the prior art, which teaches that main storage transfers to the cache may be made in data groups called cache blocks (currently called cache lines), in which a line is fetched as a series of parallel sublines dependent on the main storage bus width to the cache. (See U.S.A. Pat. No. 3,569,938 to H. E. Eden et al.) The subline in different cases has been a byte, a word, a doubleword, and a quadword. In a large machine such as the IBM System/370 Model 168, the doubleword is used as the subline. The prior art also teaches that in a line being fetched, the requested subline (which need not be the first subline in the line) may be simultaneously sent to the I-unit while it is being sent to the cache. (See U.S.A. Pat. No. 3,588,829 to L. J. Boland et al, Col. 6, lines 19-21, or U.S.A. Pat. No. 3,806,888 to N. F. Brickman et al or U.S.A. Pat. No. 3,896,419 to R. E. Lange et al.) However, no prior art is known to teach the simultaneous transfer to the I-unit and the cache of other sublines (in the line being transferred) for operand use, beginning with the requested subline through the highest-addressed subline, as is found in the subject invention. The invention gives the I-unit access to all of the most desired sublines being transferred as soon as each subline is transferred to the cache. No prior art is known for obtaining a similar result by permitting any subline (other than the first in the line being transferred to the cache) to be accessible to the I-unit before the line transfer is completed; in fact, the known prior art prohibits accessing the cache for the line being transferred (see U.S.A. Pat. No. 3,705,388 to Nishimoto which only allows access to a different block, i.e. to a completed line in the buffer memory, i.e. cache).

U.S.A. Pat. No. 3,462,744 to Tomasulo et al discloses an operand handling technique, in which during initial instruction preprocessing, tags are assigned to operands requested from storage by the instruction, and the tags are assigned to registers in the execution unit assigned to handle the operand(s). When each operand is about to arrive from main storage on a common data bus, the tag assigned to that operand is broadcast to all registers. The registers which have been assigned that tag will compare equal with the broadcast tag and will be enabled. The received operand is ingated into the enabled registers from the common data bus, so that execution may be completed for that instruction. This common data bus technique is totally different from the subject invention.

The IBM System/370 Model 168 also is prior art, and it uses a different method than the subject invention. The Model 168 has two eight byte operand buffers which can buffer doublewords fetched from storage. Only one doubleword in a line fetch to the cache is transferred directly from main storage to the instruction preprocessing function (IPPF); the other doublewords in the line being transferred must await completion of the line transfer before any of these words are transferable to the IPPF from the cache.

For those instructions whose operands contain more than one doubleword, the IPPF only fetches the first doubleword. Subsequent double words in the operand are fetched by the execution (E) function under microprogram control. The alignment of data to the correct byte boundary, and the concatenation of data from different transferred doublewords is also done in the E function under microprogram control. For those instructions which are processed this way in the 168 (e.g. LM, MVC, NC, OC, XC, CLC, etc.), overlap between the IPPF and E function is disabled, that is, the IPPF is prevented from decoding any subsequent instruction until the decoded instruction completes execution.

SUMMARY OF THE INVENTION

In the subject invention, a novel I-unit feature is provided by means of plural double word operand buffers having floating assignments for buffering the sublines received from storage. For LM, MVC, NC, OC, XC and CLC instructions, the I-unit receives all of the sublines of the operands, aligns them to the desired boundary using a processor storage control function (PSCF) shifter, and concatenates the data from different sublines by performing byte ingates into the assigned operand buffers. Once all sublines for the operands for one instruction are fetch requested, the IPPF (instruction preprocessing function) can proceed with operand fetching for subsequent instructions without regard to when the prior instruction executes, which can then execute in an overlapped manner.

The communications between the PSCF and IPPF are set up as follows. An IPPF fetch request is initiated by a floating request register which is paired with a floating buffer. The IPPF sends the fetch request address and a fetch request control signal to the PSCF. If the data is available from the cache, it is sent to the processor two cycles later with no further control signals between PSCF and IPPF. If it is not available from the cache, then the PSCF raises a fetch delayed signal to tell the IPPF it must wait. Subsequently, prior to the arrival of the data, the PSCF sends an advance signal to the IPPF.

If multiple doublewords are to be returned by the PSCF, then it raises the advance signal prior to sending each DW. In order that the IPPF can know when to stop looking for advance signals, an additional signal, fetch in progress, is turned on at the beginning of the delayed fetch and is turned off at the end of the delayed fetch - this may be simultaneously with, or subsequent to the last advance (for the highest addressed DW in the line).

The control logic which makes the mechanism work is in two parts: (1) circuits in the PSCF for returning the multiple doublewords, (2) floating operand fetch request register and buffer pairs, called AOP's, in the IPPF for requesting, receiving, and holding the multiple doublewords, and controls for associating and sequencing the AOP's with the multiple DW's to be received for each operand.

The PSCF contains controls to pass the multiple doublewords from main storage to the IPPF, and generates the necessary control signals to the IPPF. As the PSCF receives the fetch request for each DW, the PSCF places control bits associated with the request in a source-sink unit control field to identify the first DW fetch requested in the line, the DW at the end of line, and the last DW to be fetched for the line. As each doubleword is outputted from storage, the PSCF directly passes to the IPPF each doubleword from the first requested DW through the DW at the end of the line (if any). Subsequent doublewords at the beginning of the line (if any) are not passed to the IPPF.

The operand controls in the IPPF include the plural operand address register/operand buffer pairs, referred to as AOP's. Each AOP is capable of requesting and receiving a single doubleword fetch from the PSCF and buffering it until needed by the E function for executing the instruction which required the operand. For some instructions (such as LM, MVC, CLC, XC, etc.), the IPPF fetches operands which may have multiple doublewords (up to 33 DW's when not aligned on DW boundaries). An AOP is assigned to each doubleword request. The AOP's assigned to different DW's in the same operand are linked together by a chain of back pointers held in latches, which respectively represent the AOP's.

These and other objects, features and advantages of the invention may be more fully understood and appreciated by considering the following detailed description in association with the accompanying drawings.

BRIEF DESCRIPTION OF THE DRAWINGS

In the accompanying drawings forming a material part of this disclosure:

FIGS. 9A, 9B, 9C and 9D show set up logic circuits.

FIGS. 10A and 10B depict start and busy triggers.

FIGS. 17A and 17B depict refetch logic.

FIGS. 20A and 20B depict needed L or OP branch logic.

FIGS. 21A and 21B illustrate first SRC and DST status bits.

FIGS. 22A and 22B show SRC and DST status bits.

FIGS. 23A and 23B illustrate previous OAR status bits.

FIGS. 25A and 25B illustrate operand buffers.

FIGS. 26A and 26B depict waiting triggers and stop clock.

INTRODUCTION TO THE EMBODIMENT

Figure 1:
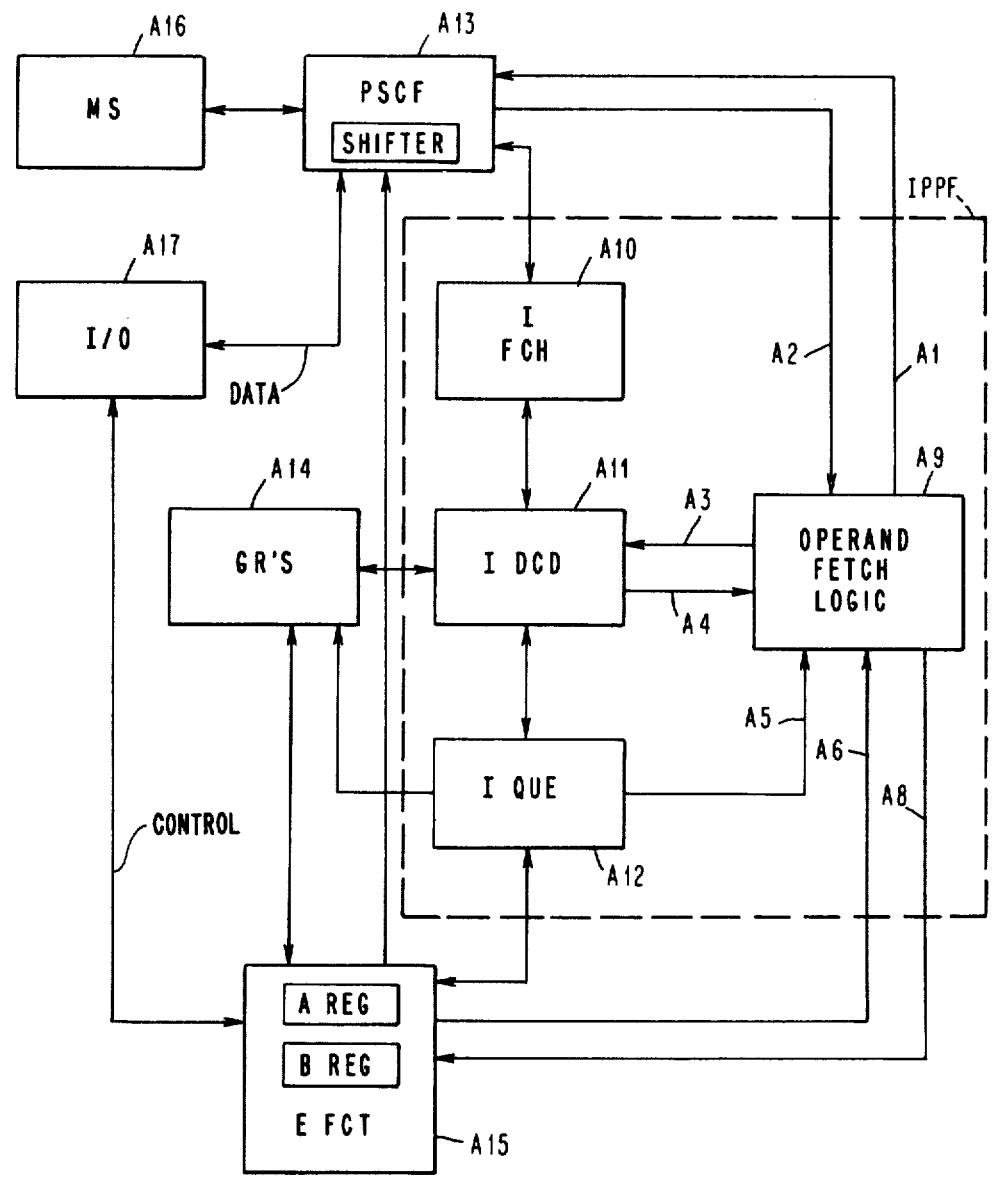
FIG. 1 represents an overall block diagram containing the invention.

The invention improves processor performance by allowing the IBM System/370 LM, MVC, NC, OC, XC, CLC, MVZ and MVN instructions to operate with overlap enabled between the operand fetching and execution function.

In addition, the invention improves processor performance for the MVC, NC, OC, XC and CLC instructions by aligning their first and second variable length operands during their fetching operation, so that both the first and second operands are delivered aligned to the E function for execution. In the case of the LM instruction, performance is enhanced by aligning the eight byte operand to be loaded into a general register pair during the operand fetching operation so that the E function is not delayed by having to do the aligning.

The following are the major data flow elements in the detailed embodiment:

(1) A multiple doubleword bypass control in the PSCF, which can pass to the IPPF doublewords fetched from main storage on doubleword boundaries.

(2) A shifter on the BDBO (buffer data bus out) of the PSCF. This shifter has the ability to shift a fetched DW to the left on byte boundaries, with any byte shifted off the left end of the DW being reintroduced at the right end of the same DW. Shifting is controlled by a three bit shift amount from the IPPF which specifies how many bytes to the left the DW should be shifted. The shift amount comprises the lowest-order three bits in the byte address of a required variable length operand.

(3) Six operand address register/operand buffer pairs (called AOP's), each pair being capable of addressing, receiving and holding eight bytes are in the IPPF. The operand address register (OAR) in each AOP is capable of holding a byte address (which can address any required byte in storage). The address in an OAR can be sent via a fetch request to the PSCF, where it is used for fetching a single DW which contains the addressed byte; the DW is always on a DW boundary and therefore the PSCF request address is a DW address, ignoring the low-order three bits which define the byte in the DW. The DW is fetched by the PSCF from its cache, if it contains the addressed DW, or from main storage if the DW is not in the cache. The fetched DW is transferred on the BDBO to the IPPF, and bytes in the fetched DW can be selectively ingated into one or two AOP's. The ingating is from the BDBO to the operand buffers (OP's) in the AOP's on a byte basis; that is, some bytes of the BDBO may be ingated to the OP of one AOP while other bytes on the BDBO may be ingated to another OP of a different AOP. Any one of the ingated OP's may be selected and gated to a working register in the E function.

(4) An address incrementer is provided in the operand fetching block. An address in any one of the OAR's may be gated to the incrementer, have zero or eight added to the address, and the incrementer output may be gated to any of the six OAR's. This address incrementer is also used for other unrelated functions in the IPPF.

There are two types of fetching of variable-length operands done by the IPPF. One type fetches source (SRC) operands. The other type fetches distinction (DST) operands. When both types of fetching are active, each is allowed to use up to three AOP's. When only SRC fetching is active (e.g. for LM and MVC instructions), it may use all available AOP's. SRC and DST fetching operate identically except that the DST fetching always uses a shift amount of zero.

SRC fetching is initiated for an instruction at the time the instruction is decoded. At that time the shift amount is determined by considering where the first byte of the field is to be placed in the A register, and where it is found in storage relative to doubleword boundaries. Where it is found in storage is determined by looking at the low order three bits of the second operand address (SOA). For MVC, NC, OC, XC and CLC, the second operand is supposed to be aligned with the first operand, thus, the location at which the first byte should be placed in the A-register is equal to the low order three bits of the first operand address (FOA). For LM, the FOA low order bits are either 000 or 100 depending on whether the first register to be loaded is even or odd, respectively. The shift amount is then determined by subtracting the low order three bits of FOA from SOA ignoring any high order carry. For example, if the first operand address ends in 010, and the second operand address ends in 101, then 101 minus 010 is 011 which indicates that to align the second operand with the first, it must be shifted left by three bytes. For MVZ and MVN, no alignment is to be done and, therefore, the shift amount is set to zero. The shift amount is retained and used for all fetches related to the storage operand. In addition, SOA and FOA are compared, and if SOA is greater than FOA, then the first fetch is duplicated, this is explained further below.

At the time the instruction is decoded, it is also determined how many doubleword fetches need to be performed to fetch the operand. This is done by adding two numbers together. The first number (L) is the 8 bit length value derived from the L field in the instruction format, it is a binary number, one less than the number of bytes in the operand. This value is generated in the IPPF for other reasons and is used by this mechanism. An 8 bit value (D), which is added to (L) is generated as follows: the high order four bits of (D) are zero, the next bit is 1 if the first fetch is to be duplicated, and the last three bits are the three low order bits of the operand starting address. When these numbers are added, the carry from the high order position is retained and becomes the high order bit of a nine bit sum. Of the nine bit sum, the low order three bits are discarded leaving a six bit result. This result is one less than the total number of doubleword fetches which need to be performed. This value is placed in a counter which is stepped down for each fetch (except the first), and controls when fetching is to stop. As an example, suppose: an operand contains 35 bytes, there is no duplicate first fetch, and the low order bits of the address are 101. Then (L) equals 00100010, (D) equals 00000101, the sum equals 000100111, and the result equals 000100 which says there must be four more DW fetches after the first one.

When the instruction is decoded, the operand address is calculated, and is placed in an available AOP, and a fetch request to the PSCF is initiated. The controls associated with that AOP have status information set into them to remember the shift amount, to remember which instruction they are associated with, and to remember that it is the first AOP assigned to this field.

Then as priorities in the processor permit, additional AOP's are assigned (i.e. started). This is done by gating the address in the last started AOP to the incrementer, adding eight to it (usually), and gating the incremented address to the AOP which is next to be started. The controls for the next AOP will be set to remember the shift amount, and each AOP has a latch which will hold the three "previous ID" bits for the particular AOP. The previous ID content identifies which AOP was started prior to the particular AOP associated with a particular latch. This process of assigning AOP's to double words to be fetched will continue while AOP's are available until the maximum number of AOP's have been started. Any AOP is dynamically assigned to a DW when it is started, and any AOP is dynamically unassigned when it is reset after it transfers its received DW to the E function. When unassigned, any AOP is available for assignment in any operand chain being developed. Thus, there may be a chain of AOP's linked together by back pointers, each AOP in the chain fetching a next higher addressed doubleword of the operand. The chain for a duplicate first fetch is different from the normal chain because when the second AOP is started in the chain, its request address is incremented by zero, thus, the first two AOP's in the duplicate fetch chain will fetch the same doubleword.

When the PSCF sends the fetched DW's to the AOP's, the DW's will have been shifted in the PSCF by the amount that its controls indicate. If a DW is for the first AOP, it will all be ingated into its associated operand buffer (OP) in the AOP. However, if it is not the first AOP, and if the DW has end-around bytes (i.e. bytes which were shifted from the left end of the BDBO and reintroduced at its right end), the end-around bytes will be ingated into the previous AOP operand buffer at the same byte positions they had in the BDBO DW. The remaining bytes (i.e. not end-around shifted) will be ingated to the operand buffer of the AOP which requested that DW at the same byte positions they had in the BDBO doubleword.

Once execution of the instruction begins in the E function, the filled operand buffers in the AOP's are ingated into working registers A and B in the sequence needed by the E function.

When the last AOP of a chain is started for the operands of an instruction, another instruction needing operand fetches is allowed to be decoded and its fetching begun, while execution continues for the prior instruction with its fetched operands in the E function in an overlapped manner.

DETAILED DESCRIPTION OF THE EMBODIMENT

FIG. 1 depicts a computing system which uses the IBM System/370 Architecture. Block A17 represents all of the input/output (I/O) logic circuits and equipment (e.g. channels and I/O devices) attached to the system. Block A17 receives its control information from the execution function (E FCT) block A15 and transfers its data to and from the processor storage control function (PSCF) block A13.

Block A13 (PSCF) includes all of the logic circuits for transferring data to and from main storage. It includes the logic for translating virtual addresses to real addresses and a cache for holding information currently being used by the processor for fast access. U.S.A. patents disclosing and claiming other inventions found in the PSCF and which are assigned to the same assignee as this application, are Nos.: 4,136,385 entitled "Synonym Control Means For Multiple Virtual Storage System", by P. M. Gannon et al; 4,093,987 entitled "Hardware Control Storage Area Protection Method And Means" by C. H. Gaudette et al; 4,096,573 entitled "DLAT Synonym Control Means For Common Portions Of All Address Spaces" by A. R. Heller et al; and U.S.A. patent application No. 805,065; Filed: June 9, 1977, entitled "High Speed Store Request Processing Control" by P. M. Gannon et al.

Main Storage (MS) block A16 represents all main storage attached to the system. Blocks A10, A11, A12 and A9 collectively represent the instruction preprocessing function (IPPF) of the system, in which A10 does the instruction fetch (I FCH), A11 does the instruction decode (I DCD), A12 is the instruction queue (I QUE), and A9 is the operand fetch logic. Thus, the IPPF handles the fetching of instructions, their decoding and the fetching of instruction operands from the PSCF. In most cases when an instruction is transferred to the E FCT block A15, its operand will be ready and it can be executed immediately. The IPPF may have several instructions in process at one time.

I FCH block A10 represents all of the logic for the fetching of instructions from the PSCF block A13, and for buffering instructions until they are needed by I DCD block A11. Block A10 includes the capability of fetching multiple instruction streams so that when a branch is in process, instructions may be fetched both on the target stream and continuing down the stream from which the branch was fetched. Pending U.S.A. patent applications disclosing and claiming other inventions found in the IPPF and E function which are assigned to the same assignee as this application, are: Ser. No. 866,686; Filed: Jan. 3, 1978, entitled "Multi-Instruction Stream Branch Processing Mechanism" by J. F. Hughes et al and Ser. No. 887,093 Filed: Mar. 16, 1978 entitled "Load Multiple Interlock Mechanism" by J. S. Liptay.

Block A11 (I DCD) represents all of the logic involved in decoding an instruction. It includes an instruction register which receives instructions one at a time from I FCH block A10 and holds them while they are decoded. This decoding includes examining a number of interlock conditions in the system to determine whether it is possible during a particular cycle to begin those operations which must be performed in the IPPF in order to prepare that instruction for execution. It also includes the logic necessary to calculate the effective address of the instruction. If it is found that the instruction can be decoded, then a signal DECODE SUCCESSFUL in bus A4 is generated which causes those operations to be initiated. If it is found during the particular cycle that the instruction cannot be decoded, then the instruction is simply held in the I register for one more cycle and it is determined again on the following cycle whether or not it can be decoded. Instructions are decoded in the sequence in which they are logically called for by the program based on assumptions as to which way branches will go. When it is determined that a branch went in a different direction than was assumed, all those instructions which were processed in the wrong direction are reset, and the operation resumes in the direction in which the branch did actually go. When an instruction is decoded successfully, it is transferred from I DCD block A11 to I QUE block A12 and if it is necessary for an operand to be fetched, the effective address and the appropriate control signals are sent over A4 to the OPERAND FETCHING LOGIC block A9. For two and four byte long instructions, there is only a single decode cycle; however for the six byte long instructions, there are two decode cycles, one associated with each of the operands. Operand fetching may be initiated on each of those decode cycles. However, the instruction is not moved to I QUE block A12 until the second decode cycle.

I QUE block A12 represents the instruction queueing logic which holds instructions from the time they are decoded until they complete execution. It can hold up to four instructions, one in each of four queue positions, and of these one may be in execution. The instruction queue positions are used in simple round robin fashion. A two bit QUEUE IN POINTER designates which position is to be loaded next and is stepped by one each time an instruction is moved to the I QUE. A two bit QUEUE OUT POINTER designates which position is to be sent to the E FCT block A15 next and is stepped by one each time an instruction begins execution. A signal OP BRANCH TAKEN is also generated when an instruction moves to block A15 and it preceeds the first execution cycle by one cycle.

E FCT block A15 represents all the logic which is necessary for performing the execution of the instructions (shifting of operands, adding of operands, etc.). This logic is controlled by a control storage which contains the microprograms which determine how each instruction should be executed. It executes only one instruction at a time in the sequence called for by the program. Some instructions can be executed in only one cycle and when they are encountered, they can be passed from I QUE block A12, and be processed by E FCT block A15 at a one cycle rate. The E FCT block 15 handles all storing, writing to general registers, and processes all interruption conditions.

Block A14 represents the general registers (GR's) in the system. They are accessible by the E FCT block A15 for the execution of instructions, are read out to the block A15 under control of I QUE block A12 as part of the preparation for an instruction that is about to be executed, and are read by I DCD block A11 for the calculation of effective addresses.

Block A9 represents the logic used for fetching operands from storage. Block A9 is the principal focus of this invention.

Figure 2:
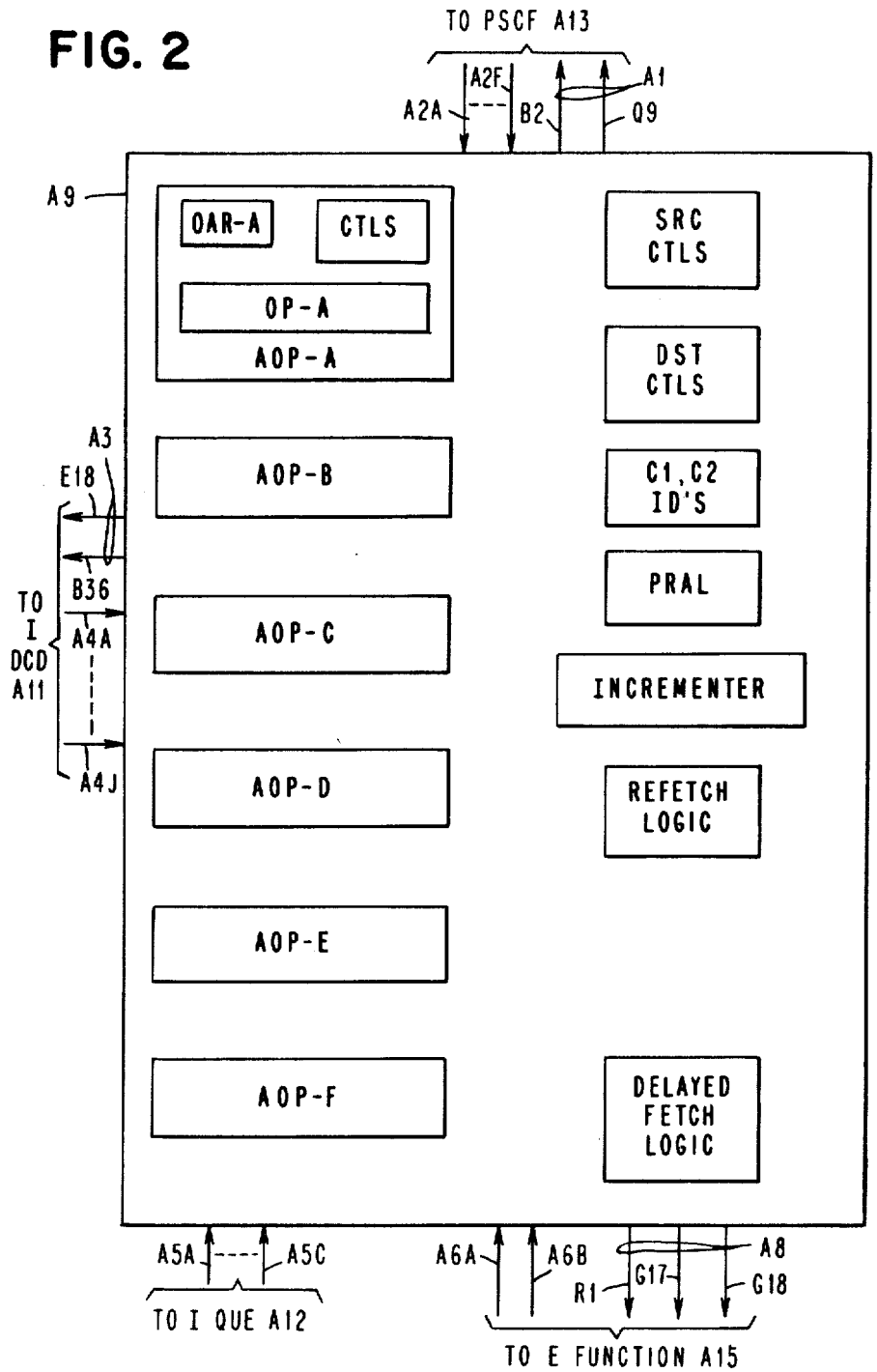
FIG. 2 shows components in operand fetching block A9.

FIG. 2 generically illustrates the interface busses A1, A2, A3, A4, A5, A6 and A8 of block A9 which connect respectively to blocks A13, A11, A12 and A15. Each of the busses are comprised of a plurality of lines, which are listed with their definitions as follows:

Bus A1 contains:
B2-Fetch Request
Q9-PSCF Shift Amount
Bus A2 contains:
A2A-PSCF Busy
A2B-PSCF Advance
A2C-Fetch Rejected
A2D-Fetch Delayed
A2E-Fetch In Progress
A2F-Data on BDBO (Buffer Data Bus Out)
Bus A3 contains:
E18-Operand Controls Need PSCF
B36-Operand Controls Busy
Bus A4 contains:
A4A-Address Adder Output
A4B-Decode Successful
A4C-Operand Length
A4D-Instruction Does DST Fetch
A4E-Instruction Does SRC Fetch
A4F-I REG 11 Latch
A4G-MVC, NC, OC, XC, CLC Decode Latch
A4H-LM Decode Latch
A4J-SS 2nd Decode Cycle Trigger
Bus A5 contains:
A5A-OP Branch Taken Trigger
A5B-Queue Outpointer Latch
A5C-Queue Inpointer Latch
Bus A6 contains:
A6A-Main Storage Operand to Register A in E block A15
A6B-Main Storage Operand to Register B in E block 15
Bus A8 contains:
K1-Bus to Registers A and B
G17-Ingate Signal to Register A
G18-Ingate Signal to Register B
S2-E Stop Clock Tgr.

FIG. 2 shows the principle elements making up the operand fetching logic. There are six address register/operand buffer pairs AOP-A through AOP-F, each having a respective one of operand address registers OAR-A through OAR-F and a respective one of operand buffers OP-A through OP-F. The illustrated register pair AOP-A in FIG. 2 shows the operand address register OAR-A associated with the buffer register OP-A, and their controls. The same arrangement is found in each other register pairs AOP-B through AOP-F. A single pair AOP is capable of addressing and receiving a fetch of a doubleword of eight bytes from storage and buffering the received doubleword until its data is needed by E FCT block A15. For each instruction, enough of the six AOP's are assigned so that an entire operand field can be fetched and made available to the execution function as needed.

An architectural constraint for System/370 requires that all operand fetches for one instruction must be performed before any operand fetch for a subsequent instruction is performed. For many of the instructions, it further requires that the operand fetches be performed from the low order end of the field in sequence to the high order end of the field. For this reason, all of the AOP's needed for fetching the operand for one instruction must be assigned before a subsequent instruction which requires operand fetches is permitted to decode. Consider for example, a load multiple instruction (LM) which requires three doublewords to be fetched. For this instruction, three AOP's must be assigned for performing those fetches before the next instruction is allowed to decode. The first of these AOP's is assigned and initiated in its operation by the signals which are received from I DCD block A11 at the time that the LM instruction is decoded. At the same time, other control signals from block A11 cause source (SCR) controls to be activated. As priority conditions permit within the operand fetching logic, the SCR controls will subsequently cause the additional two AOP's to be assigned and started. The three AOP's associated with the fetching of that field are thought of as being chained together. When the LM instruction is ready for execution, the data buffered in the first assigned AOP will be automatically ingated to E FCT block A15, and the data buffered in the other two assigned AOP's will be provided to block A15 when requested by it.

Because a number of storage to storage (SS) logical instructions require the fetching of two fields from storage, each of which may consist of a number of doublewords, it is necessary for the operand fetching logic block A9 to be capable of assigning and initiating AOP's on two different chains simultaneously. For this purpose, there is a second set of controls known as the destination (DST) controls which are almost identical to the SRC controls, but which serve to handle the other operand. The DST controls are always used by the first (destination) operand of the instruction and the SRC controls are always used by the second (source) operand of the instruction.

Because of the requirements of keeping operand fetches in sequence and also because of the requirements of the interface between the IPPF and the PSCF, it is sometimes necessary for the operand fetching logic to repeat a fetch. For this purpose, refetch logic is provided which will, when necessary, cause a fetch to be repeated.

When it is not possible for the PSCF to process a fetch by a reference to the cache, then there will be some extra delay in returning the data to the operand fetching logic block A9 in the IPPF. In this situation, delayed fetch logic is provided within block A9 to handle the communications with the PSCF.

Consider further the example of a LM instruction LM 0,4,ADDR, for which five general registers, 0 through 4 are to be loaded. In this example, the data is aligned in main storage as shown in the following TABLE 1, with the first byte "A" located at ADDR in doubleword 1 (DW1) with the remaining bytes following it; each general register holds one word.

TABLE 1

| | (Data In Storage) | | | | | | | |
|---|---|---|---|---|---|---|---|---|
| DW1 | — | — | — | A | B | C | D | E |
| DW2 | F | G | H | I | J | K | L | M |
| DW3 | N | O | P | Q | R | S | T | — |

To enhance performance, the operand fetching logic block A9 provides a further feature of aligning source operands to the byte boundary which is optimum for processing in the execution function block A15. In the example of the LM instruction, the first general register to be loaded is even numbered and the optimum alignment is to provide the first 8 bytes of the storage operand on the first data ingate to the A register in the E FCT block A15. These 8 bytes are then written simultaneously into the first two general registers in block A14, and on subsequent requests for data from the block A9, subsequent groups of 8 bytes are provided which are also written into two general registers at once in block A14. If the first register loaded by the LM instruction is odd numbered, then the optimum alignment is to provide the first four bytes of the storage operand in the last four bytes of the A register from which they are written into that general register. On subsequent requests for data, the operand fetching logic block A9 provides subsequent 8 byte groups of the storage operand which are written into general register pairs in block A14. In the example, the first general register to be written is even and therefore 8 bytes are desired on the first ingate. However, it will be noticed in TABLE 1 that the data in storage is aligned such that the first byte "A" is in byte position 3 of a doubleword. Therefore, of the first eight bytes to be provided to the execution function block A15, five bytes come from the first doubleword fetched and three come from the second doubleword fetched. The moving of these bytes into the correct byte position is accomplished by a shifter which is provided in the PSCF block A13 which operates with a shift amount controlled in operand fetching logic block A9. This shift amount consists of three bits which designate a left shift. Any bytes which are shifted off the left end of the doubleword are reintroduced at the right end.

Let us suppose in FIG. 2 that the three AOP's assigned for fetching this field are AOP-A, AOP-B and AOP-C which are assigned respectively to fetching from main storage locations ADDR, ADDR+8, and ADDR+16. The PSCF ignores the low order three bits of the address, and returns the doubleword which contains the addressed byte. It should be noted that the sequence in which AOP's are assigned is dependent on which ones are currently assigned and that there is no necessary sequencing of A, B, C, D, etc. This, however, is the sequence in which they would be assigned if none were busy at the time the LM instruction is decoded. Consider first the data which is returned in response to the fetch by the address in OAR-A in AOP-A. The fetched doubleword is aligned by being shifted left three bytes, so that the data returned by the PSCF is A B C D E - - -. The shifted doubleword is gated into OP-A. This is shown in TABLE 2, in which X represents previous content not of interest. Underlining indicates which bytes were ingated.

TABLE 2

| | (DW1 Loaded Into A9) | | | | | | | |
|---|---|---|---|---|---|---|---|---|
| OP-A | A | B | C | D | E | — | — | — |
| OP-B | X | X | X | X | X | X | X | X |
| OP-C | X | X | X | X | X | X | X | X |

The doubleword obtained by the fetch for AOP-B is I J K L M F G H. Table 3 shows how this data is ingated to the operand buffers.

TABLE 3

| | (DW2 Loaded Into A9) | | | | | | | |
|---|---|---|---|---|---|---|---|---|
| OP-A | A | B | C | D | E | F | G | H |
| OP-B | I | J | K | L | M | X | X | X |
| OP-C | X | X | X | X | X | X | X | X |

However, not all of the fetched doubleword is ingated into OP-B. Only those bytes which were shifted left but which were not shifted off the left end, namely, I, J, K, L and M are ingated into buffer OP-B. The other three bytes F, G, and H, which were shifted off the left end and reintroduced at the right end, are ingated into the first operand buffer OP-A.

Once the data for this second fetch is returned and ingated to the operand buffers OP-A and OP-B, the completed contents of OP-A may be provided to the E FCT block A15. The data from the third fetch of DW3 is Q R S T - N O P and is ingated to the operand buffers as is shown in Table 4.

TABLE 4

| | (DW3 Loaded Into A9) | | | | | | | |
|---|---|---|---|---|---|---|---|---|
| OP-A | A | B | C | D | E | F | G | H |
| OP-B | I | J | K | L | M | N | O | P |
| OP-C | Q | R | S | T | — | X | X | X |

The fetched DW3 is also shifted left by three, those bytes which were not shifted off the left end are ingated into the third buffer OP-C, and bytes which are shifted off the left end and reintroduced at the right are ingated into the second operand buffer OP-B. Once the DW3 fetch is completed, the data in both OP-B and OP-C is available for use by E FCT block A15.

The operational concepts described in the example are next described generically. First, the shift amount is determined by what is necessary to get the first byte of the operand from where it is found in storage relative to the doubleword boundary to where it is needed by the E FCT block A15. This shift amount is applied to each doubleword fetched from the addressed field. For the first fetched doubleword, all of its addressed bytes are shifted and ingated into the first assigned operand buffer. For each subsequent doubleword fetched from the addressed field, those bytes shifted off the left end of the doubleword are always ingated into the operand buffer (OP) in the prior assigned AOP, and those bytes which are shifted left but not off the left end are ingated to the operand buffer associated with the AOP that has the address which made the fetch. When the shift amount is other than zero, the data in a particular AOP may not be used until the fetch by the next assigned AOP is completed, because some of the data from the next fetch may be needed to complete the content of the particular operand buffer. The last assigned operand buffer may of course have its data used as soon as its fetch is completed.

When the left shift for the first doubleword of a VLF operand shifts one or more of the required bytes off the left end, this is called an end-around shift; and it is required that two AOP's be assigned to the first doubleword to avoid loss of those bytes. This is referred to as a duplicate fetch condition.

Let us consider a duplicate fetch example (using a left shift or six) for a MOVE CHARACTER (MVC) instruction which moves ten bytes of a source (SRC) operand (beginning at main storage address, ADDR2, which starts at the third byte after a doubleword boundary) to a destination DST operand (beginning at a main storage address, ADDR1, which starts at the fifth byte after a doubleword boundary). This example is illustrated in TABLES 5-8.

The amount of the left shift for an MVC instruction is determined by subtracting MODULO 8 (Because of 8 bytes per DW) the SRC byte location from the DST byte location in their respective DWs located on DW boundaries in main storage (MS). For example, 3-5 modulo 8 results in 6 being the left shift amount. In the general case for the VLF instructions, the left shift is the module 8 difference: SRC-FINAL, in which SRC is the byte location in each SRC fetched DW, and FINAL is the byte location in each DW in the DST operand to be stored into MS or into GPR(s).

TABLE 5 illustrates the doubleword alignment of the bytes in main storage for the fetch SRC operand (in which its first byte "A" is located at ADDR2) and the stored DST operand (in which its first byte "A" is located at ADDR1).

TABLE 5

(Fetch Alignment of SPC Operand in MS)
| DW1 | — | — | A | B | C | D | E | F |
|---|---|---|---|---|---|---|---|---|
| DW2 | G | H | I | J | — | — | — | — |

(Store Alignment of DST Operand in MS after the Instruction Completes Execution)
| DW3 | — | — | — | — | A | B | C | D |
|---|---|---|---|---|---|---|---|---|
| DW4 | E | F | G | H | I | J | — | — |

TABLE 6

(AOP-A Fetch)
| OP-A | E | F | — | — | A | B | C | D |
|---|---|---|---|---|---|---|---|---|
| OP-B | X | X | X | X | X | X | X | X |
| OP-C | X | X | X | X | X | X | X | X |

TABLE 7

(AOP-B Fetch)
| OP-A | E | F | — | — | A | B | C | D |
|---|---|---|---|---|---|---|---|---|
| OP-B | E | F | X | X | X | X | X | X |
| OP-C | X | X | X | X | X | X | X | X |

TABLE 8

(AOP-C Fetch)
| OP-A | E | F | — | — | A | B | C | D |
|---|---|---|---|---|---|---|---|---|
| OP-B | E | F | G | H | I | J | — | — |
| OP-C | — | — | X | X | X | X | X | X |

For an MVC instruction, the desired data alignment in the AOP's is to align the first byte of the fetched operand with the first byte position of the DST operand, which is of the location that the first SRC operand byte is to be stored in, so that the data can be moved through the E FCT and stored without further alignment.

If the operational concepts previously described in the preceeding example of the LM instruction were applied, it would be found that some of the bytes of the fetched operand would be lost. The end-around shifted bytes are lost because they are required by the next AOP-B, which is not yet available during the DW fetch for AOP-B. The loss is caused when there are fewer required bytes in the first doubleword in the store operand than in the first doubleword of the fetch operand, which is the cause of the end-around shift. This loss is avoided by a duplicate assignment of the first two AOP's to the first fetched doubleword of the operand. The operational concepts previously described for the LM instruction are alright as long as the first two assigned AOP's are assigned to fetch the same doubleword in storage; the first assigned AOP buffers the end-around shifted bytes for the first store doubleword, and the second assigned AOP, buffers the non end-around shifted bytes for the second store doubleword. After the second AOP is assigned to the first fetch doubleword, subsequent AOP's are assigned respectively to successive fetch doublewords when required for the VLF operand; and each subsequent fetch gates its end-around shifted bytes into the prior assigned AOP, and gates the remaining bytes into the currently assigned AOP.

In the duplicate shift example of the MVC instruction involving two fetch doublewords, three AOP's are required which again are assumed to be AOP-A, AOP-B and AOP-C. AOP-A and AOP-B are assigned to the first fetch doubleword located at ADDR2, and AOP-C is assigned to the fetch doubleword located at ADDR2+8. If additional fetches were required, a respective AOP would be assigned to each successively higher doubleword in the operand field with no further AOP duplication involved. In this example, AOP-A and AOP-B are respectively referred to as the first and second duplicate AOP's.

When the data for the AOP-A fetch of DW1 is returned with a six byte left shift, it is ingated entirely into OP-A as shown in TABLE 6. In TABLES 6, 7, and 8, underlining indicates which bytes were ingated. TABLE 7 shows how the end-around shifted data for the AOP-B second duplicate fetch is handled. The two bytes E and F which are not shifted around the end are ingated to OP-B, and the remaining six bytes are ingated to OP-A, overlaying the identical information which was already there.

TABLE 8 shows how the second fetch doubleword (DW2) is handled by AOP-C. After the six byte shift by AOP-C, the six end-around byte positions are gated into the corresponding byte locations in the previously assigned OP-B to complete the doubleword therein with the bytes G, H, I, J, -, -, and the remaining two bytes (which are not of use in this example) are ingated into OP-C. The data in OP-A and OP-B (which is aligned exactly as it is to be stored in the first operand data words DW3 and DW4 shown in TABLE 5) is then transferred to the E FCT block A15 when required for execution of the MVC. The data in OP-C in this particular example is never used by the E FCT because the instruction completes execution without ever getting to it.

It will be noted that the fetch for the first duplicate AOP is not really needed, because the fetch of the same doubleword for the second duplicate AOP ingates the bytes needed in the first duplicate AOP. Therefore, only one fetch is provided for both duplicate AOP's when the fetch is received via the cache bypass in the PSCF (which is the first fetch of a line); and it is handled as a fetch for the second duplicate AOP. When a cache provides the fetches, the first fetch may be received so fast that there is no advantage in avoiding one of the duplicate fetches and both are handled in the manner described for the example in TABLEs 5-8.

Figure 3:
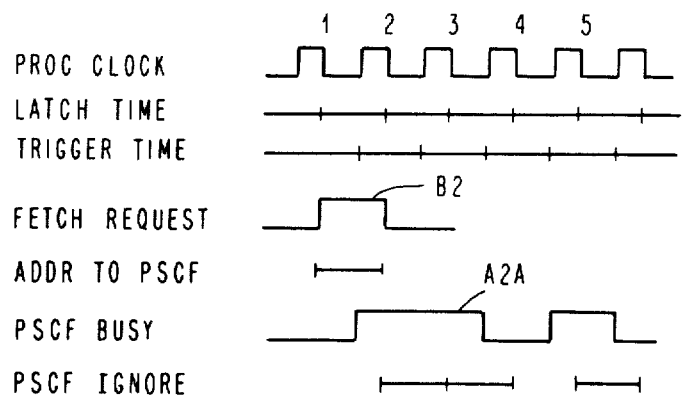
FIG. 3 is a timing diagram of waveforms used by the IPPF to make a fetch request.

Consider next the interface between the OPERAND FETCH LOGIC block A9 and the PSCF block A13 using the timing waveforms shown in FIG. 3. The operand fetch block A9 may initiate a fetch request signal B2 at latch time of any given processor clock cycle. Latch time starts and ends when the clock cycle switches downward. Trigger time starts and ends when the clock cycle switches upward. Request B2 is sent to the PSCF and the logical address is simultaneously sent to the PSCF by PRAL (processor address latch) from block A9. PRAL transfers logical addresses from the OAR's, among other places in the IPPF. If the PSCF is busy with some higher priority function and cannot handle a received fetch request, the PSCF brings up a BUSY signal A2A at trigger time prior to when the fetch might be sent. Signal A2A indicates to block A9 that any fetch request sent during that cycle will be completely ignored by the PSCF.

Figure 4:
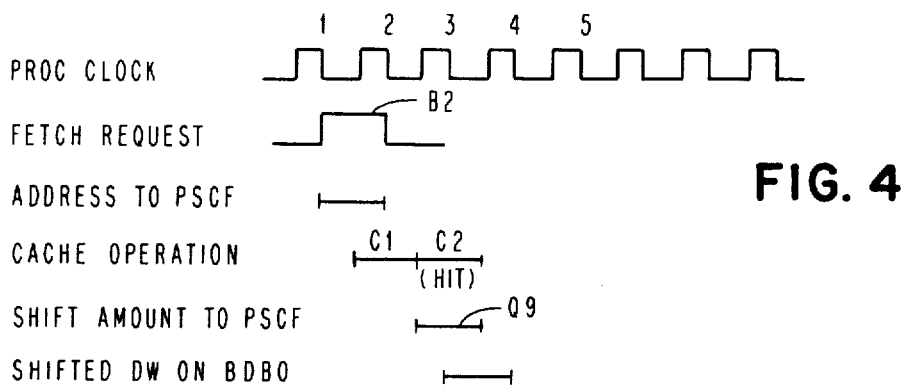
FIG. 4 is a timing diagram illustrating shift amount and shifted double word waveforms.

FIG. 4 illustrates the timing for a simple fetch request which is accepted by the PSCF for accessing the cache. At the latch time of clock cycle 1, the fetch request signal and address are sent to the PSCF by PRAL. During clock cycles 2 and 3, the PSCF cycles C1 and C2 designate the time of the cache access. The cache is addressed during C1 and data returned for a cache hit during C2. Also during the C2 cycle, the SHIFT AMOUNT signal Q9 is sent to the PSCF by the IPPF for that fetch in the amount explained with the previous examples of the LM and MVC instructions. At the latch time of clock cycle 3, the PSCF sends the requested doubleword (DW) to A9 on the buffer data bus out (BDBO) from the cache shifted by the amount sent on Q9.

Figure 5:
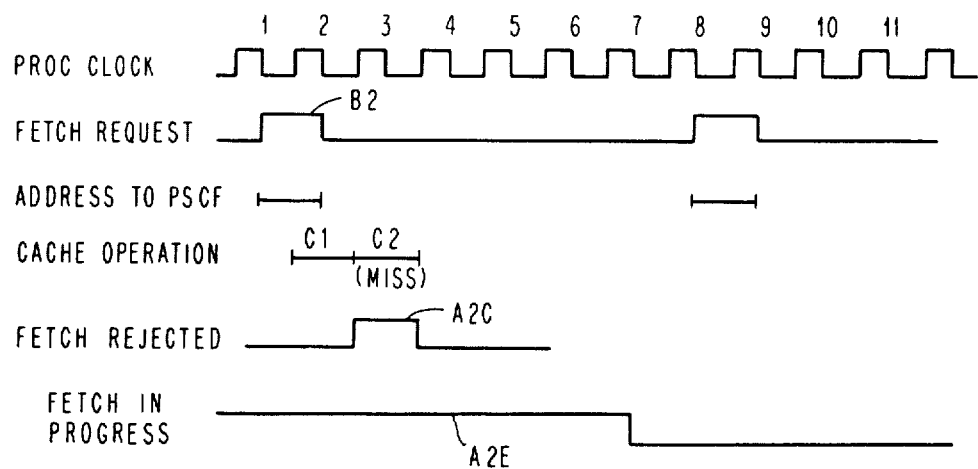
FIG. 5 is a timing diagram of waveforms involved in the PSCF rejection of an IPPF fetch request when a line fetch is in progress.

FIG. 5 illustrates the timing for a fetch where the requested data does not reside in the cache and must be fetched by the PSCF from main storage; but where the PSCF already has a main storage access in process at the time that this fetch request is received by the PSCF. The fetch request is sent by the IPFF as described before during cycle 1.

However, on clock cycle 3 a cache miss is found during cycle C2, and a fetch rejected signal A2C is sent by the PSCF to A9. The fetch rejected signal A2C indicates that the data cannot be provided by a fast reference to the cache, and furthermore, that the PSCF is already busy with a delayed fetch so that the PSCF is not able to handle this request at this time. The PSCF does not store the rejected request and therefore, operand fetch logic A9 must reissue its fetch request at a later time. Also, a fetch in progress signal A2E from the PSCF informs the operand fetch block A9 of the duration of the delayed fetch in the PSCF. (Signal A2E may be either on or off during the time of the fetch rejected signal.) Block A9 uses signal A2E to determine when it may repeat the rejected fetch request with a probability that the request will not be rejected again. In FIG. 5, the fetch in progress signal A2E goes off at cycle 7, and the fetch request is shown being repeated at the latch time of cycle 8. This is the earliest that the fetch can be repeated without being assured of again being rejected.

The most common reason for the PSCF providing the delayed fetch in progress signal is because the PSCF is fetching a line of data (i.e. cache block) from main storage into the cache. This involves transferring eight doublewords per line. Line boundaries are delineated by main store binary doubleword addresses ending with 000. The first doubleword fetched from a line is the doubleword addressed by the fetch request. Then the PSCF fetches doublewords in MS address sequence up to the end of the line, and then fetches doublewords from the beginning of the same line up to the requested addressed doubleword.

TABLE 9 shows a line of eight doublewords in which the fetch request address is for the 6th doubleword of the line. The numbers in the right column in TABLE 6 shows the sequence in which the doublewords are fetched by the PSCF from main storage. In this invention, the PSCF also sends to operand fetch block A9 only the fetch request addressed doubleword through the last doubleword at the end of the line (i.e. having the highest MS address in the line). In the example of TABLE 9, only the 6th, 7th and 8th doublewords in the line are sent to the IPPF, as well as to the cache which receives the entire line.

TABLE 9

| MS Addresses | Double Words in MS | Fetch Sequence |
|---|---|---|
| XX-----110 | | |
| XX-----111 | | |
| XX-----000 | 1st DW of line | 4 |
| XX-----001 | 2nd DW of line | 5 |
| XX-----010 | 3rd DW of line | 6 |
| XX-----011 | 4th DW of line | 7 |
| XX-----100 | 5th DW of line | 8 |
| XX-----101 | 6th DW of line | 1 |
| XX-----110 | 7th DW of line | 2 |
| XX-----111 | 8th DW of line | 3 |
| XX-----000 | | |

Figure 6:
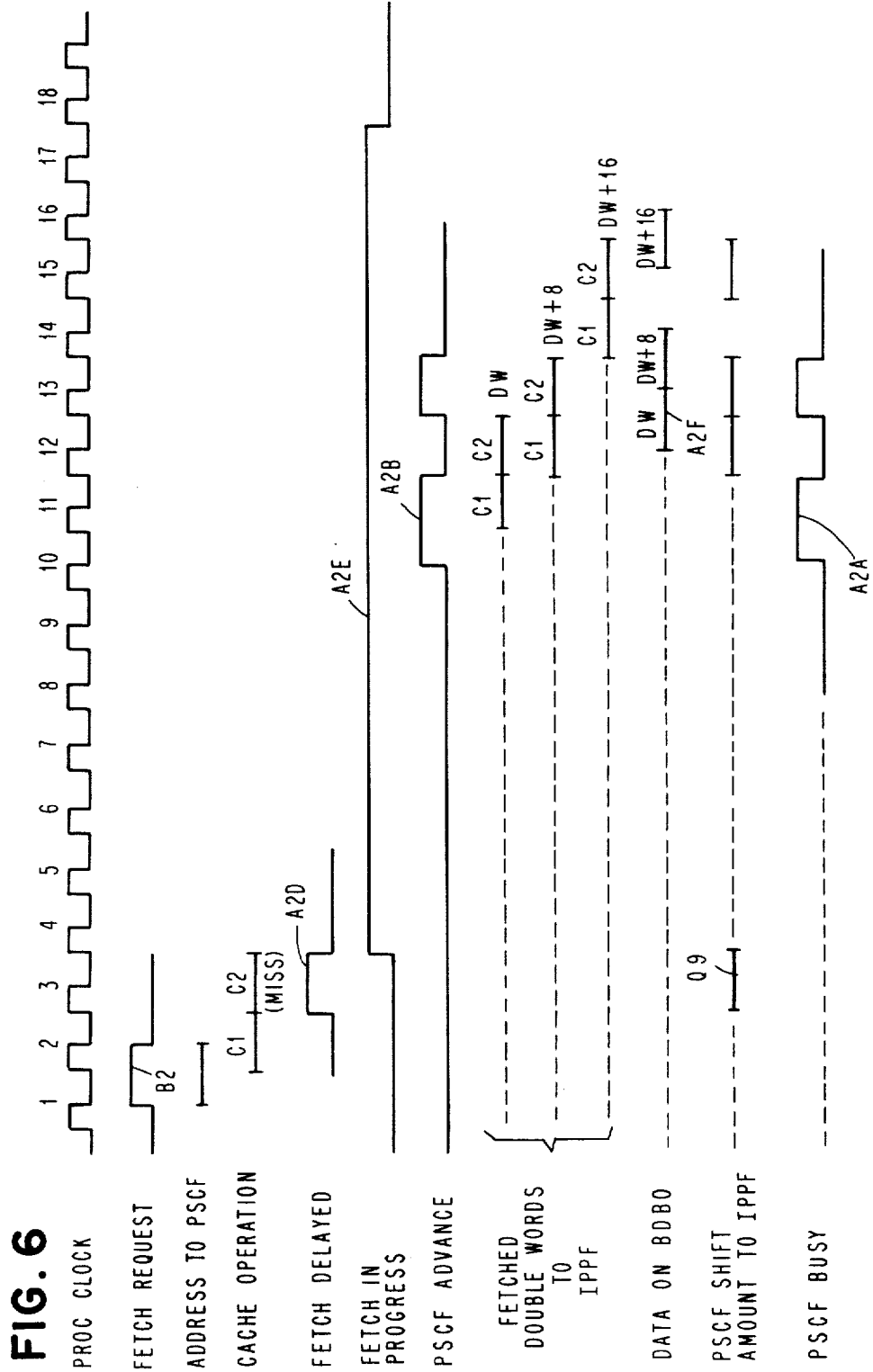
FIG. 6 is a timing diagram of waveforms involving the PSCF accepting an IPPF fetch request when it has a cache miss.

FIG. 6 illustrates the timing for a fetch where the requested data does not reside in the cache, and must be fetched from main storage, but where the PSCF accepts the request. During clock cycle 1, the fetch request is initiated in the manner described for the other timing FIGS. 3-5. The fetch is accepted by the PSCF; no fetch in progress signal exists at that time. During clock cycle 3 (The C2 cycle of PSCF operation), a fetch delayed signal A2D is sent by the PSCF to indicate to block A9 that the fetch request will be handled by the PSCF but that the data will not be immediately available. On the next cycle (i.e. clock cycle 4), the fetch in progress signal A2E comes on and remains on until the delayed fetch is completed. During some subsequent cycle (shown as clock cycle 10), an advance signal A2E is sent by the PSCF to block A9 to indicate that the addressed doubleword (DW) will be provided two cycles after the advance signal A2B. The PSCF provides cycles C1 and C2 during the two clock cycles after the clock cycle in which the advance signal went on, and DW is provided to block A9 during C2. This is shown in FIG. 6 during the intervening clock cycles 11 and 12. The fetch in progress signal A2E remains on while MS is transferring the entire line to the cache. The ADVANCE signal is on during another clock cycle for each subsequent doubleword in the line to be sent to block A9. The advance signals may be on during consecutive clock cycles or they may be separated if interferring conditions occur within the PSCF. Advance signals are not provided to block A9 for doublewords in the line which are not sent to block A9 but only to the cache. Depending on which doubleword of a line is requested, there may be anywhere from one to eight advance signals sent to block A9 during a fetch in progress signal A2E. In some cases, this may be more doublewords than is desired by block A9; and if that occurs, the unwanted data is ignored by block A9. If the additional doublewords following the addressed double word are desired by block A9, then for each received advance signal, block A9 will go through pseudo C1 and C2 cycles. In the example of FIG. 6, respective C1, C2 cycles are provided for each of the three doublewords, DW, DW+8 and DW+16. In order to avoid conflicts in the doublewords being sent on BDBO to block A9, the PSCF will always bring up a PSCF busy signal A2A while it is sending the advance signal A2B to block A9.

Consider next in FIG. 1 the signals which communicate between I DCD block A11 and the operand fetch block A9. Bus A3 includes two signal lines which are labeled in the detailed drawing E and B as OP CTLS NEED PSCF line E18 and OP CTLS BUSY line B36, respectively. Both of these signals serve to conditionally inhibit the decoding of additional instructions. The OP CTLS NEED PSCF signal indicates that no instruction needing to use the PSCF should be allowed to decode, and the OP CTLS BUSY signal indicates that no instruction which needs to use the operand fetch block A9 should be allowed to decode.

Bus A4 consists of a number of signal lines which initiate operand fetching, which are designated A4A through A4H. Signal A4B is a latch signal called DECODE SUCCESSFUL which indicates when a successful decode cycle has taken place. Signal A4A, called the ADDRESS ADDER OUTPUT provides the effective address of the instruction which is decoding. Signal A4C, the LENGTH (LTH) provides an 8-bit binary value one less than the number of bytes in the operand field. Signal A4D, the SS 2nd DECODE CYCLE TGR, is on when I DCD logic has completed the first decode for a six byte long instruction and is now trying to have the second decode. Signal A4E, INSN DOES DST FCH, indicates that a destination operand is to be fetched; it will directly cause the first AOP to be started, and if more than one fetch is needed will cause the destination (DST) controls to be activated. Signal A4E is used only for fetching the first operand of SS instructions and never involves alignment to a different boundary than it is on in storage. A4F, INSN DOES SRC FCH, indicates that a source operand is to be fetched. It will directly cause the first AOP to be started, and if more than one fetch is needed will cause the source (SRC) operand controls to be activated. This is used for fetching the second operand of SS instructions and for fetching the operands of the simpler instructions. Signal A4H, LM DECODE LTH, is on if the instruction is LM. Signal A4G is on if the instruction is NC, OC, CLC, XC, or MVC. Signal A4F, I REG 11 LTH, is on if bit 11 of the instruction is a one. This is used for LM to determine whether the first register to be loaded is even or odd. Signals A4A and A4D are trigger signals which are significant during the decode cycle. The remaining signals are latch signals which have their significant values during latch time of the decode cycle (½ cycle later).

Consider next in FIG. 1, bus A5 from I QUE block A12 to the operand fetch block A9. Signal A5A, the OP BRANCH TAKEN TGR, signals that an instruction is about to be transferred from I QUE block A12 to E FCT block A15. It occurs on the cycle before the first execution cycle of the instruction. Signal A5B, the Q OUTPOINTER LTH, is a two bit binary counter which designates which queue position the next instruction to be executed is coming from. It steps by one in response to OP BRANCH TAKEN TGR signal A5A. Signal A5C, the Q INPOINTER LTH, is a two bit binary counter which designates which queue position the next instruction decoded is to be placed in. It steps by one in response to a DECODE SUCCESSFUL signal A4B, unless the DECODE SUCCESSFUL signal is for the first decode cycle of an SS instruction.

Figure 7:
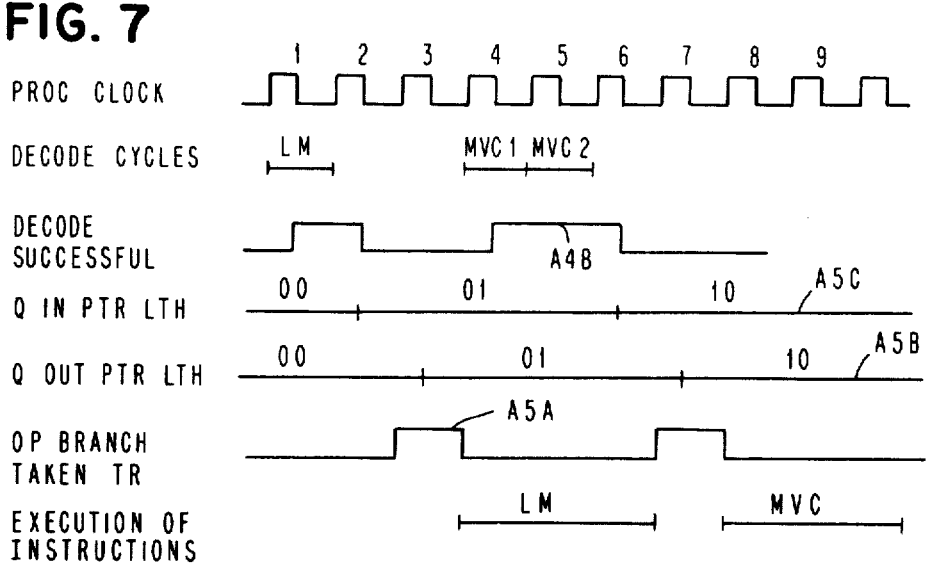
FIG. 7 is a timing diagram for signals on a bus between the I QUE block and the operand fetch block.

FIG. 7 shows an example of one of many possible timings for how LM and MVC instructions might decode and execute. In this example, the LM instruction is held in queue position 00 and the MVC instruction in queue position 01. FIG. 7 also shows the timing relationship for this example between the DECODE SUCCESSFUL, Q INPOINTER LTH, Q OUTPOINTER LTH, and OP BRANCH TAKEN TGR signals.

Consider next in FIG. 1 the busses A6 and A8 between the OPERAND FETCH block A9 and the E FCT block A15. There are two signal lines A6A and A6B in bus A6. Signal A6A designated MS OPND TO A indicates that E FCT block A15 wants to have another operand buffer of SRC data gated to the A register in block A15. Signal A6B, designated MS OPND TO B, indicates that E FCT block A15 wants to have another operand buffer of DST data gated to the B register. These are both trigger signals which occur one cycle before the data is wanted.

There are four signal lines in bus A8. R1 is a data bus from the operand buffers to the A and B registers in E FCT block A15. Signal G17, INGATE TO A, and signal G18, INGATE TO B, are latch signals which cause that bus to be ingated to the A and B registers respectively. An E STOP CLOCK TGR signal of bus A8 causes the clock in E FCT block A15 to stop. It is turned on when some data is desired by E FCT block A15 which has not yet been obtained from the PSCF.

Figure 8:
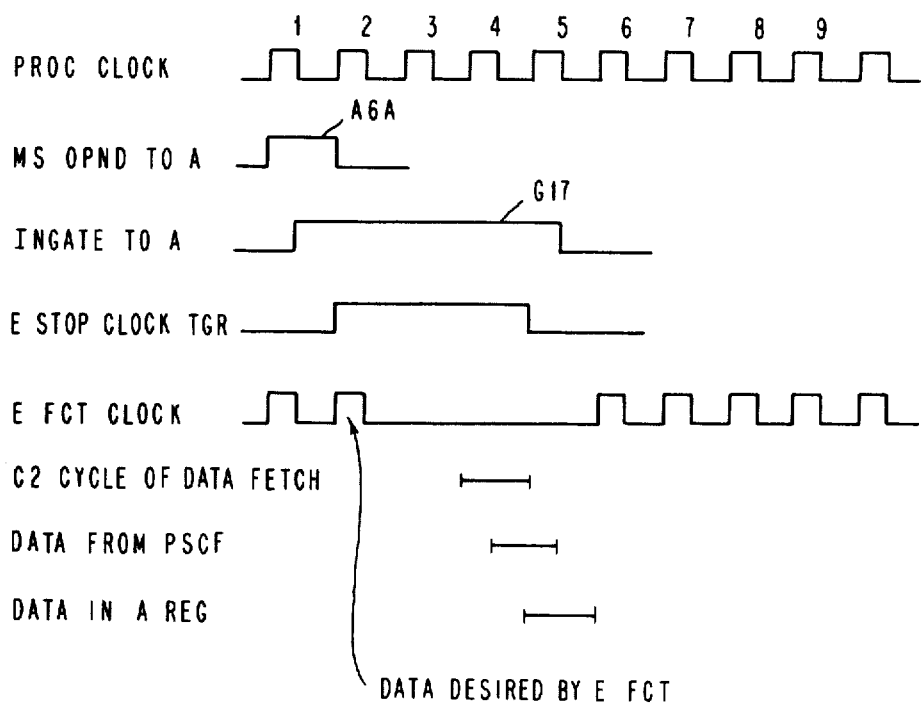
FIG. 8 is a timing diagram for signals on busses A6 and A8 between the E function block and the operand fetch block.

FIG. 8 illustrates an example of the timing for stopping the E FCT clock in a typical situation. During processor clock cycle 1 the signal MS OPND TO A is received which indicates that some data is desired by E FCT block A15. However, in this example the fetch for the data will not have a C2 cycle until processor clock cycle 4, and the data will not be available until the beginning of cycle 5. This is recognized during cycle 1, causing the E STOP CLOCK TGR to be turned on during cycle 2, causing clock pulse 3 to be inhibited in the E FCT block A15. The inhibit condition persists for two more cycles causing the same thing to happen. The INGATE TO A signal pulse G17 in FIG. 8 is held on during this time and causes an ingate to the A register in block A15 each cycle during that time, because that ingating is controlled by a free running clock rather than a stopped one. The last ingate (during cycle 5) coincides with the availability of the desired data. Thus, the desired data appears in the A register at the end of the (prolonged) E FCT cycle during which it was desired.

The instruction queueing logic A12 is capable of holding up to four instructions of which one will be in execution and three will be awaiting execution. These instructions are passed from the instruction queueing logic A12 to the execution function A15 in sequence as fast as the execution function is able to accept them.

When each instruction is passed from the instruction queueing block A12 to the execution function block A15, a signal OP-BRANCH-TAKEN is generated to denote that; and this signal is sent to the operand fetching block A9 among other places and precedes by one cycle the beginning of execution in the execution function block A15. Some instructions can be executed in only one cycle and when those instructions are being processed, a new instruction can be passed from the instruction queueing block A12 to the execution function block A15 every cycle.

The execution function block A15 includes all the logic which is necessary for performing the execution of the instructions, shifting of operands, adding of operands, etc. This logic is controlled by a writable control storage which is set when the machine is initialized and contains the microprograms which determine how each instruction should be executed. The operand fetching block A9 is the principle focus of this invention and includes the logic which is necessary for prefetching operands from the PSCF block A13 and passing them on to the execution function A15 as needed.

The operation of block A9 is initiated by control signals from the instruction decoding block A11 at the time that the instruction which needs the operand fetch is decoded. The operand fetching block A9 includes six operand address pairs AOP-A through AOP-F, previously discussed in regard to FIG. 2. Each of these pairs is capable of addressing a single doubleword requested from the PSCF block A13 and buffering the doubleword after it is received, until it is needed by the execution function block A15. The AOP's are assigned one at a time as needed for fetching of operands. Since many instructions, particularly the SS instructions and load multiple require the fetching of operands which may have many doublewords, there is included within the operand fetch block A9, two sets of controls known as the source (SRC) and destination (DST) controls which are turned on as needed by control signals from the instruction decoding block A11 and which will initiate the operation of the appropriate number of AOP's.

There is a S/370 architectural requirement that the actual sequence in which operands are fetched from storage must be the same as is logically called for by the program. For this reason, there is refetching logic included in the operand fetch block A9 which will cause operands to be refetched if for any reason they get out of sequence. Bus A1 from the operand fetch block A9 to PSCF block A13 includes address lines for sending to PSCF A13 the virtual address which is to be fetched, and control lines signalling how that fetch is to be handled. Bus A2 from the PSCF to the operand fetch block A9 includes doubleword lines for the return of the data and control lines for indicating when the data is available or whether the fetch can be processed immediately or will be delayed. Bus A3 from the operand fetching block A9 to the instruction decoding block A11 is principally a few control lines to indicate when the operand fetch block A9 is busy, so that the instruction decoding block A11 may if necessary prevent the decoding of additional instructions. Bus A4 from the instruction decoding block A11 to the operand fetching block A9 includes address lines for sending the effective address calculated for the instruction and control lines for initiating the operand fetches required for that instruction.

Bus A5 from the instruction queueing block A12 to the operand fetching block A9 includes control lines which inform the operand fetching block A9 of which instruction is about to be executed next so that it may know when operands are needed by the execution function. Bus A6 from operand fetching block A9 to the execution function block A15 includes an eight byte bus from the operand buffers (OP's in FIG. 2) to the A and B register in the execution function block A15; control lines for ingating that information into the A and B registers, and a line E-STOP CLOCK TGR which causes the clocks in the execution function block A15 to be stopped as a means of causing it to wait when the data it requires is not yet ready.

Bus A7 from the execution function block A15 to the operand fetch block A9 consists of ingate lines which indicate to the operand fetch block A9 that an additional doubleword is needed by the execution function block A15.

Figure 9A:
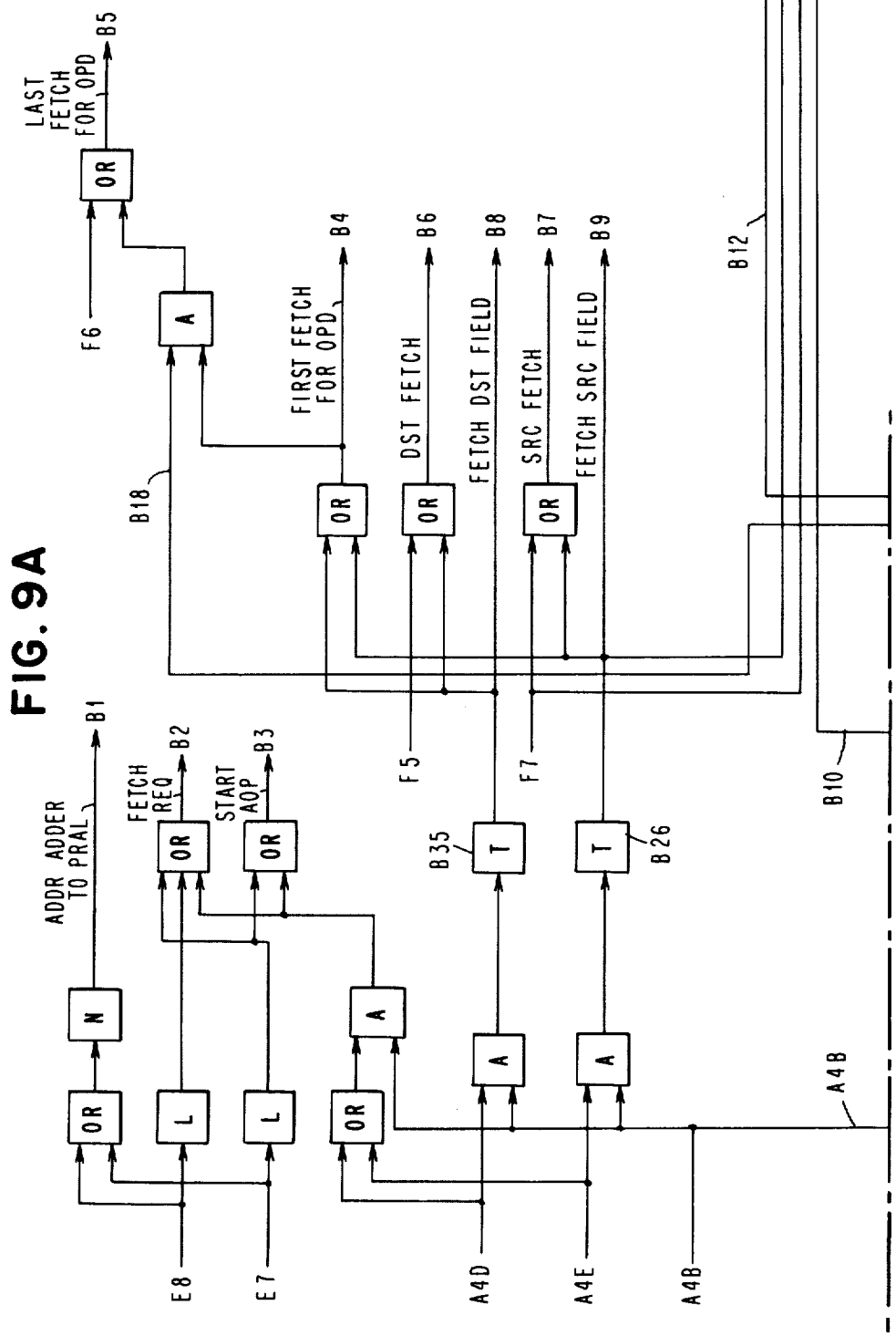

FIGS. 9A, B, C, and D depict several logic circuits which are principally related to the initiation of operand fetching and the processing of signals received from instruction decode block A11. Line A4B sends a DECODE SUCCESSFUL signal at latch time of the cycle during which an instruction is decoded in block A11. Line A4B is also sent to other places involved in the initiation of operations in the operand fetch block A9. At the same time, that signal A4B is received, a number of other signals may be received to initiate other operations. Among them, a signal on line A4D indicates that this instruction will be doing destination fetching, and a signal on line A4E indicates that this instruction will be doing source fetching. At the same time, the address will be available from the instruction decode block A11, and will be gated to PRAL in FIG. 11. Also available at the same time are signals on line A4E which is bit 11 of the instruction, and on lines A4C in FIG. 9C which provides an 8-bit value which is one less than the number of bytes contained in the storage operand which is to be fetched.

On the cycle after a DECODE SUCCESSFUL signal on line A4B (which caused the operand fetch block A9 to be initiated), it is necessary for the block A9 to determine how many doublewords must be fetched in order to satisfy the requirements for the instruction. For this, it uses the operand length value on line A4C which is fed into a length register B15 in FIG. 9C, and the low-order three bits of the address which are gated into processor address register (PRAR) B16 at the beginning of the following cycle from PRAL D2 in FIG. 11 at latch time when the instruction is decoded. The low order three bits of the address locate the first byte of the operand relative to the doubleword boundary to the left of this byte. A duplicate fetch signal B10 is provided when required to indicate when an additional fetch must be performed from the first doubleword location on an operand.

Figures 13, 13D:
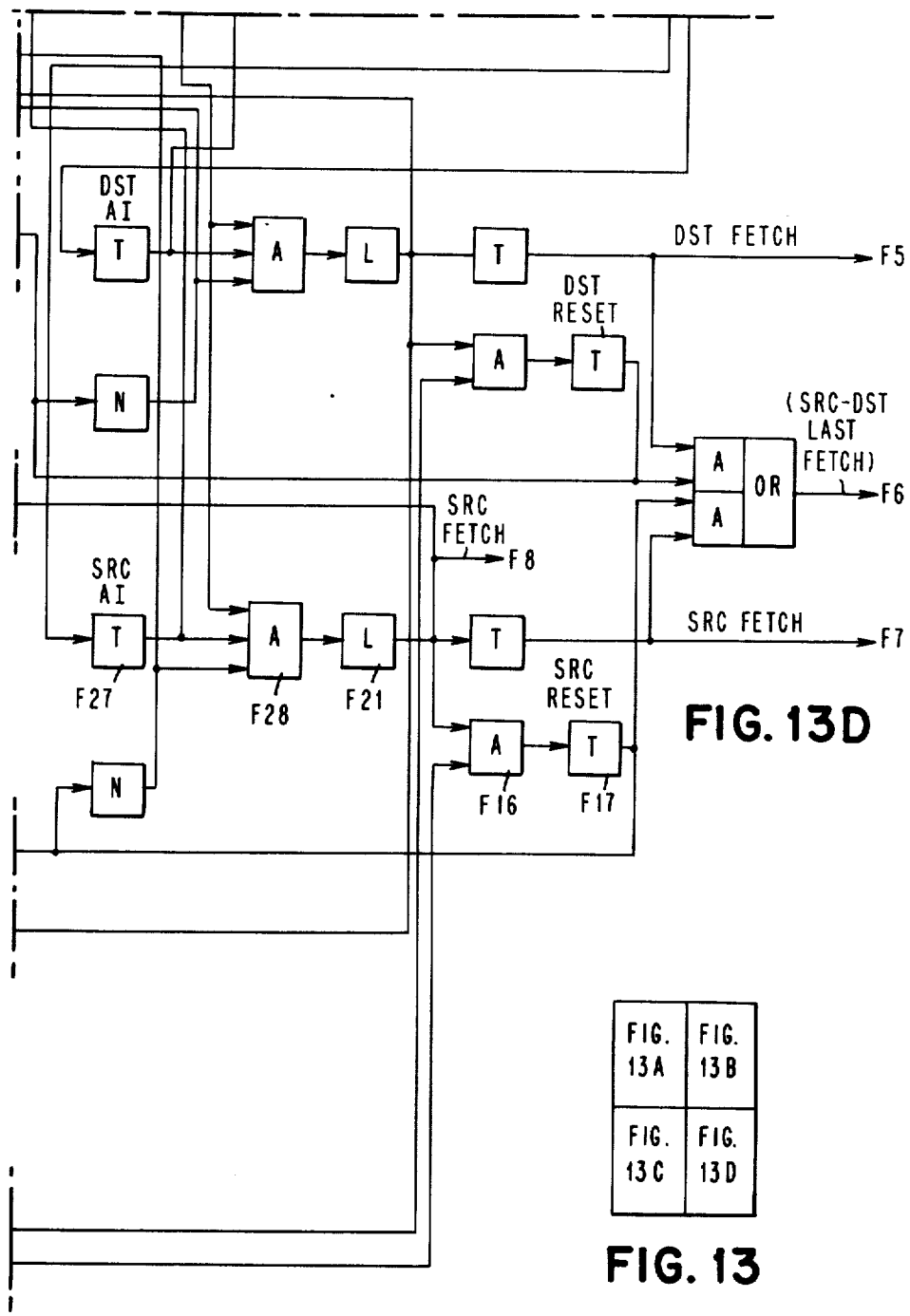
FIGS. 13A, 13B, 13C and 13D show SRC - DST controls.

Adder B17 produces a sum of which bits 23 to 28 provide a number equal to one less than the total number of doublewords which must be fetched for the operand. If the output value is zero (detected by the zero detect B18), then the initial fetch (which is started directly by the DECODE SUCCESSFUL signal) is sufficient. However, if the output value is not zero, then the length output B11 is passed to the source or destination controls in FIG. 13, and those controls are activated to perform the additional number of doubleword fetches required for the operand.

The reason why the operand fetch block A9 includes both a set of source and destination controls for initiating additional AOP's is because some of the SS instructions require the fetching of two independent fields. For those instructions, these controls will be operating simultaneously. One of the differences between the source and destination controls is that it is possible for the source controls to perform alignment of the operand being fetched from storage, whereas with the destination controls, the doublewords which are fetched are always passed as an entity to the execution function A15. However, in the case of the source controls, the doublewords may be shifted to any byte boundary; and data from two different doublewords can be assembled into one operand buffer (OP) and that data provided to the execution function A15 as required.

Figure 9D:
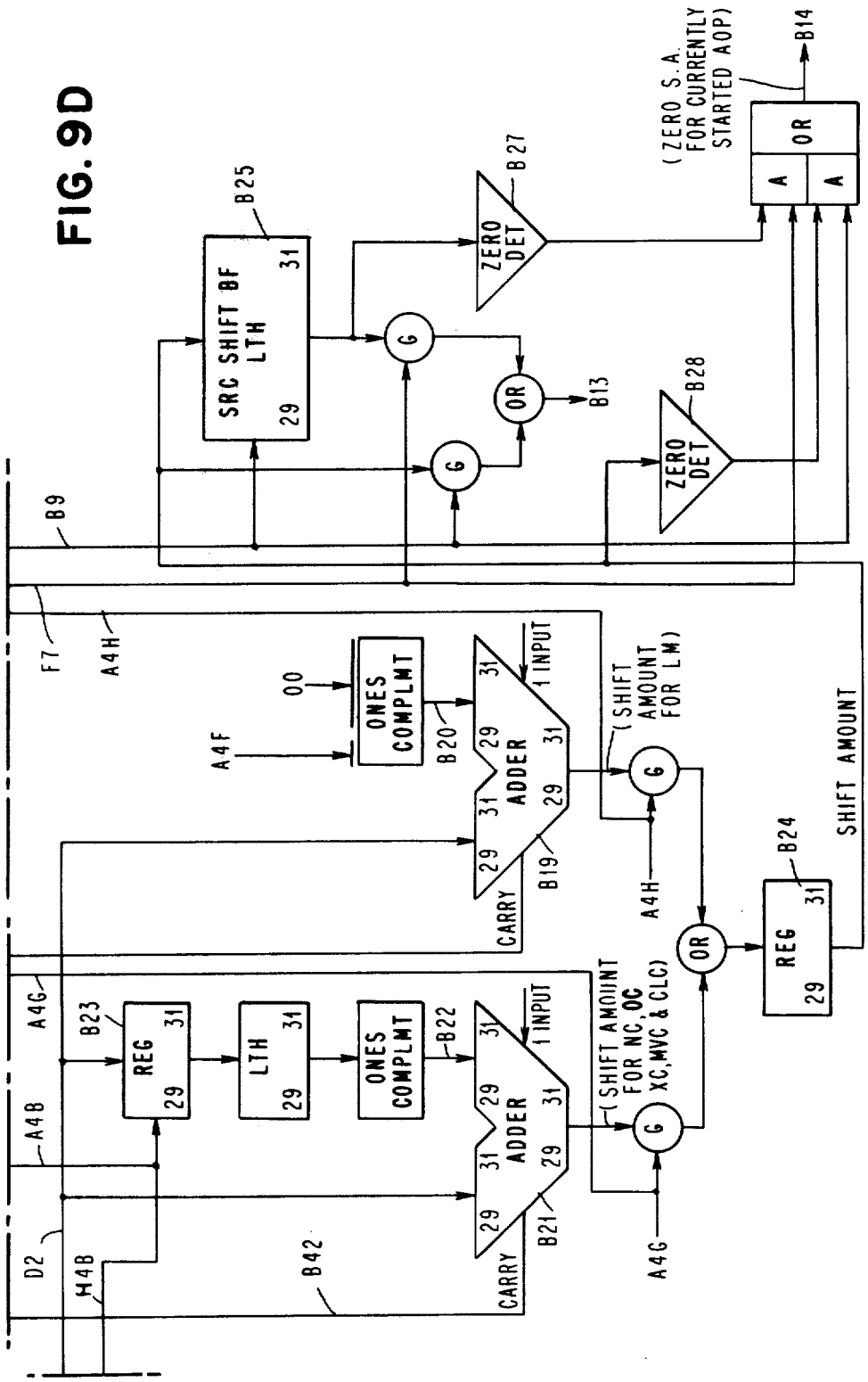

For the SRC controls, the determination of the amount by which the operand must be shifted when the data is returned from the PSCF is made at latch time during the DECODE SUCCESSFUL cycle. In the case of the LM instruction, the three bit adder B19 in FIG. 9D is used. Its right hand input B20 consists of a value formed by using bit 11 of the instruction on line A4F (which is on if the first general register being loaded is odd) and with two zeroes catenated on the right input, their complemented value is outputted on line B20. The left hand input D2 to adder B19 is the low-order three bits of the effective address of the LM instruction. The effect is to subtract the byte location of the first byte of the operand to be placed in the A register of block A15 from the byte location of the first byte found in storage. The adder output is the amount by which the operand needs to be shifted to the left. A carry produced from position 29 of adder B19 indicates that the number of bytes in the first doubleword to be provided to E function block A15 is equal to or greater than the number of bytes obtained during the first fetch from storage. In this particular situation, the next fetch performed by the source controls should be for the subsequent doubleword in storage. However, if a carry is not generated from position 29, this means that more bytes will be obtained from the first fetch from storage than will be provided to the E function A15 of the first ingate. This is a duplicate fetch situation.

Adder B21 in FIG. 9D is used to determine the shift amount for MVC, NC, OC, XC and CLC instructions. Its functioning is the same as described for B19 for the LM instruction, except that the right hand input B22 is the low order bits of the first operand location. These are obtained from register B23 which was set at the previous DECODE SUCCESSFUL which was for the first operand of that instruction. The outputs of adders B21 and B19 are gated respectively by two signals A4G and A4H to a register B24 which is set at the beginning of the cycle following the decode and which contains the shift amount. These two gating signals A4G and A4H respectively identify that the instruction which was just decoded is an MVC, NC, OC, XC or CLC instruction or is an LM instruction. The shift amount from register B24 is ingated to a three bit source shift buffer latch B25 if trigger B26 (in FIG. 9A) is on which indicates that this decode cycle initiated the source fetching. The value will remain in buffer latch B25 until a new DECODE SUCCESSFUL signal is obtained for another instruction needing source fetching. The signal in latch B25 is gated to a bus B13 every time the source controls do a source fetch which is indicated by a source fetch trigger signal F7 from FIG. 13. Signal B9 from trigger B26 gates the register B24 directly to bus B13 for the first fetch resulting from the DECODE SUCCESSFUL signal. Bus B13 outputs shift status bits associated with the AOP's which will be described later. A zero detector B27 connected to the output of latch B25, and a zero detector B28 connected to the output of shift register B24 ar funneled to a line B14. The signal on line B14 indicates that no shifting is to be performed for this source fetch and allows the data from a particular OP buffer to be made available to the E function A15 as soon as its AOP completes its fetch without waiting for the fetch of the subsequent AOP. The two carry signals B41 and B42 respectively from the adders B19 and B21 feed to a funnel circuit B29 which combines the overflow signals with the appropriate decode signal A4G or A4H for the type of instruction being performed and with the DECODE SUCCESSFUL signal to turn on a duplicate fetch trigger B30 which indicates that a duplicate fetch must be performed for this source operand. Trigger B30 outputs to controls for the duplicate fetch logic, and also to adder B17 which determines the number of fetches to be performed. In the case of the MVC, NC, OC, XC, or CLC instruction, a duplicate fetch condition is indicated by a signal on line B31 from a latch B32. This is a special signal which is used to suppress the duplicate fetching for the case where the destination field (first operand) is all contained within one doubleword. In that case, even if the operands are aligned so that they would normally need duplicate fetching, none is required. This signal from latch B32 may be controlled by a trigger B33, which is set during the first decode cycle of an SS instruction if the first operand has more than one doubleword. Latch B32 is set if the trigger B33 is on, or if a trigger B34 is on and signal B12 indicates more than one doubleword is to be provided. The trigger B34 is set if we have a DECODE SUCCESSFUL signal and a decode that this is an MVC, NC, OX, XC or CLC instruction and if it is not the second decode cycle for that instruction. The latch B32 and trigger B33 remain on until the next DECODE SUCCESSFUL signal which causes them to be reset.

The signals on lines B4, B5, B6 and B7 are trigger signals which are of significance during the cycle that an AOP is started. These trigger signals provide information related to the operation that should be performed by that AOP. First fetch signal B4 indicates that the current fetch is the first one in the operand being fetched from a particular field in main storage. Last fetch signal B5 indicates that the current fetch is the last one in the operand. Destination fetch signal B6 indicates that the current fetch is being made by the destination controls, and source fetch signal B7 indicates that the current fetch is being made by the source controls. Either line B6 or B7, but not both, are on for all fetches. Lines B4 and B5 may be on in any combination, depending on the fetch position in the sequence.

Figure 12:
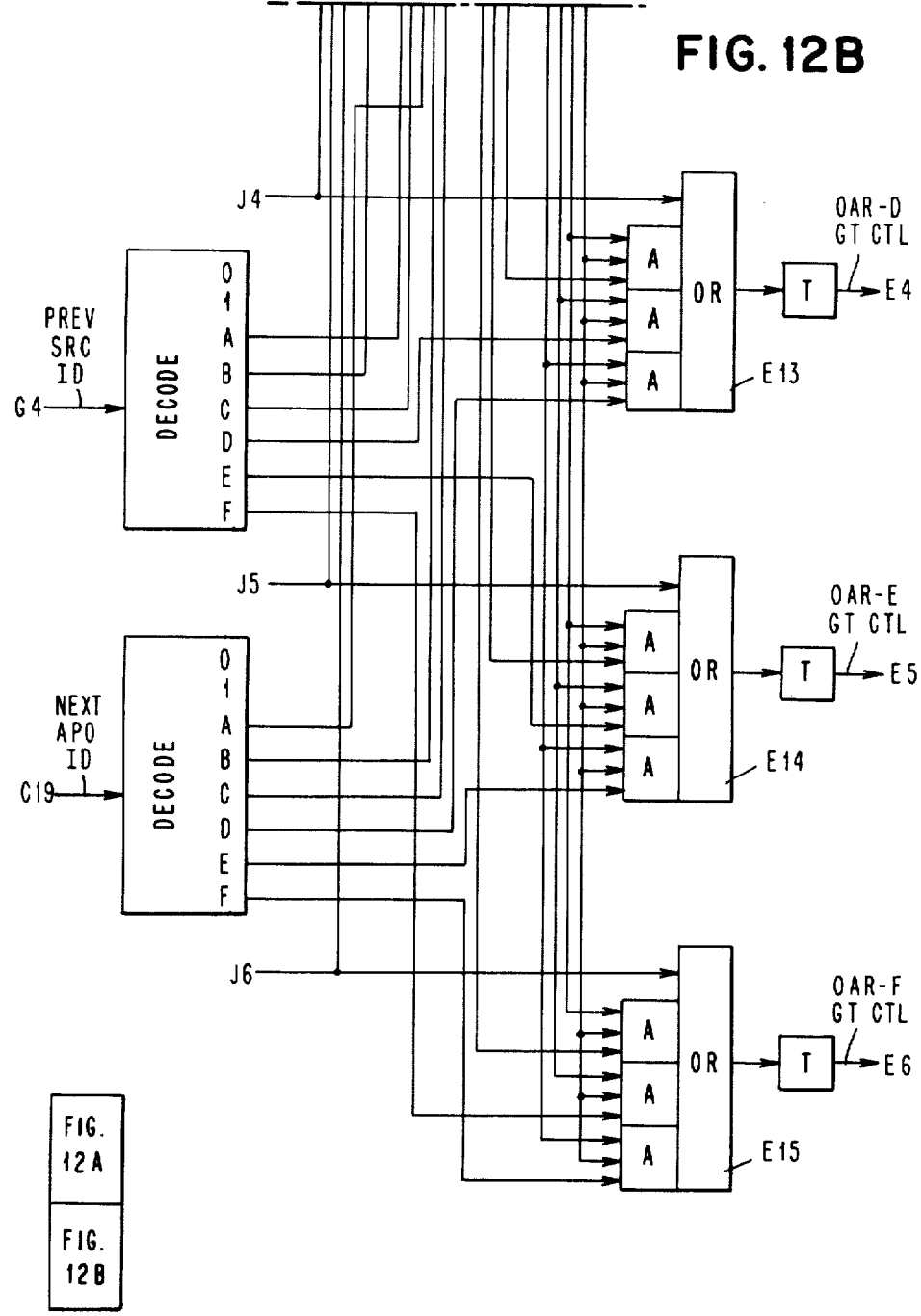
FIGS. 12A and 12B depict OAR gate control triggers.
Figure 12:
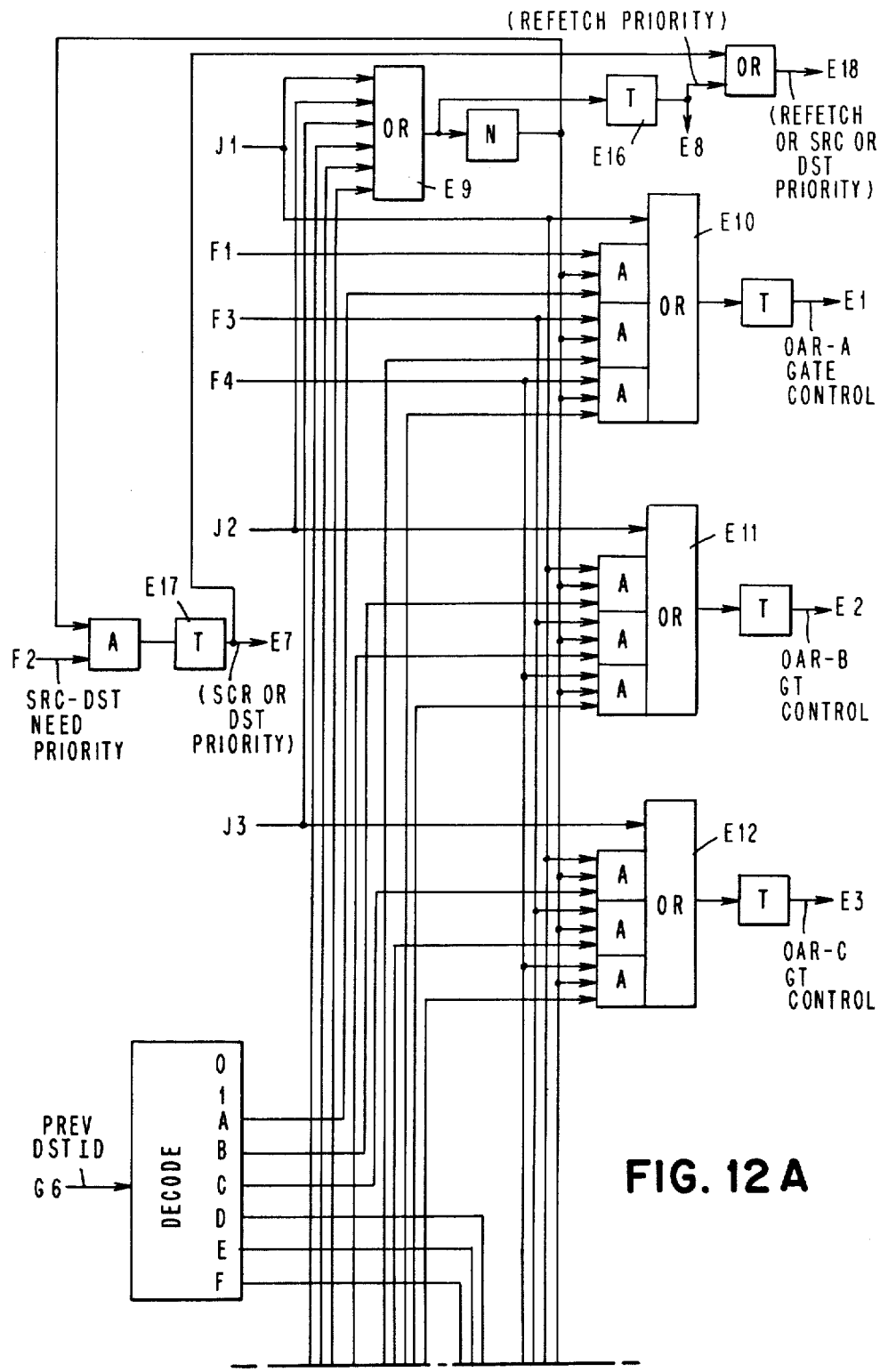

A refetch priority signal E8 from FIG. 12 indicates that during this cycle, the address incrementer is being used to perform a refetch, which is the highest priority operation that can be performed. Signal E8 causes line B1 to be off (so that the address will be taken from the incrementer latch) and causes the signal B2 to be turned on at latch time indicating a fetch request to the PSCF A13. SRC-DST priority signal E7 indicates that either the SRC or the DST controls are using the address incrementer during a cycle for a fetch. This is the next highest priority operation. Signal E7 also causes line B1 to be off (so that the address will be taken from the incrementer). It causes the fetch request to PSCF line B2 to be turned on at latch time and also causes the start AOP line B3 to be turned on so that an AOP will be started for this fetch. If either line A4D or A4E from the instruction decoder block A11 comes on with a DECODE SUCCESSFUL signal, it will cause lines B2 and B3 to turn on. However, it will not cause line B1 to turn on so that the address will be taken from the address adder.

Figure 11:
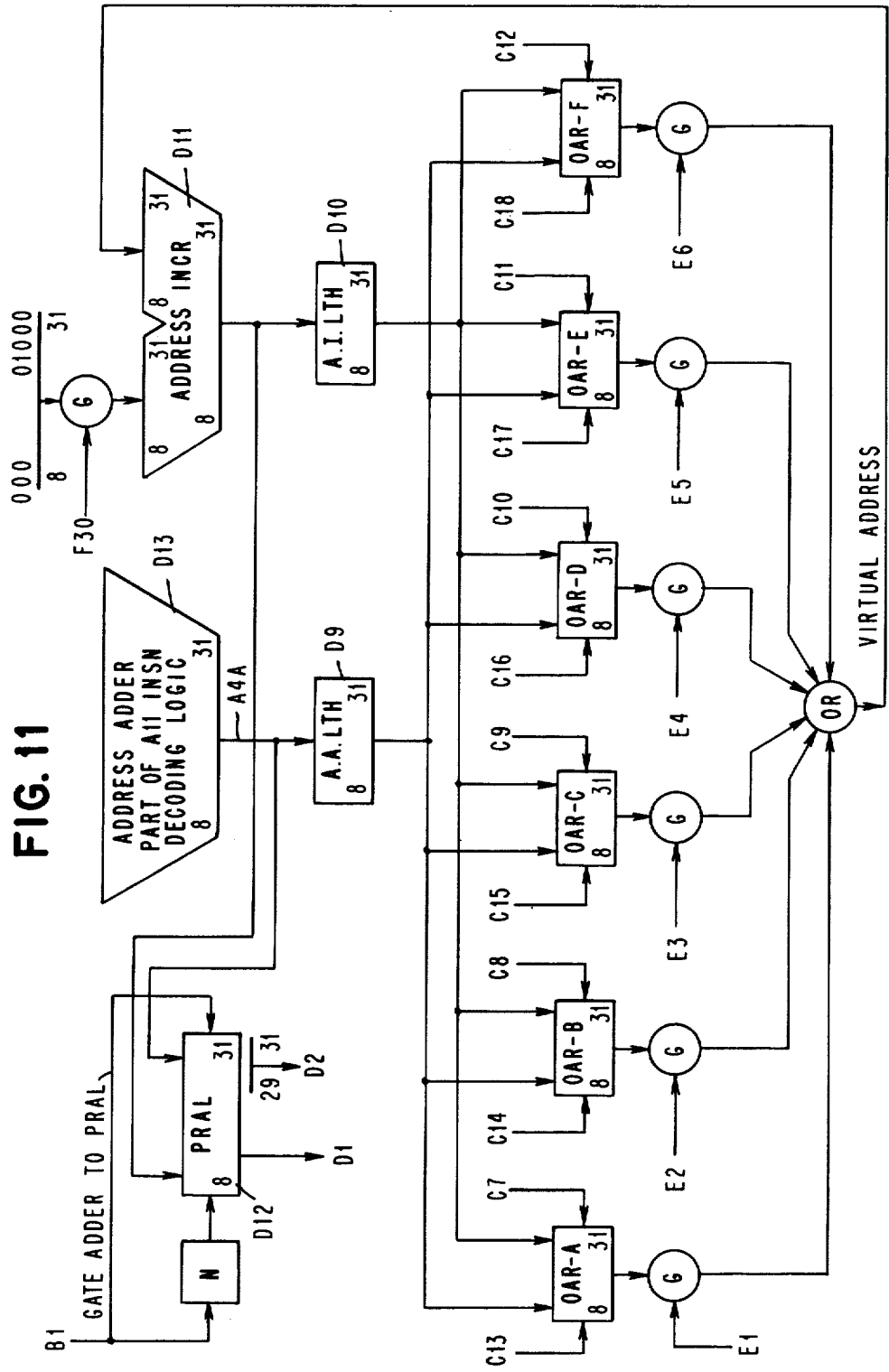
FIG. 11 illustrates address data flow.

FIGS. 10A and 10B contain logic which keeps track of which AOP's are busy and determines which AOP should be started next when it is necessary to start one. Each of circuits C(A) through C(F) contains the start trigger and busy trigger and latch for a corresponding AOP-A through AOP-F. The following description for C(A) is identified for each of C(B) through C(F). In C(A), a busy trigger C20 and latch C21 are the AOP-A busy trigger and latch. They are on when AOP-A is busy, and they are off when AOP-A is not assigned and available for use. The signal to turn them on comes from AND circuit C22 (which is activated whenever signal B3 from FIG. 9A starts an AOP) and an output A from decode circuit C23 is on indicating that AOP-A is the next one to be used. The signal from AND circuit C22 simultaneously turns on start trigger C24 which comes on for one cycle when AOP-A is being started. An AOP-A reset signal on line K1 comes on for one cycle when AOP-A is no longer needed and it causes latch C21 and trigger C20 to be turned off to indicate AOP-A is unassigned. When latch C21 is on, it inhibits C7 and C13. In FIG. 11, lines C7 and C13 respectively control ingating to OAR-A in AOP-A from the incrementer latch D11 or the adder latch D13. When AOP-A busy latch C21 is off, either signal C7 or C13 will be outputted depending on the state of line B1 whether incrementer D11 or address D13 gate to OAR-A. Thus, whenever an AOP is not busy, its OAR may be ingated on every cycle from either the address incrementer D11 or the address adder D13 in FIG. 11 depending on the state of line B1. Then, when the AOP is started, ingating is stopped, and the last value which was ingated is the OAR value desired in that AOP. The circuits and operation described for circuit C(A) is replicated six times, once for each of the AOP's.

Circuits C25, C26 and C27 examine the state of the start and busy triggers and make a determination as to which AOP should be started on the next cycle if there is a start AOP signal B3 active from FIG. 9A. The operation of these circuits is to examine AOP-A first and if it is available, to use it; then to examine AOP-B and if it is available, to use it; then to examine AOP-C and use it if it is available and so forth through AOP-F. The outputs of circuits C25, C26 and C27 respectively provide bits 0, 1 and 2 of a three bit ID which identifies which AOP is to be used next. The encoding of this ID is that a value of two indicates AOP-A; a value of three indicates AOP-B; a value of four indicates AOP-C; etc., through a value of seven which indicates AOP-F. The generated ID value is placed in the use ID latch C28, which feeds the ID back to decode circuit C23 which determines which start and busy trigger should turn on if a start AOP signal B3 is received.

The three bit encoding for AOP ID's is standard throughout this embodiment. The decoder outputs A-F respectively correspond to the binary AOP ID codes 010 through 111 (i.e. 2 through 7). The same convention applies to all decoders and encoders found in this embodiment.

FIG. 11 depicts the virtual address handling in operand fetch block A9. The six OAR's (in their respective operand address pairs AOP-A through AOP-F) are shown. They may be ingated from either the address adder latch D9 or the address incrementer latch D10 under control of the signals C7 through C18 provided from FIGS. 10A and 10B.

The effective address received by latch D9 in the operand fetch block A9 is provided over line A4A from the instruction decoder block A11, which calculated the effective address at the time the instruction was decoded.

The address in the address incrementer latch D10 originates from the address incrementer D11 and represents the processing of addresses internal to the operand fetch block A9. When it is necessary for the block A9 to refetch an address, the address incrementer is used as a path for getting the address from the appropriate OAR to PRAL D12. In this case, the signal F30 is absent so that nothing is added to the address, and signal B1 is also absent so the address is gated to PRAL. Thus, the address is sent off to the PSCF again without any change. Also, in this case another AOP is not started since the purpose is to repeat a fetch for an AOP already started. The other purpose for incrementer D11 is to provide an address for starting a non-busy AOP by the source or destination controls. In this case, the AOP which was started most recently by the source or destination controls is gated to the address incrementer and from there is gated to PRAL D12 for providing a new fetch request to the PSCF, and also to latch D10, and from there to whatever AOP is being started next. Normally, when the source or destination controls are using the address incrementer in this way, the signal F30 is on so that eight (representing the eight bytes in a doubleword) is added to the address and the fetch is performed from the next higher doubleword. The exception to this, is in the case of a duplicate fetch when the signal F30 is absent so that the same doubleword is fetched again. The signal gate adder to PRAL B1 discussed earlier, controls whether the address to PRAL is taken from the adder D13 or the address incrementer D11, and whether the address adder (A.A.) latch or address incrementer (A.I.) latch is ingated to the OAR's.

FIGS. 12A and 12B show the logic circuits for controlling which OAR in FIG. 11 will outgate an address to address incrementer D11. Output lines E1 through E6 respectively connect to the outgates of OAR-A through OAR-F and receive signals from gate control triggers respectively controlled by funnel circuits E10 through E15 in FIG. 12A, which basically comprise a priority circuit arrangement. The highest priority signals J1 through J6 are received from FIG. 17B and indicate a refetching operation for each of AOP-A through AOP-F. Only one of signals J1-J6 can come on at a time; and if it does, it causes the corresponding gate control trigger output E1-E6 in FIG. 12A to be turned on, and also causes the output of the OR circuit E9 to come on which degates all of the other inputs to funnel circuits E10-E15. It also causes trigger E16 to come on, which indicates on line E8 that the address incrementer is being used during that cycle for a refetch operation. If one of the refetch signals J1 through J6 is not on, then the address incrementer is available for use by the source and destination controls. If either controls wish to use the address incrementer, it will turn on signals F1, F3 or F4 in FIG. 13B. Signal F1 is turned on if the destination controls wish to start a new AOP and that causes the OAR having the previous destination ID on line G6 from FIG. 15 to be gated to the address incrementer. Similarly, signal F3 is turned on if the source controls wish to start a new OAR and this causes the OAR having the previous destination ID on line G6 from FIG. 15 to be gated to the address incrementer. Similarly, signal F3 is turned on if the source controls wish to start a new OAR and this causes the OAR having the previous source ID on line G4 from FIG. 15 to be gated to the address incrementer. Only the source controls are capable of starting new OAR's at a one cycle rate and this requires special operation. In that case, signal F4 is brought up by the source controls (instead of signal F3) to cause the AOP identified by the next AOP ID signal C19 from FIG. 10A to be gated to the address incrementer D11. Signal C19 contains the ID of the AOP which is about to be started, and it is used instead of signal G4 because when operating at a one cycle rate, there would not be sufficient time for the ID of the previously started AOP to get signal G4.

Trigger E17 is turned on to indicate that the address incrementer is being used on this cycle by the source or destination controls; it is turned on whenever signal F2 is present and whenever none of the refetch signals which feed into OAR circuit E9 is present.

Figure 13A:
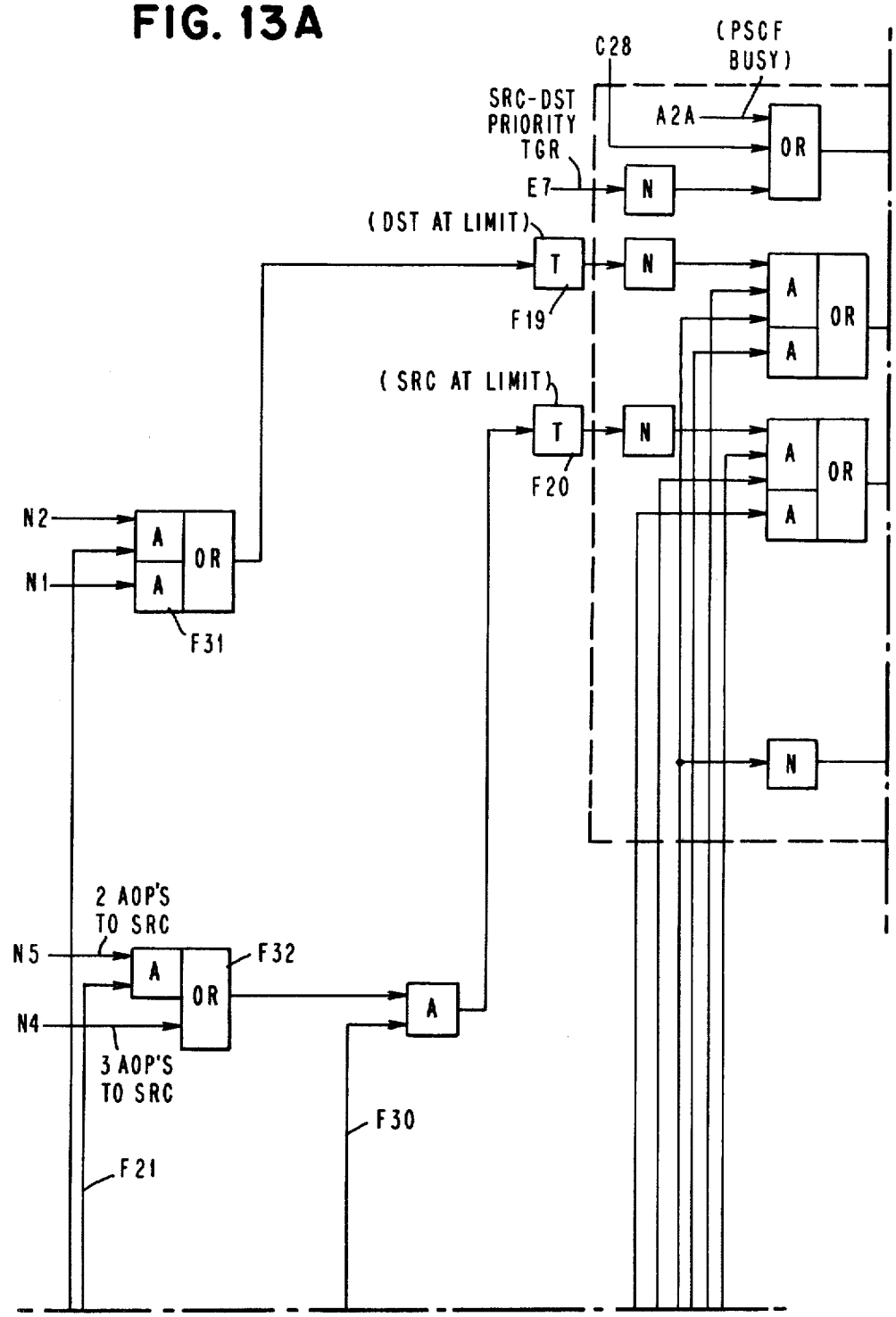
Figure 13B:
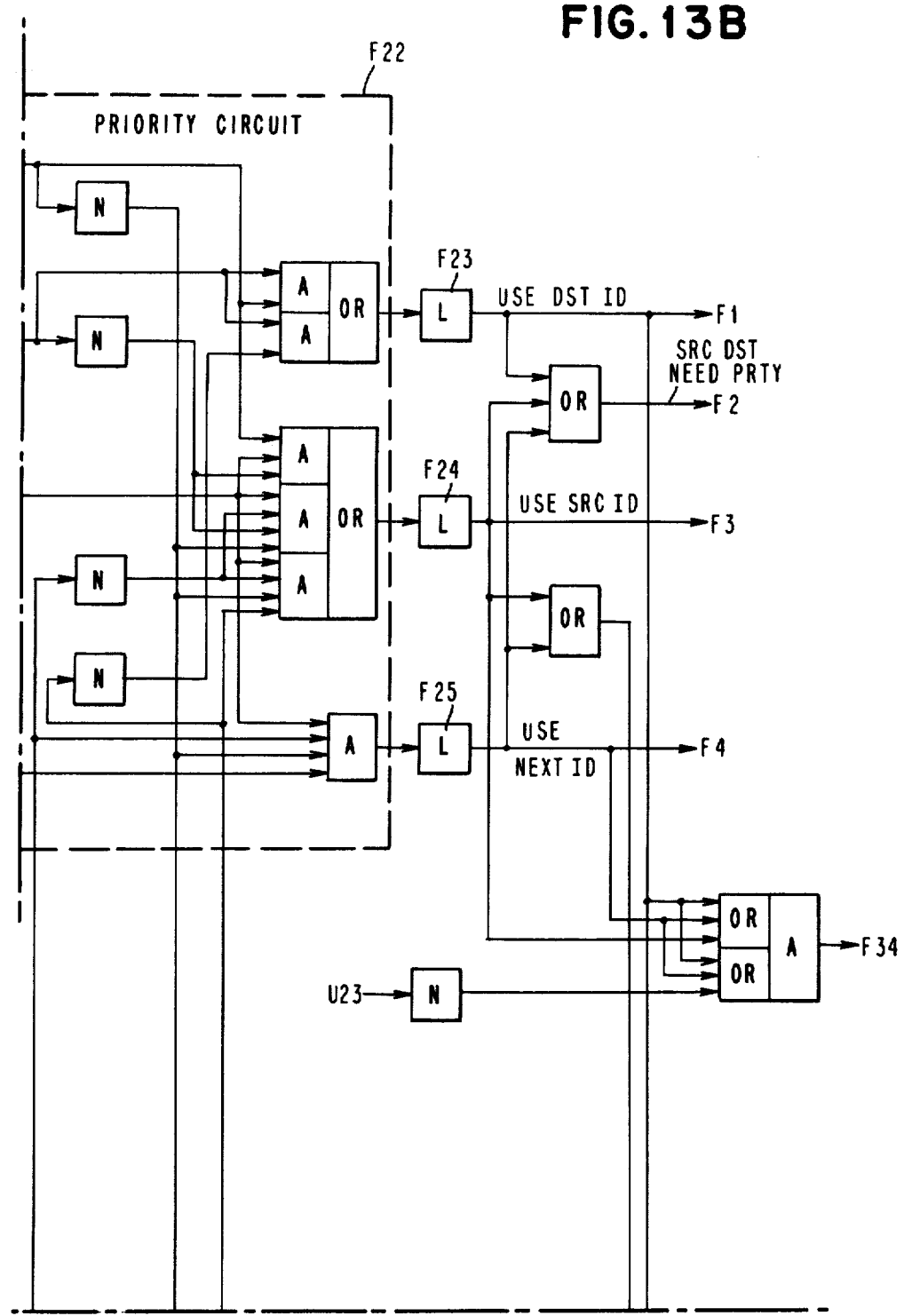
Figure 13:
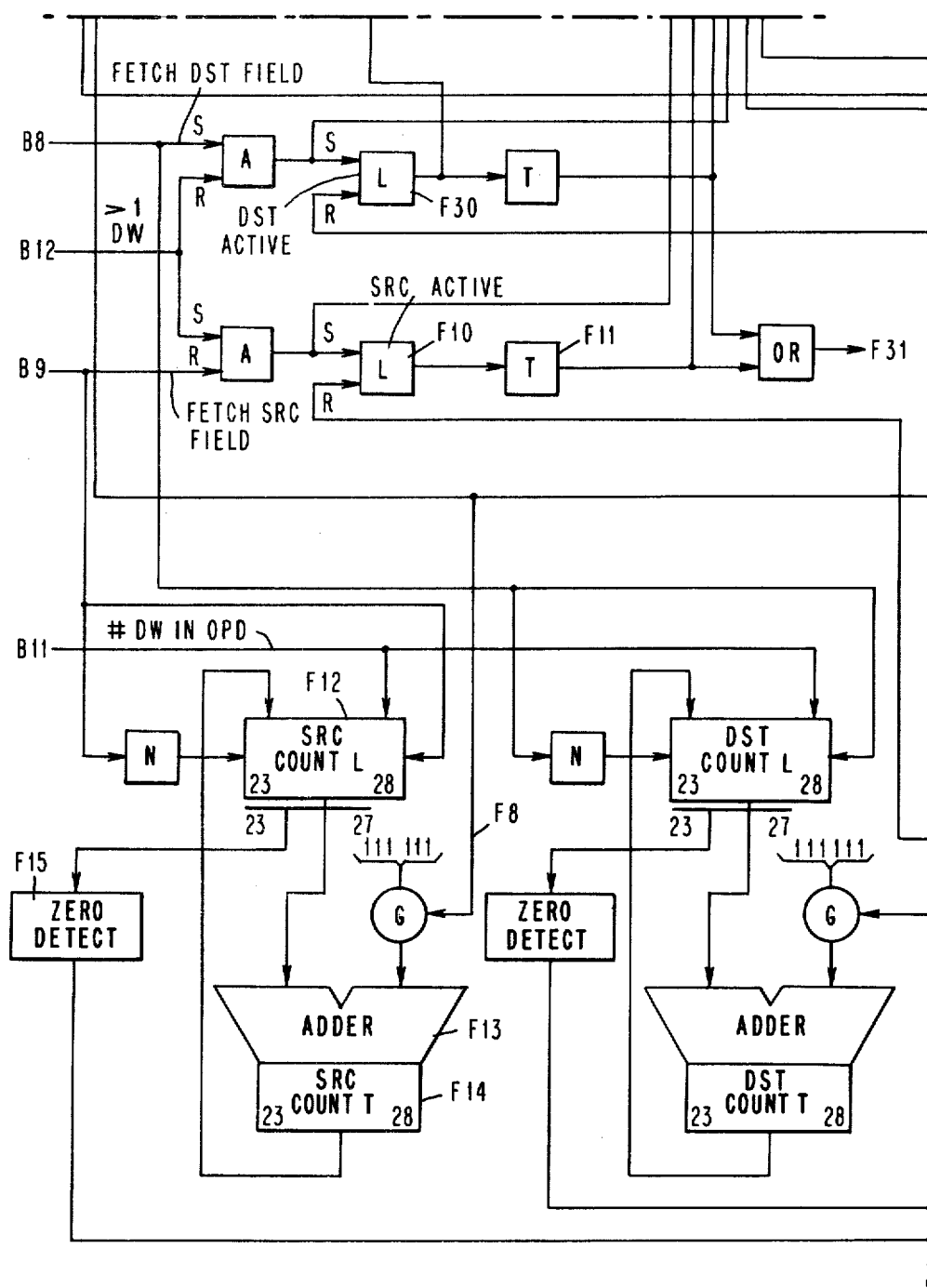

Source and destination controls are shown in FIGS. 13A, B, C and D. They show the principle control logic which controls the starting of additional AOP's when more than one is required to fetch a particular field. The greater than one doubleword signal on line B12 provides the principle control. A fetch SRC field signal B9 sets a latch and trigger F10 and F11 if signal B12 is present on the cycle after the instruction is decoded which requires the source fetching. Latch F10 and trigger F11 remain on as long as source fetching for that field continues. Signal B9 also controls a source count latch F12 to ingate the count signal B11 which is equal to one less than the total number of doublewords that need to be fetched for this operand. This count value then passes through an adder F13, its source count triggers F14, and back into latch F12 on every cycle. Normally, the latch value is unchanged by being passed through the adder. However, if signal F8 from source fetch latch F21 is on (which indicates that a new source fetch has just been made), the doubleword count is decremented by one in adder F12. The zero detect circuit F15 is connected to latch bits 23 to 27 and produces an output when the count gets down to one indicating that only one fetch remains to be done. When that fetch is done, the combination of that zero detect and signal F8 causes AND circuit F16 to output a signal that turns on the source reset trigger F17 which indicates that the source controls are finished with fetching the operand and which causes source active latch F10 to be reset.

When the source reset trigger F17 comes on, it also causes a SRC-DST Last Fetch signal to be sent out on line F6 which indicates that the OAR that is being started on that cycle is for the last fetch of the doubleword sequence being performed for that operand.

In order to prevent a deadlock in the system, it is necessary to limit the number of AOP's that either the source or destination controls can have assigned, so that the other can not be locked out from getting AOP's. In order to implement this limitation, status bits are maintained with each of the AOP's to record which ones are being used for source and which ones are being used for destination fetches. Two signals N5 and N4 are received which indicate respectively that two and three AOP's are assigned for SRC. These signals are combined with signal F21 from the source fetch latch F21 to produce an output from funnel F22 which indicates when three OAR's are committed to source. This signal turns on the source at limit trigger F20 if the destination controls are active.

Similar logic for the destination controls turn on the destination limit trigger F19 whenever three or more OAR's are committed to destination. The turning on of the destination at limit trigger F19 is not conditioned by the source active signal F10. The reason these two are different is because at times the source controls can be run without the destination controls being active for instructions such as MVC and LM. However, the destination controls are never run without the source controls also being run. When either of the limit triggers F19 or F20 are on, the responsible SRC or DST controls can not initiate any more AOP's.

Priority circuit F22 determines whether the source or destination controls will be allowed to use the address incrementer next. These circuits examine the active triggers F10 and F30, the at limit triggers F19 and F20, the address incrementer triggers, SRC-DST priority trigger and PSCF Busy signal A2A. The algorithm implemented is that if both source and destination controls are busy, they will be allowed to operate only every other cycle with the destination controls having priority if neither of them operated the previous cycle. If the destination controls are not active, then the source controls are allowed to operate every cycle.

The output of the priority circuit F22 actuates the use DST ID latch F23 to come on if the destination controls are to use the address incrementer on the following cycle. The use SRC ID latch F24 comes on if the source controls are to use the address incrementer on the following cycle and have not used it on the current cycle successfully. If the source controls have used the address incrementer successfully on the current cycle, and are to use it again on the next cycle, then latch F25 comes on to signal use of the next ID. Signals F1, F3 and F4 go to the gate control trigger logic in FIGS. 12A and 12B to control the gating of the appropriate OAR to the address incrementer and signal F2 goes to the SRC-DST priority trigger to indicate that source or destination controls need priority.

If F24 or F25 comes on, then F26 causes the source address incrementer (A.I.) trigger F27 to come on. This trigger indicates that the address incrementer D11 is being used for a source operand unless a refetch operation had been performed which took higher priority. If simultaneous with this trigger being on, the source reset trigger F17 comes on, or a PSCF busy signal A2A is received, or if the SRC-DST priority trigger E7 does not come on, then this signal is blocked at AND circuit F28. If it is not blocked, then an AOP will be started for the source operand, and the source fetch latch F21 will come on indicating that this is the case. The signal F8 from latch F21, and the signal F7 from the source fetch trigger will participate in getting the AOP associated with this request started properly.

In regard to the circuits described for source operand fetching, there are counterpart circuits for destination operand fetching which operate in the same manner. The only differences are that the destination controls can never operate at a one cycle rate and are always limited at three AOP's whereas the source controls are allowed to operate at a one cycle rate and can use all six AOP's in the case where the destination controls are not active.

Figure 14:
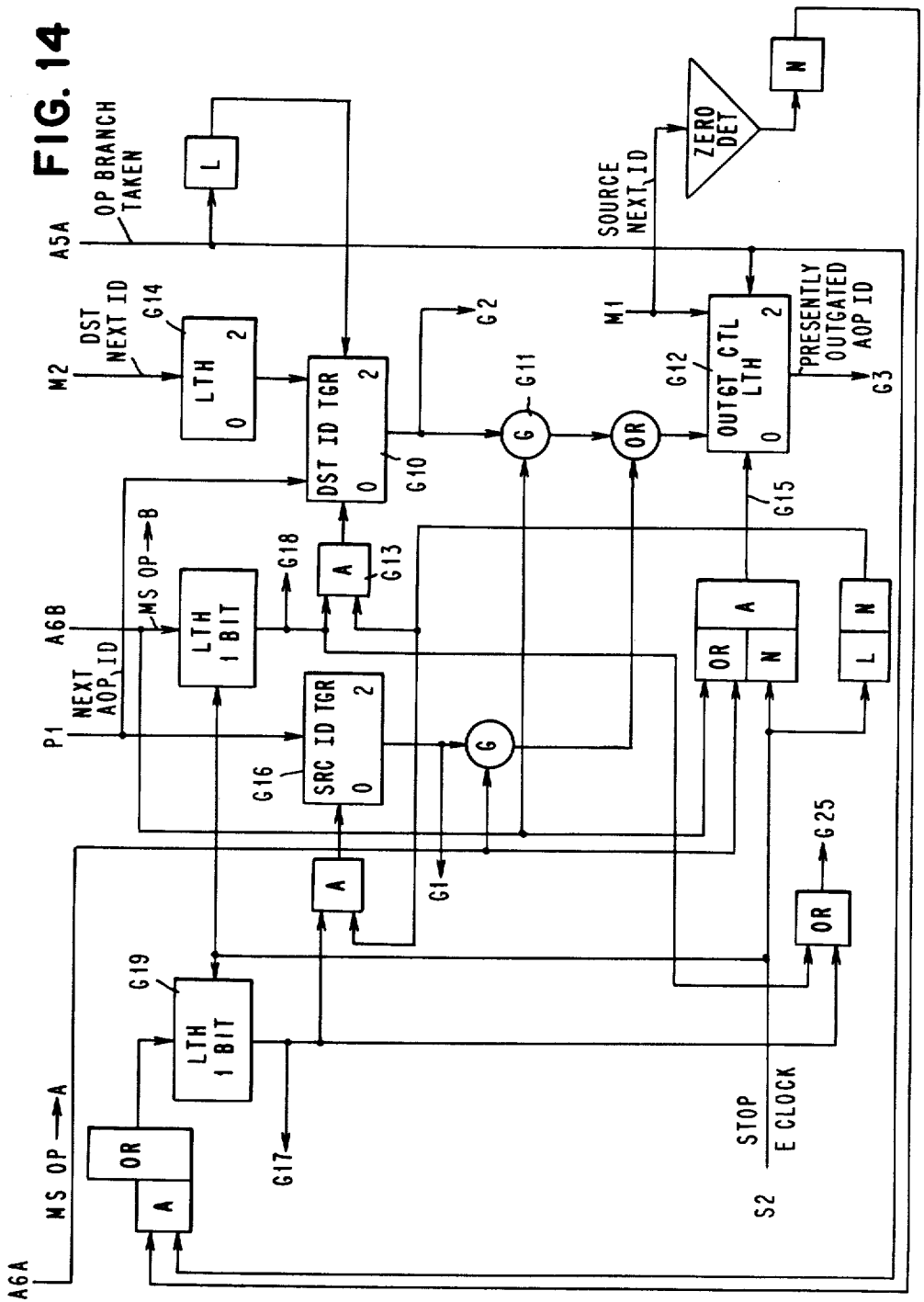
FIGS. 14 and 15 show SRC - DST control IDS.

In FIG. 14, a destination ID trigger G10 holds the ID of the AOP having the OP buffer which is to be provided next to the E function A15 when it requests destination data. At the beginning of execution of each instruction, the OP branch taken signal A5A causes an ingate to G10 from latch G14. If any destination fetching was performed for this instruction, then the controls will provide on line M2 the ID of the first DST AOP in that chain during the OP branch taken cycle. Then when the E function A15 is ready to receive a destination data doubleword, it provides a signal on main store operand to B line A6B. This causes the destination ID trigger G10 to be gated via gate G11 to the outgate control latch G12, which output G3 causes the operand buffer OP in the AOP selected by the ID to be gated to a bus which feeds both the A and B registers in E block A15. If the data has not actually been received back from PSCF block A13, then a signal G15 which controls ingating to latch G12 will cause it to hold its content while the E block A15 clock is stopped on the following cycle, and thus the operand buffer OP will continue to outgate its data to the E function until received by it. The output signal from control latch G12 also is provided to operand fetching logic which determines the next operand buffer in the DST chain and returns on line P1 the next operand buffer ID to send its data to E block A15. The ID value on P1 is ingated into destination ID trigger G10 by the signal on line A6B. This ingate to G10 is inhibited if the E function clock is stopped by AND circuit G13 until the data is available and the ingate is completed.

At the completion of this operation, the first operand buffer OP having DST data has been provided to the E function A15, and the destination ID trigger G10 has been updated to point to the next OP in the chain, so that when the E function signals another ingate, it will receive the next operand buffer OP in the DST chain. The source ID trigger G16 operates in a similar way except that it serves source fetching which was performed for the instruction. It differs because when source fetching is performed for an instruction, the operand fetching logic automatically performs the first ingate to the A register of the E function A15 at the beginning of execution without requiring an explicit signal from E function A15. This is caused by the OP branch taken signal A5A which causes the source next ID M1 to be gated directly into outgate control latch G12 and which also causes latch G19 to come on if the source next ID is not zero and thus causes a signal on line G17 which outgates the operand buffer OP to the A register in E block A15. In the same manner as described for destination operands, the outgate control latch goes to operand fetching logic which causes the ID of the next AOP in the chain to be provided to line P1, which is ingated into G16 by latch G19.

The handling of E clock stopping is the same as for destination operands, and subsequent operand ingates to register A in the E function A15 are signalled by A6A which causes operations identical to that for the destination ID.

Figure 15:
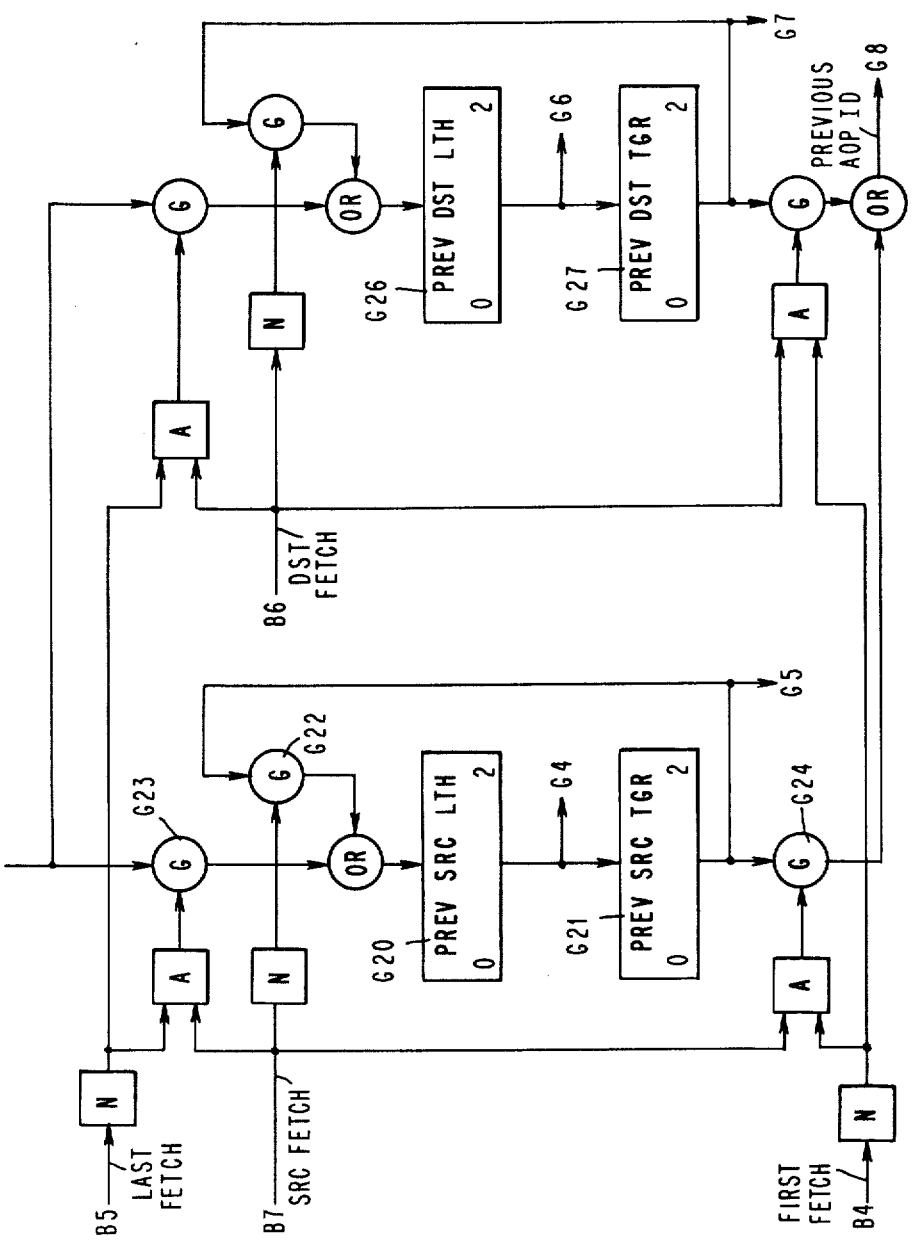

In FIG. 15, the previous source latch G20 and trigger G21 identify the most recently started AOP in the chain which is being generated presently by the source controls. Normally, when there is no source fetch signal B7, the ID feeds back from G21 through gate G22 so that the value is held indefinitely in G20 and G21. When a source fetch signal B7 does occur, it enables gate G23 to allow the ID on line T2 of the AOP which is being started to be gated into the previous source latch G20, unless the last fetch signal B5 is on in which case gate G23 is blocked and a zero value then is gated into the previous source latch G20. Part of the status information that is retained by the controls of each AOP is the ID of the previous AOP in the chain. This information is provided to the AOP controls via a signal G8. For the source controls, it is gated to G8 through gate G24 by the source fetch signal B7, unless this is the first fetch of the chain in which case the signal B4 is on and causes that gate to be blocked. Thus, the first AOP in the chain has a previous ID of zero, indicating that there is no previous AOP, and the other AOP's in the chain will have a previous ID of whatever the previous AOP is. The previous destination latch G26 and previous destination trigger G27 operate in an identical manner.

The architecture of System/370 places a constraint on the operation of the processor such that all operand fetches for instruction "n" must be performed before any operand fetches for instruction "n+1", and further that for certain instructions which have operands extending over multiple doublewords, the operand fetches must be performed in the sequence from the lowest to the highest.

Figure 16:
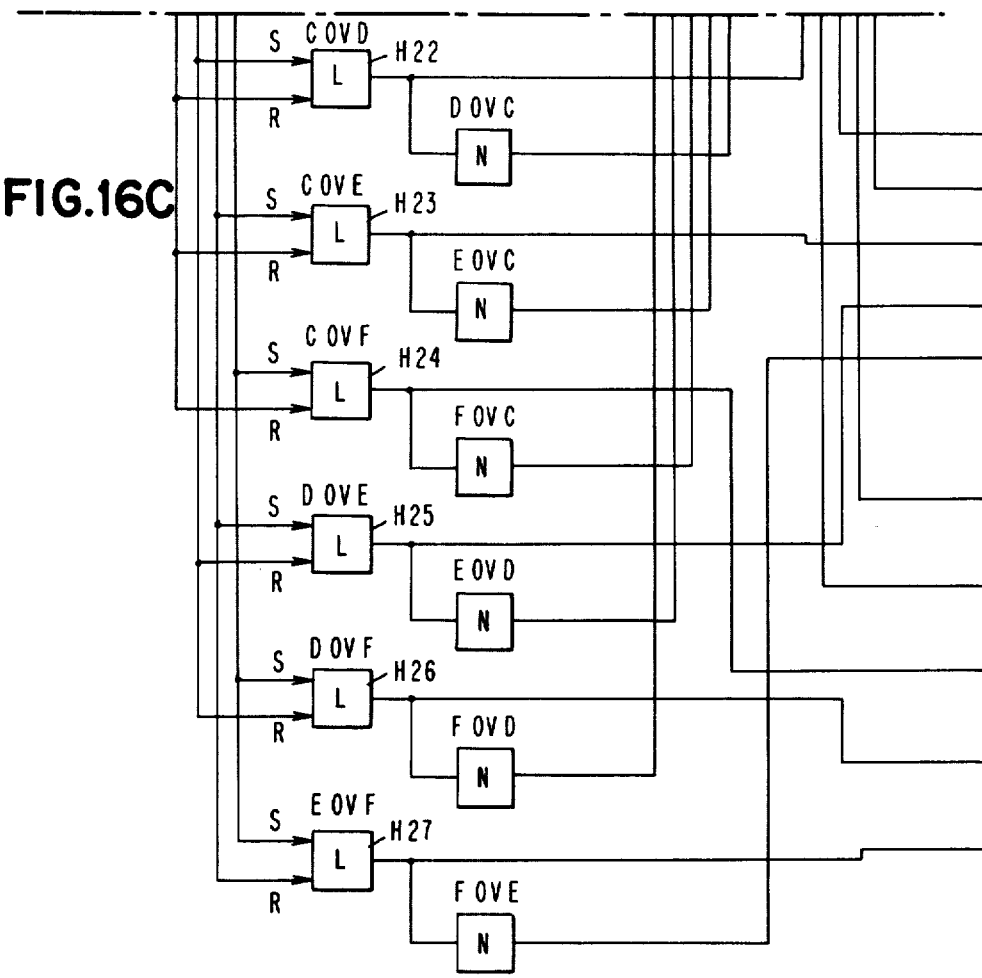
FIGS. 16A, 16B, 16C and 16D illustrate least recently used logic circuits.
Figure 16A:
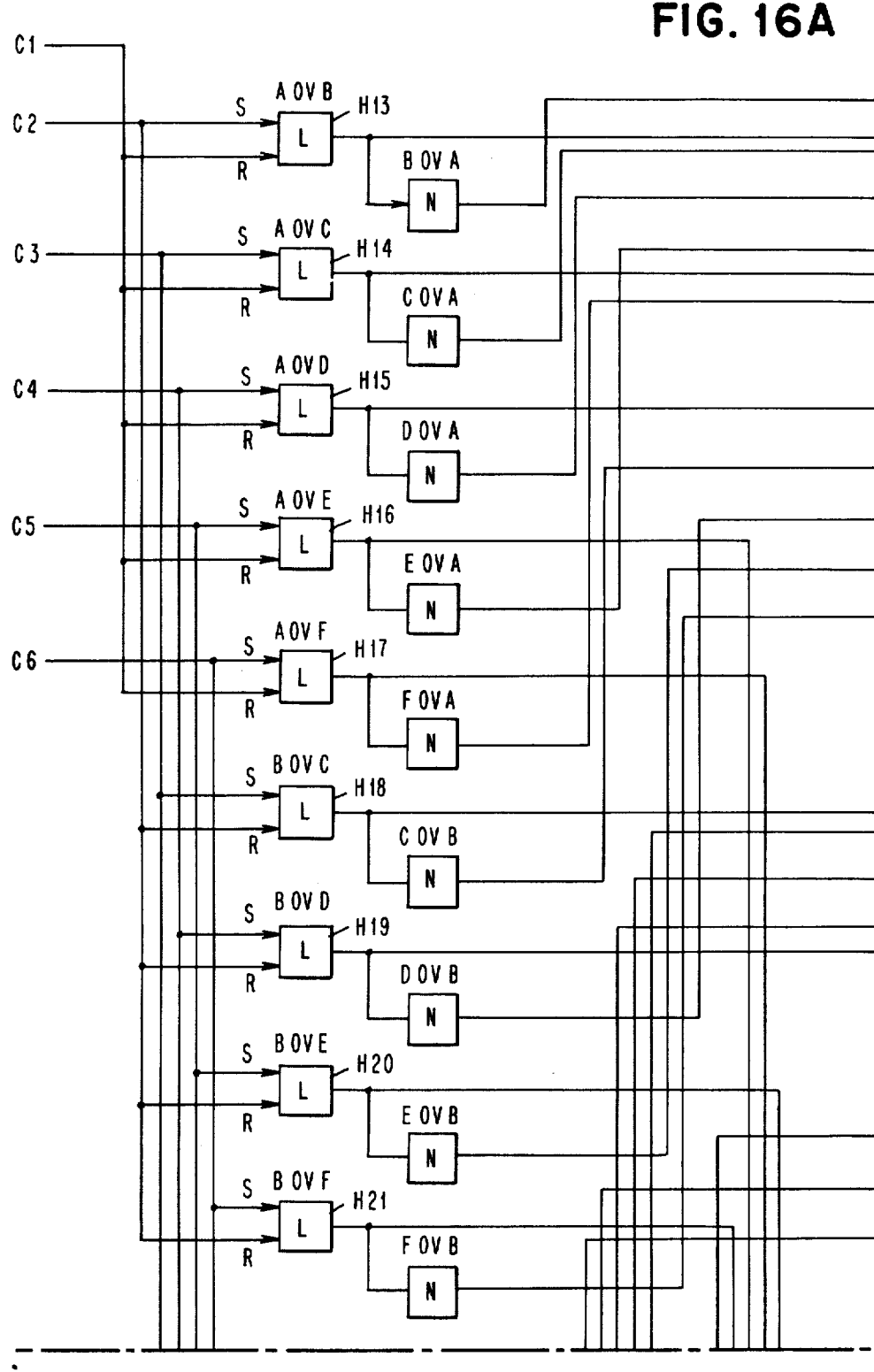
Figure 16B:
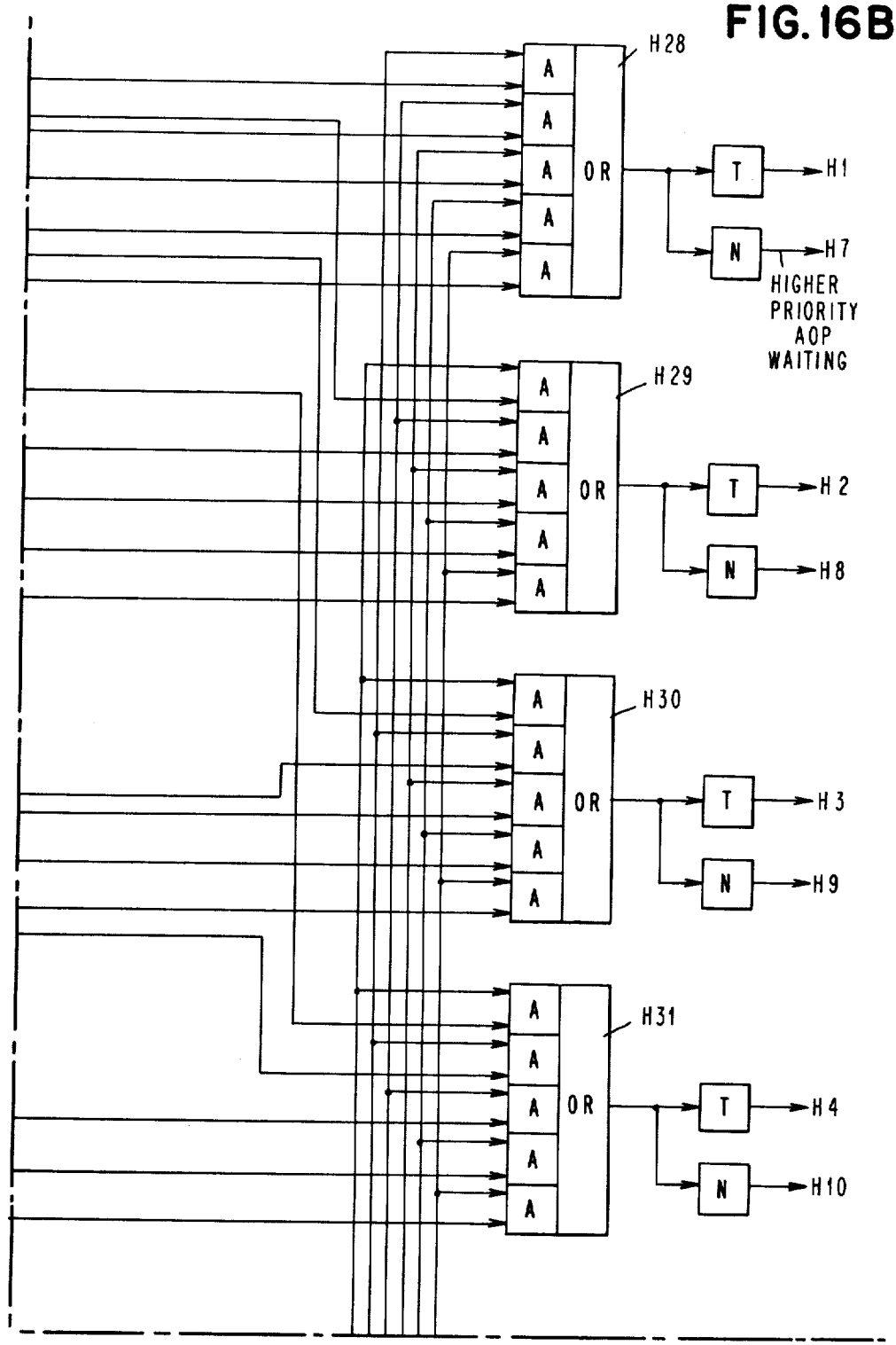
Figure 16D:
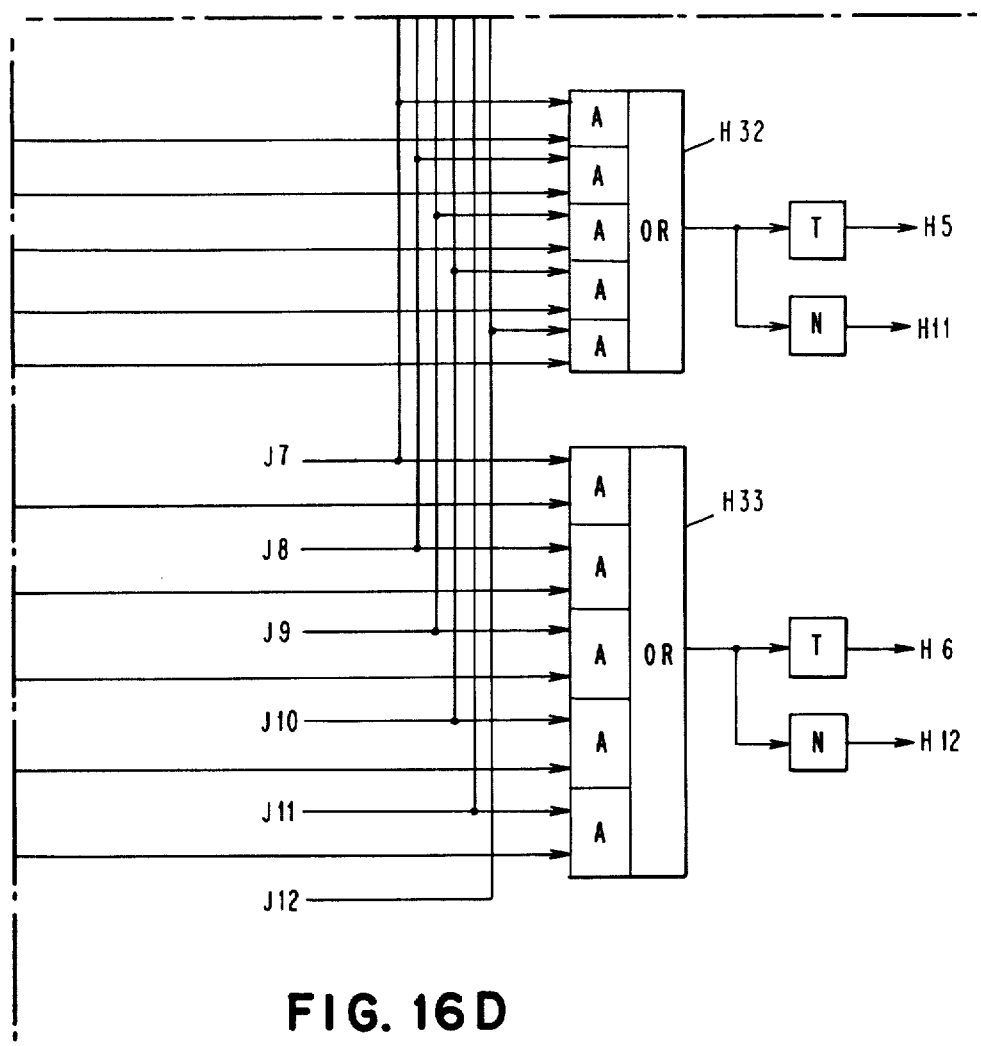

The way the operand logic is constructed, the AOP's for each operand fetch will be started in the correct architecturally called for sequence. However, it is possible with some data being available from the cache and some requiring fetches from main storage that the apparent order in which doublewords are fetched could be different than that in which the AOP's are started. For this reason, a mechanism called sequencing reject (which will be discussed later) is implemented in the operand fetch block A9. In order to be able to insure that fetches are performed in the correct sequence, it is necessary to remember in what sequence the AOP's were initially started. The least recently used logic shown in FIGS. 16A, B, C and D performs that function. There are 15 latches H13 through H27, each corresponding to a different pair of AOP's. Consider latch H13; it is set when AOP-B is started and is reset when AOP-A is started. If H13 is on at any particular moment, it indicates AOP-B was started more recently than AOP-A, and therefore if a refetch is to be performed, AOP-A should have higher priority than AOP-B. If H13 is off, the situation is exactly reversed. Each of circuits H28 through H33 receive six signals J7 through J12 from FIG. 17B, which indicate respectively that AOP-A needs to have a refetch performed; AOP-B needs to have a refetch performed, and so forth through AOP-F. This needing of a refetch may either be caused by the fetches having gotten out of sequence as previously described, or because a fetch was rejected by the PSCF.

Circuit H28 produces an output which has the meaning that AOP-A should not at the present time be permitted to perform a refetch because some other AOP has higher priority and is in need of a refetch. This condition exists if AOP-B needs a refetch and AOP-B has priority over AOP-A, or if AOP-C needs a refetch and AOP-C has priority over AOP-A, and so forth through AOP-F. Logic blocks H29 through H33 perform the same function for AOP-B through AOP-F.

Figure 17B:
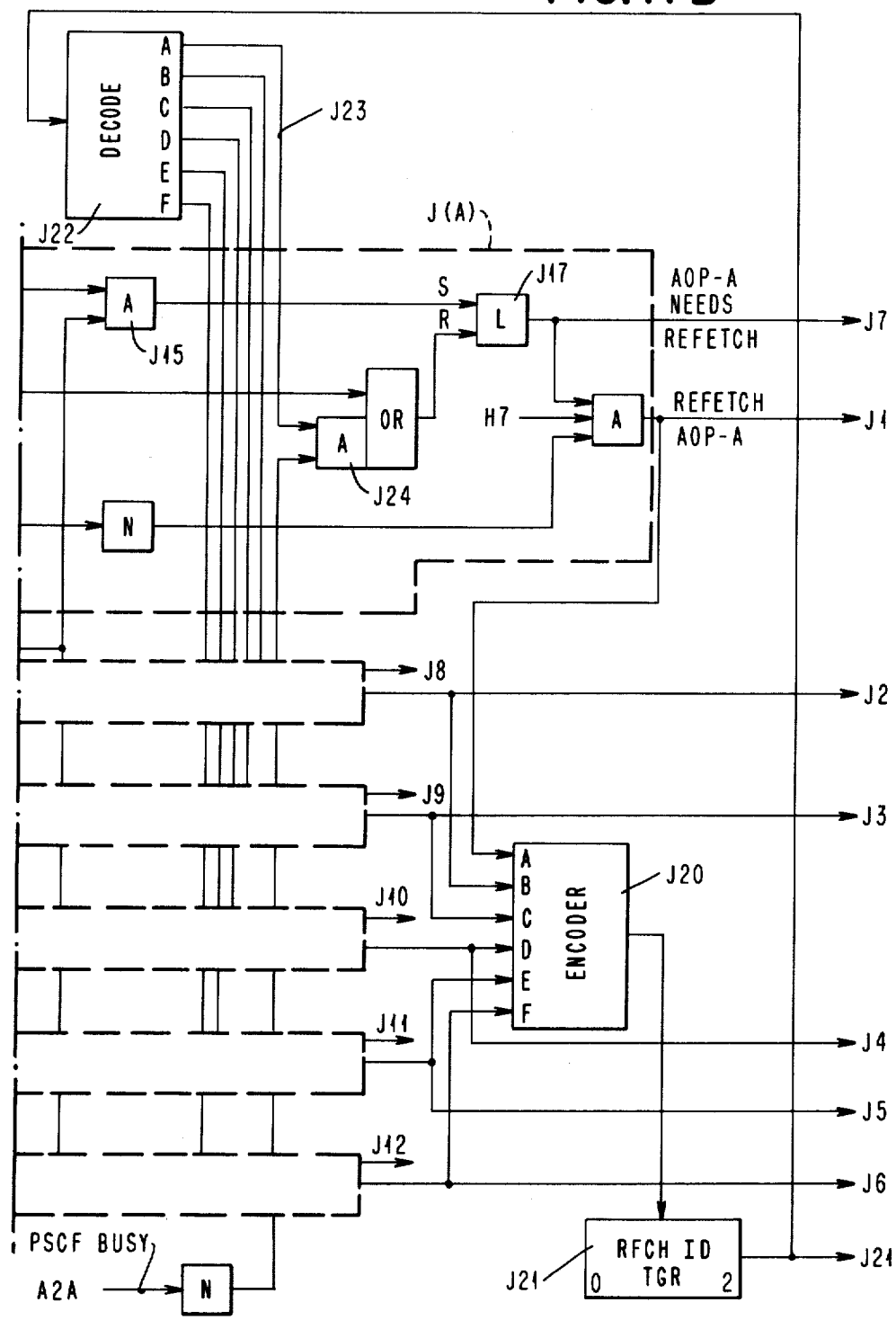

The primary purpose of the logic in FIGS. 17A and 17B is to keep track of which AOP's need to have a refetch performed and to generate the appropriate refetch signals when the correct time for that refetch comes. The C2 ID on line T4 identifies which AOP, if any, is having a C2 cycle, which is when the PSCF signals that a doubleword is being sent or that the fetch request was delayed or rejected. This ID feeds into decoder J13 which produces an output for that AOP. Consider AOP-A as the C2 ID signal; then a signal is produced on line J14 during the C2 cycle. If during that C2 cycle, there is a reject signal on line A2C or a fetch delay signal A2D from the PSCF, or a sequencing reject signal K7 generated within the operand fetch block A9, then OR circuit J16 produces an output to AND circuit J15 which is receiving line J14 to turn on the AOP-A needs refetch latch J17. If during the C2 cycle there was a fetch delay signal on line A2D, or a reject delay fetch signal on line A2C while a delayed fetch in progress signal on line A2E is on, then circuit J18 will also turn on the AOP-A reject latch J19. The AOP-A needs refetch latch J17 and serves the purpose of remembering that a refetch is needed by AOP-A until such time as it is actually carried out. The AOP-A reject latch J19 serves to remember that the reason for this refetch is because AOP-A was rejected because of a delayed fetch, and it remembers this until such time as the fetch in progress signal ceases. When both of these latches are on, it signifies that a refetch is needed but that the refetch may not yet be performed because the delayed fetch which caused the reject has not yet completed in the PSCF. When the refetch latch J17 is on and the reject latch J19 is off, it signifies that a refetch is needed and that it may be performed as soon as priority allows. AOP-A will be able to bring up its refetch signal J1 at such time as J17 is on, J19 is off, and signal H7 (which indicates that some higher priority AOP is waiting for a refetch) is off. Refetch AOP-A signal J1 will cause the operations necessary for carrying out the refetch of AOP-A. Among other things, signal J1 will go to the gate control triggers and cause AOP-A to be gated to the address incrementer D11, and it will go to the encoding circuit J20 where it will cause the ID of AOP-A to be produced and sent to refetch ID triggers J21. The presence of the non-zero ID in the refetch ID triggers therefore represents that address incrementer D11 is being used on that particular cycle to perform a refetch for the identified AOP-A. This AOP value feeds to the decoder J22 where (in the case of AOP-A), an output will be produced on line J23 which will go to AND circuit J24, and if the PSCF is not busy as indicated by line A2A, J24 will cause the AOP-A need refetch latch J17 to be reset.

As was noted above, if the original fetch request from this AOP received a fetch delayed signal, that also caused latches J19 and J17 to be turned on. In this situation, the data will be returned by the PSCF a bit later, and there will not be any need for a refetch to be performed. In this particular situation, when the data is to be returned for this AOP, the ID of that AOP will be presented on the advance ID line U1 and will be gated by the advance signal A2B to the decoder J25 where it will produce an output on J26 to cause latches J17 and J19 to be reset. The reason why latches J17 and J19 were turned n in the case of a delayed fetch (even though they did not actually need to refetch) is in order to prevent any lower priority AOP's from performing refetches, since they are not permitted to do that until after the data for AOP-A is received. The AOP-A reject latch J19 will normally remain on until such time as fetch in progress line A2E goes off signifying that the current delayed fetch which is being performed in the PSCF is completed, and that the PSCF is now available to perform another delayed fetch.

Figure 19:
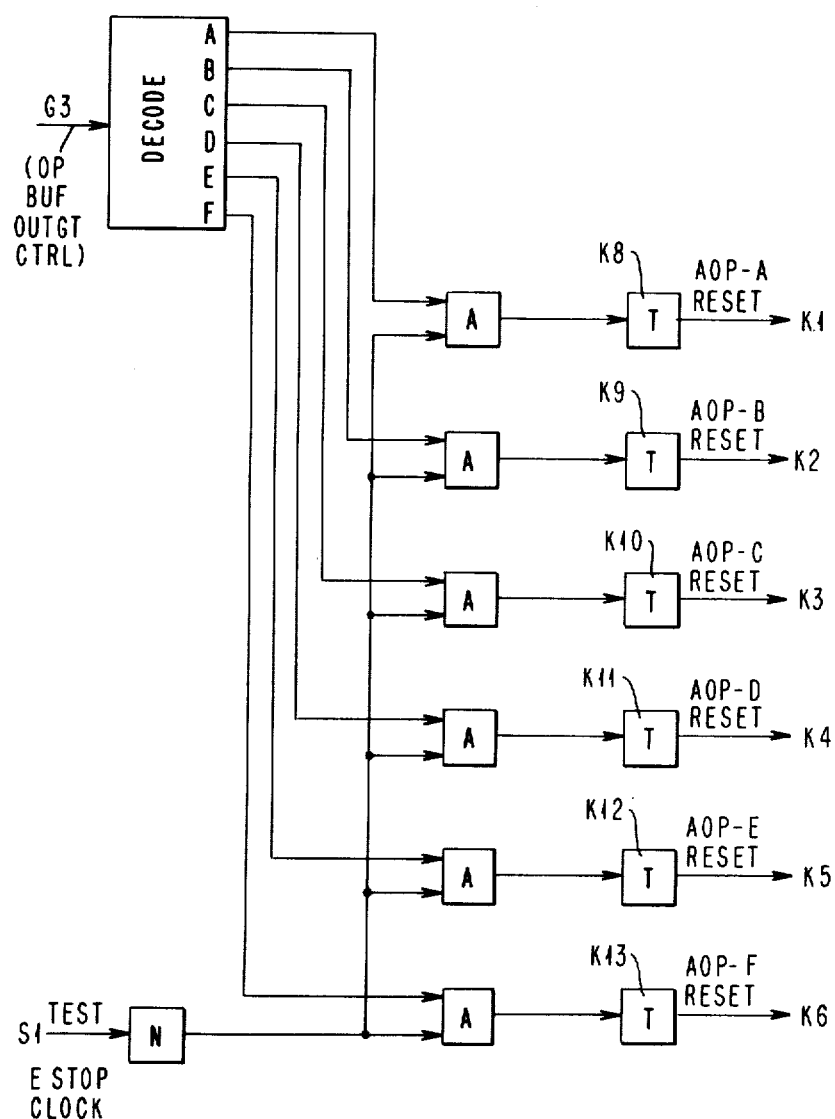

In FIG. 19, the AOP reset triggers K8 through K13 are turned on when the corresponding AOP has completed its operation and is due to be reset. This situation occurs when the data which was fetched with the AOP has been successfully transferred to the execution function A15. This condition is recognized by the presence of the ID of the outgating AOP signal G3 from the outgate control latches in FIG. 14 which indicates that the data is being outgated to the A and B registers, and by the absence of the turn on of the E stop clock signal S1.

Figure 18:
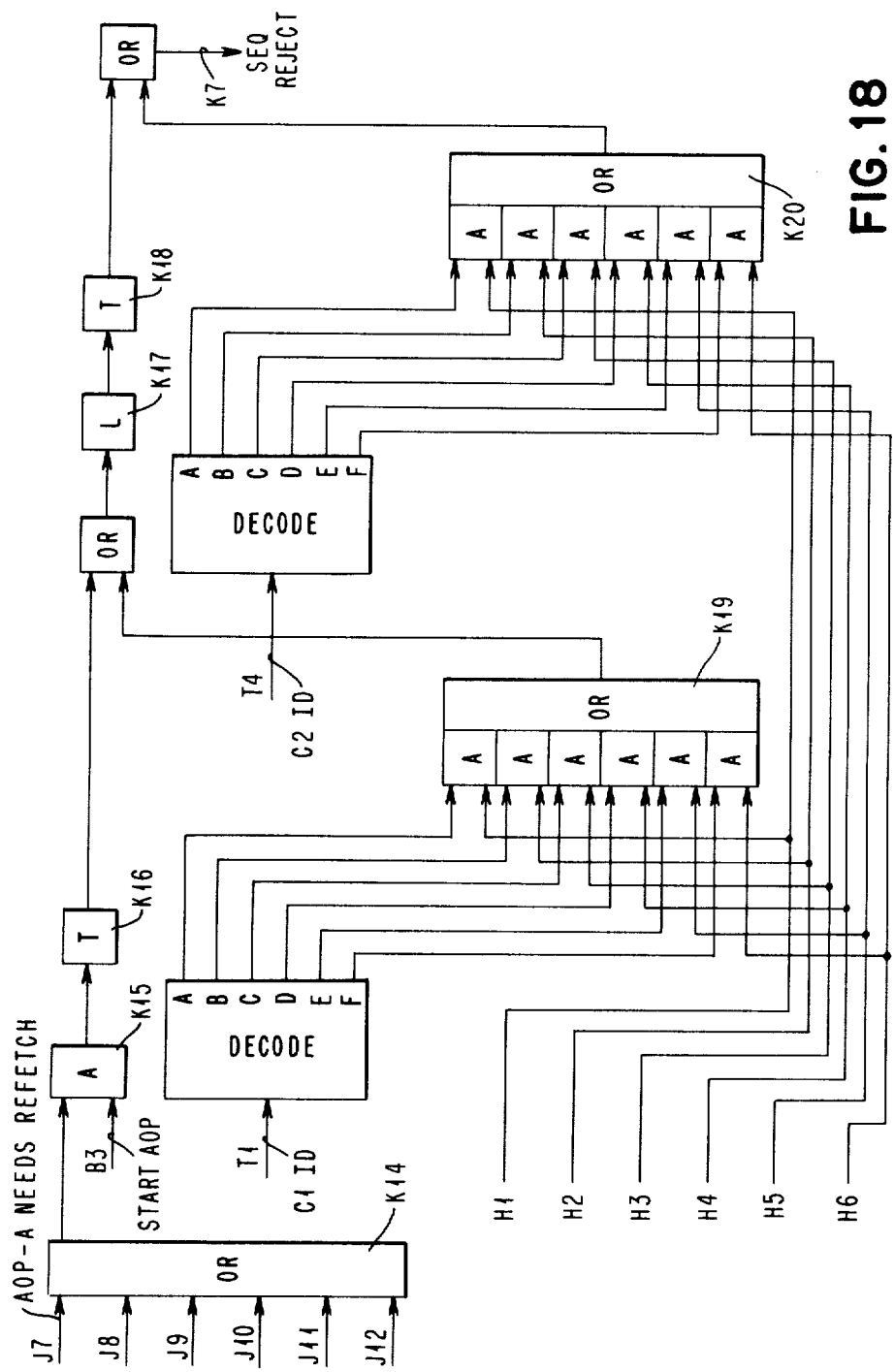
FIGS. 18 and 19 show sequencing reject and AOP reset triggers.

The logic in FIG. 18 shows how the sequencing reject signal K7 is implemented. The purpose of sequencing reject signal K7 is to cause the AOP receiving the signal to refetch the doubleword it contains in its OP buffer because the received doubleword may have been gotten out of sequence. If any AOP is in need of a refetch, circuit K14 will produce an output; and if while that condition exists, a new AOP is started as signalled by line B3, then an output will be produced from AND circuit K15 which will turn on trigger K16, latch K17 and trigger K18, each for one cycle on successive cycles. This will produce an output on line K7 during the C2 cycle of the request associated with that AOP, which is the time that it will be looking for a reject signal. The six signals H1 through H6 indicate for AOP-A through AOP-F that there is some higher priority AOP which is in need of performing a refetch. If any of those signals is on, and the ID of the AOP is provided in either the C1 ID signal T1 or the C2 ID signal T4, then a signal will be produced respectively from funnel circuit K19 or K20 which will feed into the trigger latch chain and produce a sequencing reject during the C2 cycle for that AOP.

The logic in FIGS. 20A and 20B: (1) associates an AOP with a particular instruction being decoded, (whether or not the data has been received by the AOP buffer (OP) before the instruction is allowed to proceed beyond its first execution cycle), and (2) indicates when data in each AOP is needed by the E function A15. When decoder block A11 provides a decode successful signal A4B and either the source or destination signal is indicated by a signal A4D or A4E (indicating a source or destination operand is to be fetched), a queue inpointer signal A5C from I queue A12 is ingated to the queue identifier (Q ID) buffer L13 in FIG. 20A. Queue inpointer signal A5C identifies the queue position in the instruction queue block A12 that will receive the instruction. The queue position index is stored in buffer L13 until another instruction is decoded by block A11. Thus, a pointer to the queue position is retained as long as AOP's associated with this instruction are being started. The output of Q ID buffer L13 is connected to an input of each of circuits L(A1) through L(F1). Circuit L(A1) for AOP-A will be described in detail, and each of the other circuits L(B1) through L(F1) are identical except for receiving start and reset input signals for a different AOP.

In circuit L(A1), a two bit status latch L14 is associated with AOP-A to store the queue position of the instruction currently associated with AOP-A. Latch L14 is set with the Q ID in buffer L13 by the start AOP-A signal C1 from FIG. 10A, and is reset to zero when the AOP-A reset signal K1 is sent from FIG. 19.

At the time that an instruction is ready to be executed by the E function block A15, the queue outpointer signal A5B is provided to each of circuits L(A1) through L(F1) from the instruction queue block A12 which will provide the queue position of the next instruction to be executed. This queue outpointer value is compared against the Q ID content of L14 by a comparator which produces an equal output L7 if the queue position is for the same instruction. An AOP-A source status signal M3 from FIG. 21A identifies when AOP-A is being used for source fetching and is the first one in the chain. If signal M3 is on at the same time that the compare equal signal L7 is present, a trigger L15 comes on indicating that at the next OP branch taken, the data from AOP-A is going to be needed by E funcion A15. The outputs of comparator L7 and trigger L15 provide the outputs of circuit L(A1) and are connected to inputs to a circuit L(A2). Circuit L(A2) is identical to each of circuits L(B2) through L(F2) which respectively connect to the outputs of circuits L(B1) through L(F1). Circuit L(A2) is described in detail as representative of each of the other circuits L(B2) through L(F2).

When trigger L15 provides a signal to circuit L(A2), its funnel circuit L16 is activated to produce an output L1 turning on latch L17 and trigger L18. If the data is not available in AOP-A, a stop E clock signal S2 is provided. As long as the E function clock is stopped, the E stop clock trigger S2 will be on, and will keep L17 and L18 on by activating a path through funnel L16. When on, latch L17 and trigger L18 signify that the data in AOP-A is needed in the execution function during the present cycle and that if the operand fetch block A9 is still waiting for it from the PSCF, the E function clock must be stopped. The latch L17 can also be turned on if the main storage to A signal A6A (from the E FCT indicating that it wants a doubleword of SRC data for its register A) occurs while the SRC ID signal G1 is designating AOP-A as the next AOP which is to receive a SRC ingate. The latch L17 can also be turned on if the corresponding conditions A6B and G2 exist for DST data.

Figure 21A:
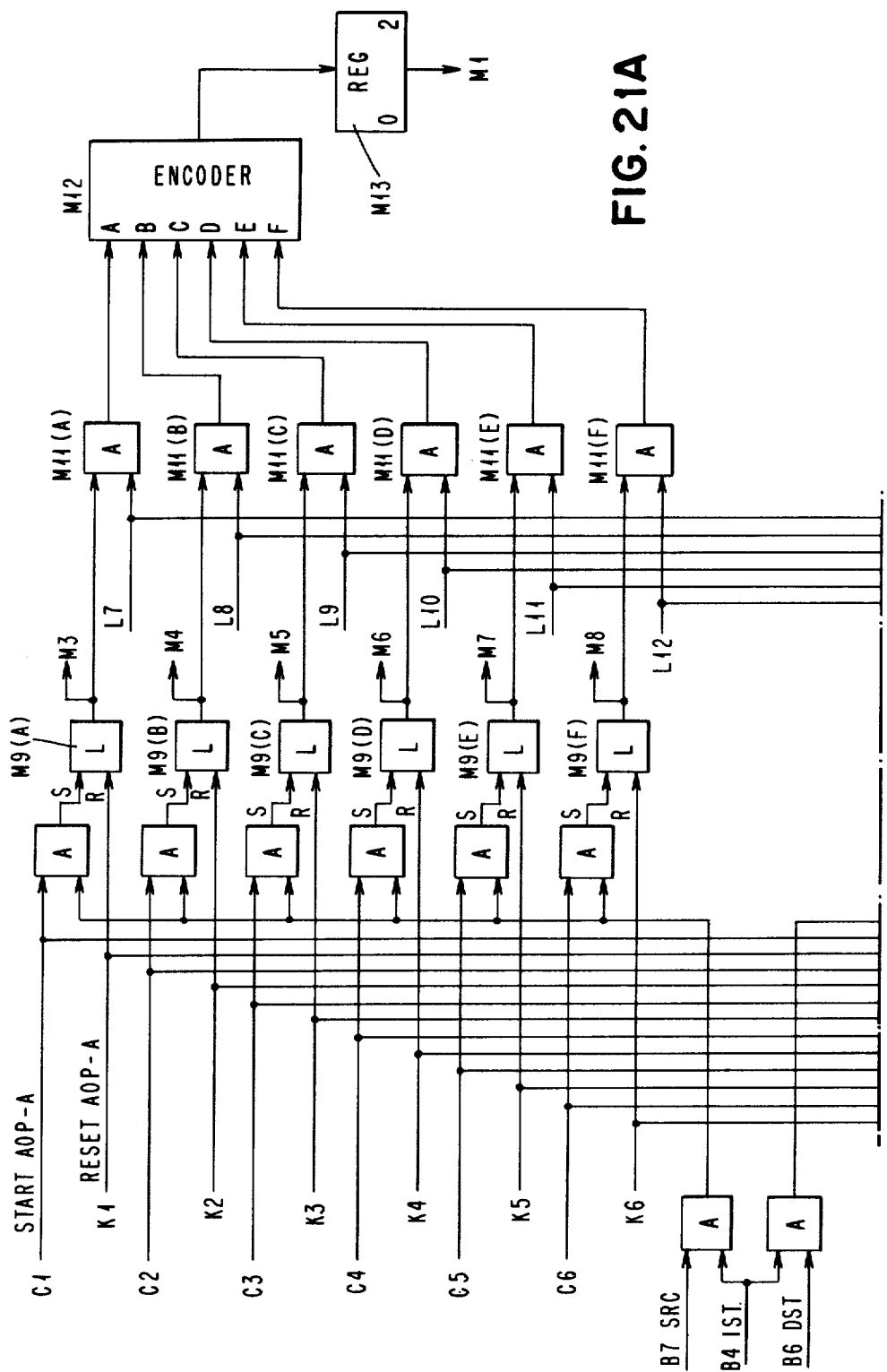

FIGS. 21A and B depict circuits which remember whether a particular AOP is the first one in a chain of SRC or DST operand AOP's. A status latch M9(A) is set if during the cycle that AOP-A is started, the signals source fetch B7 and first fetch B4 are both on. Latch M9(A) indicates when AOP-A is being used for SRC fetching and is the first AOP in the operand chain. M9(A) is reset when AOP-A is reset by signal K1. When signal L7 is received indicating that AOP-A is associated with the instruction that is next to be executed, AND circuit M11(A) produces an ouput which causes encoder M12 to output the ID of AOP-A which will feed into register M13. Register M13 indicates which AOP is associated with the first doubleword of source fetching for the instruction which is next to be executed.

There are corresponding latches M9(B) through M9(F) for each of the other five AOP's which remember whether each is a first SRC AOP. There are also six more latches M10(A) through M10(F) for each of the AOP's which remember when any AOP is the first DST AOP. For any given instruction there can be at most one first SRC AOP, and one first DST AOP, and if there are both, they must be different AOP's.

Figure 22A:
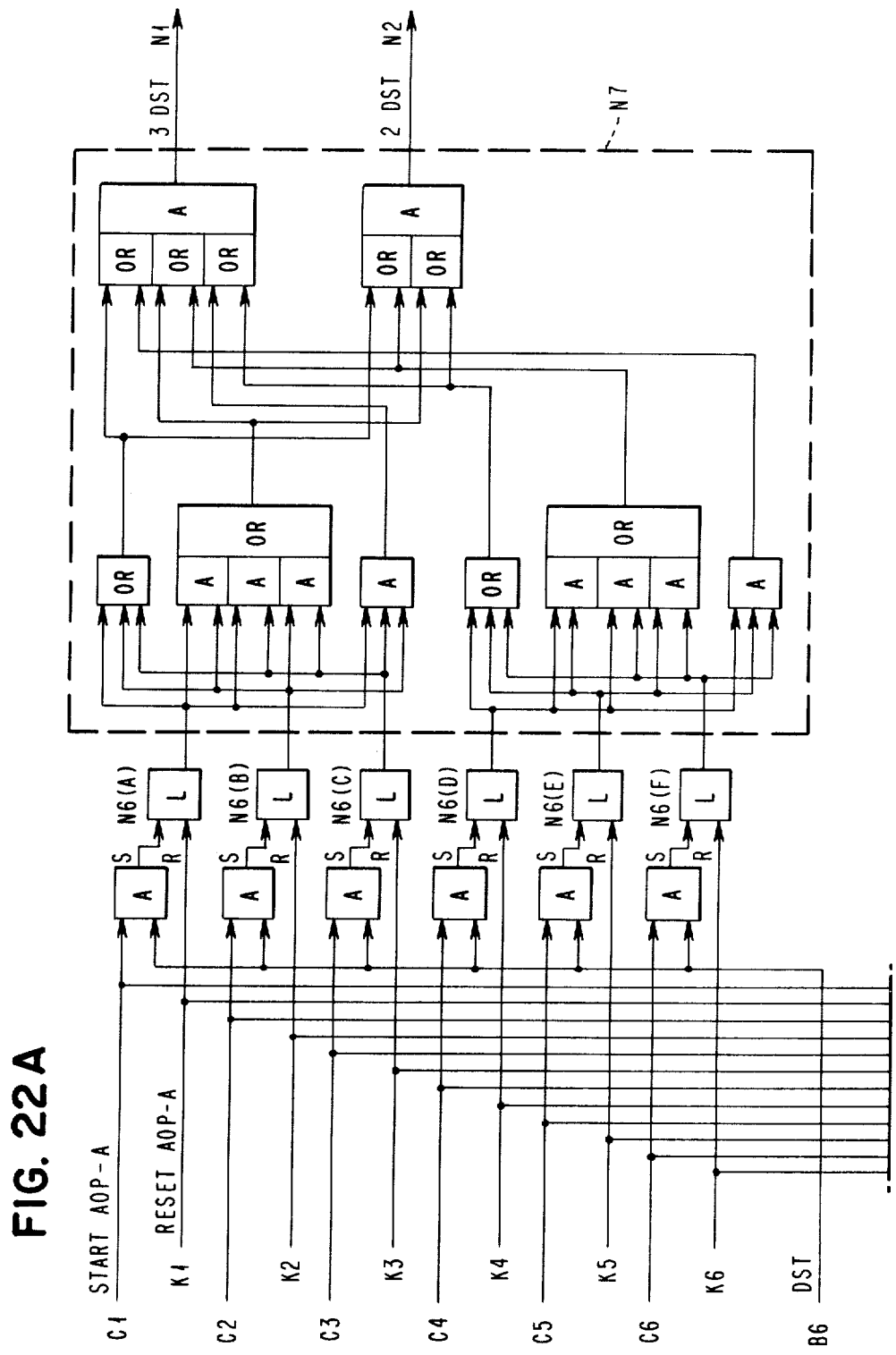

FIGS. 22A and B depict circuits which remember the status for each AOP, i.e. whether it is associated with SRC or DST fetching. Latch N6(A) records whether AOP-A is assigned for DST fetching. It is turned on when signal C1 start AOP-A is received, if signal B6 indicating DST fetching is on. N6(A) is reset when the reset AOP-A signal K1 is received. There are five more latches N6(B) through N6(F) which function in an identical way as N6(A) for the other five AOP's.

Circuits N7 examine the state of DST triggers N6(A) through N6(F) and produces two outputs N1 and N2. N1 indicates that there are three or more AOP's assigned for a DST operand, and N2 indicates two or more AOP's are assigned for a DST operand.

There is an identical set of latches N8(A) through N8(F) and logic which remembers which AOP's are assigned for SRC fetching, and they output to a circuit N9 which is identical to N7. N9 provides output N4 which indicates when three or more AOP's are assigned to a source operand, and N5 which indicates when two or more AOP's are assigned to a source operand.

Figure 23A:
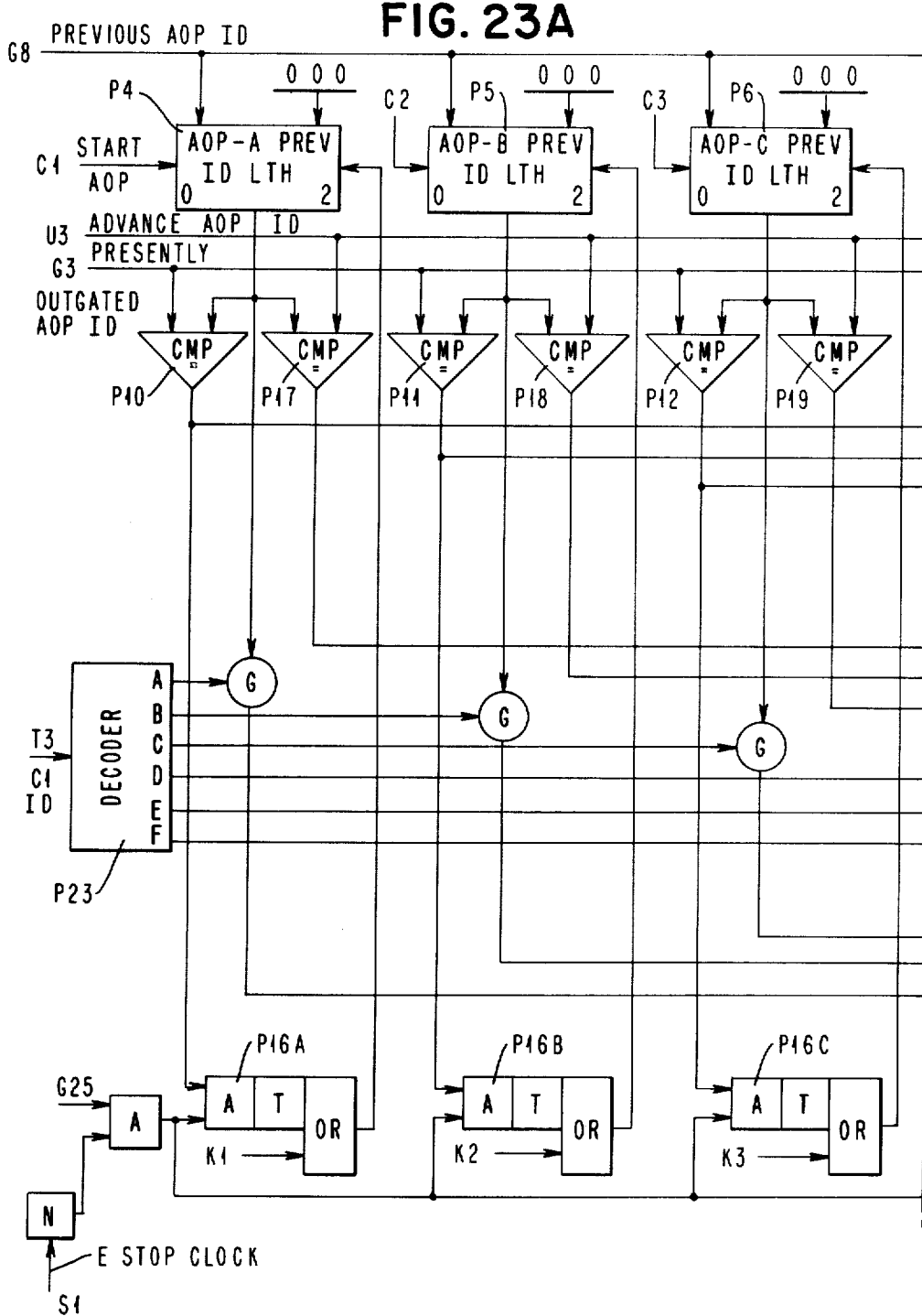

FIG. 23A and B depict a mechanism to remember how the AOP's are chained together when multiple AOP's must be used to fetch an operand. The AOP-A previous ID latch P4 is a three bit latch which remembers which AOP, if any, preceeds AOP-A in the chain. When AOP-A is not busy, or when it is busy and is the only one in its chain, or when it is the first one in the chain, the ID value in P4 is set to zero (to indicate AOP-A has no predecessor AOP). If AOP-A is busy and is part of a chain and is other than the first one in the chain, then P4 contains the ID of whatever AOP preceeds AOP-A in the chain. P4 is set at the time that the start AOP-A signal C1 is received. The AOP ID value set into P4 comes from line G8 of FIG. 15, which has either the previous AOP SRC ID or the previous AOP DST ID, depending on whether the operand is a SRC or DST fetch. This ID identifies the most recently started AOP in that chain prior to AOP-A. An identical previous ID latch P5-P9 exists for each of the other five AOP's. Thus, each of the AOP's knows which one is prior to it in any chains that may exist. In different words, the chaining is accomplished by backpointers from the higher AOP's to the earlier ones in the chain. There are some situations in the operand fetch block A9 when it is necessary to know what AOP is previous to a given AOP, and other situations when it is necessary to know what AOP follows in the chain. Both the previous AOP and the following AOP can be determined by examining the previous ID's in latches P4–P9. The following AOP in a chain can be identified by comparing the present AOP ID with the contents of latches P4–P9, and if the contents of a latch compares equal, the AOP represented by that latch is the next AOP in the chain.

Consider the situation where a doubleword of data from a chain is presently outgated from any AOP to either the A or B register in E function A15. When that happens, it is necessary to determine which AOP, if any, follows the outgated AOP in the chain so that the SRC ID triggers G16 or the DST ID triggers G10 in FIG. 14 can be updated. This is accomplished by the output from one of the six compare equal circuits P10 through P15 which identifies the AOP following the present AOP ID on input lines G3. The outputs of comparators P10 through P15 are inputted to encoder P1 to encode the following AOP ID into a three bit signal.

In more detail, the ID of the AOP which is presently being outgated to the A or B register is contained in outgate control latch G12 in FIG. 14, which provides the presently outgated AOP ID on lines G3 which controls that outgating. The present AOP-ID value is compared in each of the six comparator circuits P10 through P15 with each of the previous ID's in latches P4 through P9. If there is any AOP which follows this one in the chain, then the previous ID latch designation causing the compare equal will designate the AOP presently being outgated, which is identified by the particular compare circuit producing an output.

As an example, suppose that AOP-B is presently being outgated and that the next AOP in the chain is AOP-E. In that case, the AOP-E previous ID latch P8 will contain 011 which indicates that AOP-B is the prior AOP in the chain. Since AOP-B is being outgated, its ID of 011 appears on G3 and causes compare circuit P14 to produce an output, which connects to input E of encoder P1, which outputs 110, the ID for AOP-E, which is the next AOP. Thus, it is determined that AOP-E is the next AOP in the chain. The ouput P1 then feeds back to the SRC or DST ID trigger G16 or G10 in FIG. 14. Since the AOP-B data has now been ingated to the E function A15, it is no longer needed, and AOP-B is reset at the completion of that ingate. Therefore, AOP-E is now the first one in the remaining chain and will no longer have any other AOP prior to it. It is therefore necessary to reset the AOP-E previous ID latch P8 to zero. This is accomplished via AND circuit P16E which produces an output if there is a compare signal from P14 and an ingate to E function signal G25 and E stop clock signal S1. This signal will pass through a trigger and an OR circuit and will cause the AOP-E previous ID latch P8 to have a zero ingated to it. The AOP-E previous ID latch P8 can also be reset any time a reset signal K5 is received. There is identical circuitry for each of the AOP's.

Another situation in which it is necessary to find the following AOP is when the PSCF A13 is returning multiple doublewords of data to the IPPF block A9, and they may fill multiple operand buffers which are assigned and waiting for the data. In that case, as each doubleword is received by the appropriate AOP, it is necessary to find the next AOP in the chain so that the next doubleword may be put into it. This is accomplished by compare circuits P17 through P22 and encoder P2 which accept the advance AOP ID signal U3 from FIG. 30B and outputs the ID of the next AOP in the chain.

It is also necessary at times to find the previous AOP when given an ID of an AOP. This occurs when data is being returned from the PSCF A13 and alignment by a shift amount other than zero is beign performed. In that situation, the bytes which are shifted off the left end of a doubleword on the BDBO and returned to the right end to be ingated to the previous operand buffer, if there is one, in the manner explained in the earlier discussed example. To accomplish this, the C1 ID latch T3 feeds decoder T23 which produces an output for whatever AOP the doubleword is associated with, and gates the previous ID associated with that AOP to an OR circuit P24 to provide the output P3 which is thus the ID of whatever AOP preceeds the one whose ID was presented on T3 and identifies the AOP to which any such bytes should be ingated.

Figure 24B:
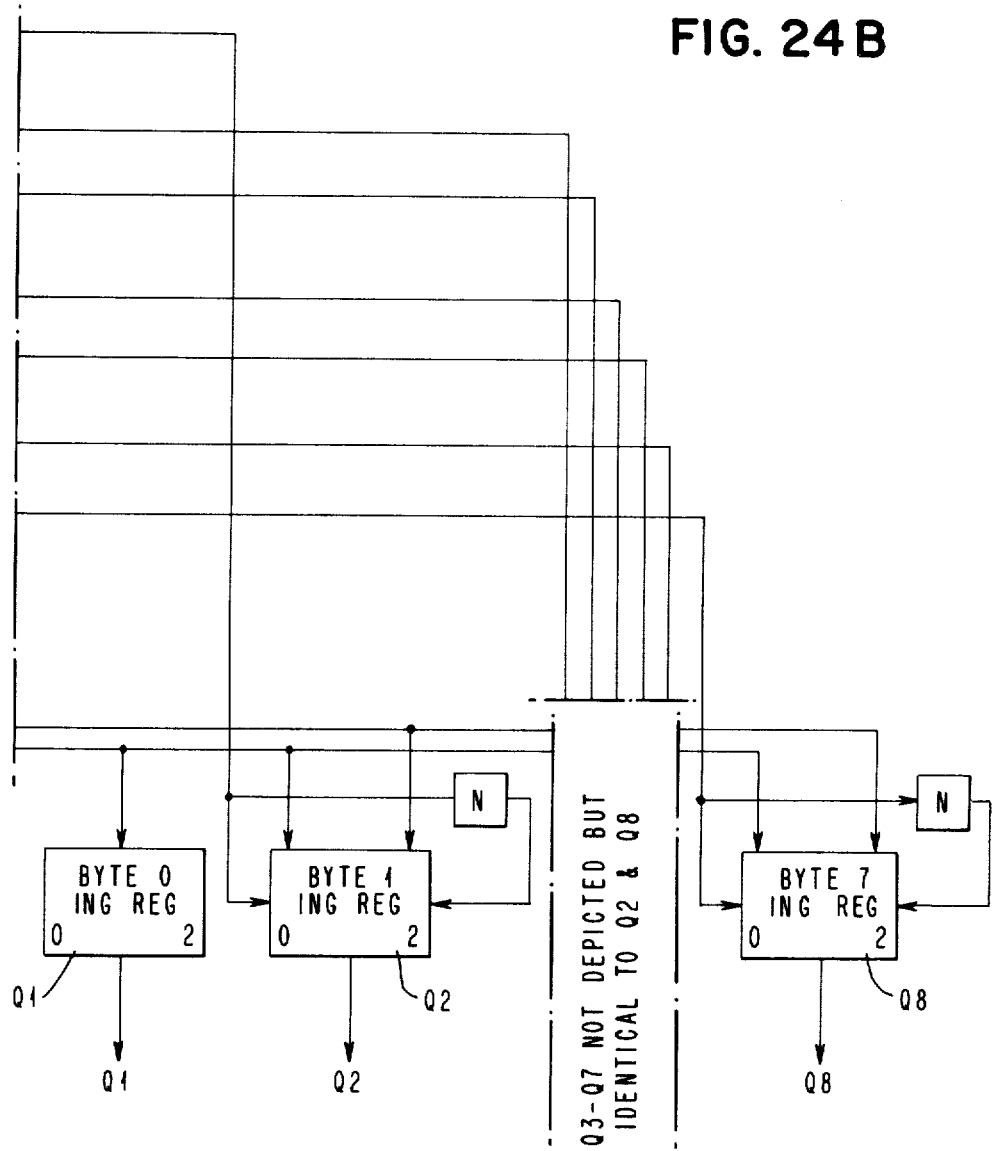
FIGS. 24A and 24B show OP buffer ingating.
Figure 24:
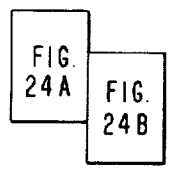

FIG. 24 illustrates circuits which store the amount that each doubleword has been shifted when it is received from the PSCF and which controls the ingating to the operand buffers in the AOP's. There are six three-bit shift amount latches Q10 through Q15, each serving one of the AOP's. Q10, which serves AOP-A, is set when the AOP-A start signal C1 occurs with the value on lines B13 which indicates the amount of shifting required for the fetch. The other latches Q11–Q15 operate in a similar manner and each holds its shift amount until its AOP is reset. When the C1 cycle arrives for a particular AOP, the C1 ID latch T3 feeds decoder Q16 and causes an output for a selected AOP which causes its shift amount to be gated to OR circuit Q17 whose output in turn feeds into the BDBO shift register Q18. Thus, the shift amount associated with a selected AOP appears in the BDBO shift register during the C2 cycle for that AOP and is fed to the PSCF via line Q9 where it controls the amount of shifting that is performed. The shifting performed in the PSCF is a left shift with any bytes shifted off the left end of a doubleword moved around and reintroduced at its right end by an end-around shift.

Figure 24A:
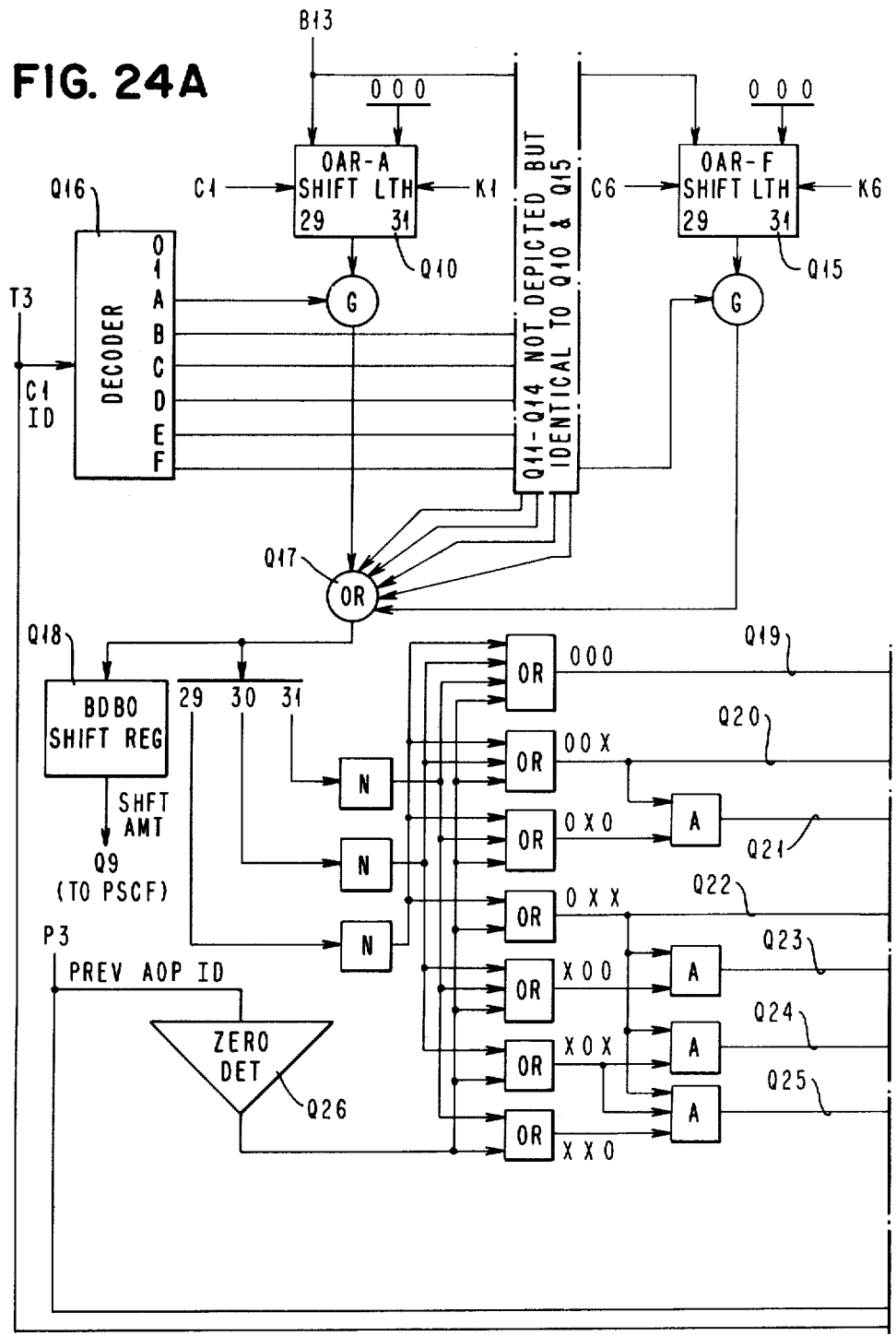

The remaining circuits in FIGS. 24A and B control the ingating of this shifted data into the operand buffers in the selected AOP's. The intention is to ingate those bytes which were shifted to the left but not off the left end to the operand buffer of the AOP that requested the fetch, and to ingate those bytes which were shifted off the left end and moved around to the right end into the operand buffer of the previous AOP. To carry out the ingating to the AOP's, there are eight three bit ID's which are sent to them from the ingate registers Q1 through Q8 in FIG. 24B. Each one of these three bit ID's controls the ingating to one byte position in the selected operand buffer. If the value of the three bit ID is zero during any particular cycle, this indicates that no ingating is to take place. If the value is 2 through 7, it indicates that the ingating for that byte is to be performed into OP-A through OP-F respectively.

The data which is presented on byte 0 of the BDBO is always ingated to the operand buffer of the AOP that performed the fetch, and therefore the C1 ID latch T3 simply feeds directly into Q1. For the other bytes, the ingating may either be to that AOP or it may be to the prior AOP. Thus, for each of the other bytes the controlling register Q2 through Q8 may be fed either by the C1 ID signal T3 or by the previous ID signal P3, which is being gated out at this time from the previous ID latches. Which of these two ID's is gated into one of these registers is controlled by seven signals Q19 through Q25 which are decoded from the shift amount output of Q17 and which indicate respectively which ID should control gating of bytes 1 through 7. Each of these signals is on if the byte should be ingated to the associated AOP, and off if it should be ingated to the previous AOP. If there is no previous AOP, then this is recognized by zero detector Q26 which overrides the decoding of the shift amount and causes all of the bytes to be ingated to the associated AOP.

Figure 25B:
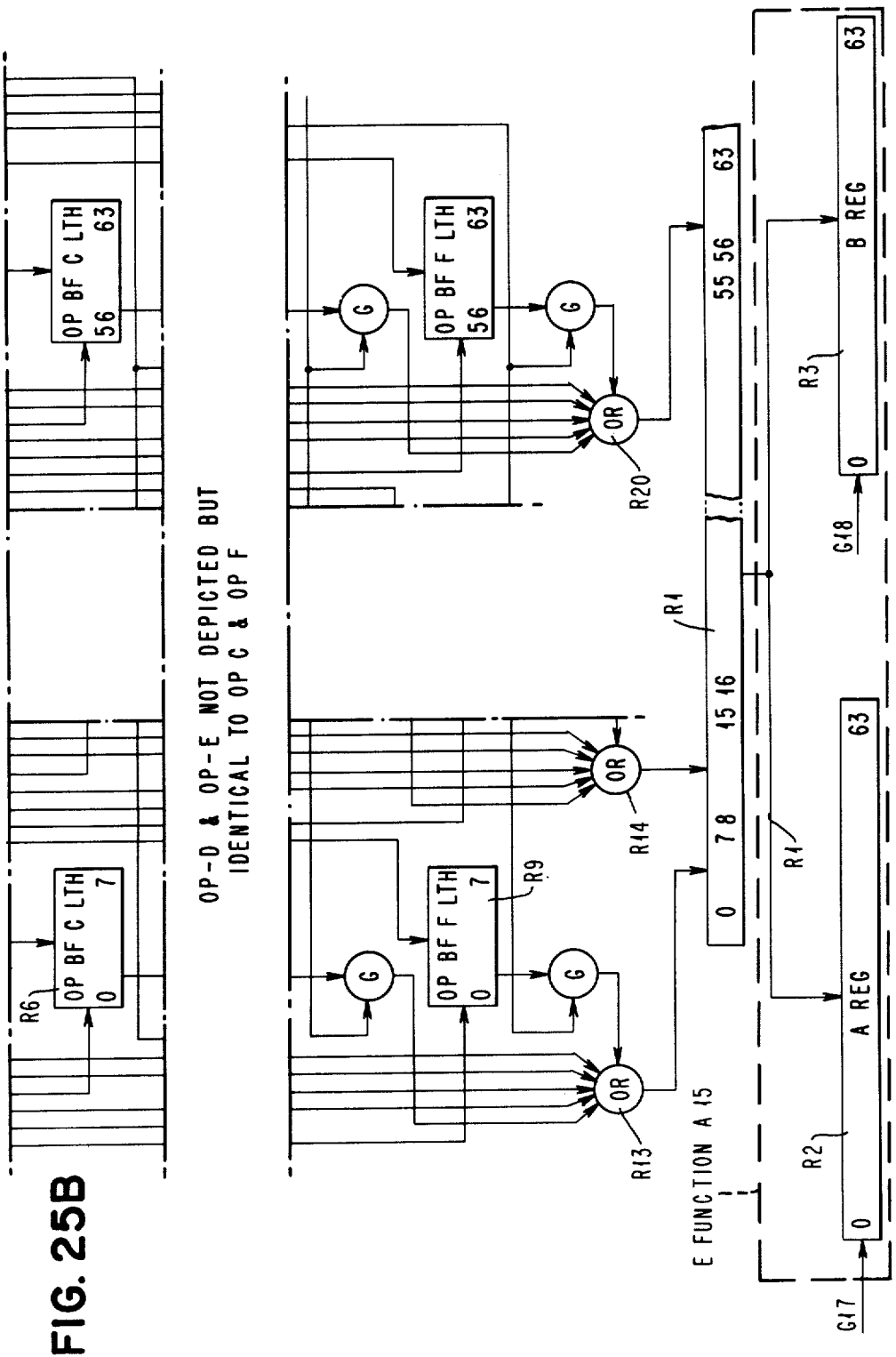

FIG. 25 shows the six operand buffers found with the respective AOP's. Each byte of each operand buffer is represented separately, because the ingating to each operand buffer is controlled on a byte basis. In FIG. 25B, the A register R2 and B register R3 are actually part of E function block A15. BDBO bus A2F is shown separated into its eight separate bytes comprising a doubleword. R10, the first byte, feeds latches R4 through R9, the first bytes of OP-A through OP-F. The ingating to these bytes is controlled by the output of decoder R30 which brings up a signal to one of the operand buffers whose ID is presented on Q1, unless Q1 is zero. Each of the other operand buffer bytes is controlled by its own decoder R31-R37, and the ingate signals whose generation was described earlier. The outgating of the operand buffers to the A and B registers is controlled by the output of decoder R38. The input G3 to decoder R38 is a three bit ID which identifies which operand buffer should be outgated and which causes the appropriate outgate signal to be produced on the output of decoder R38. This output then gates all of the bytes of that operand buffer, which respectively feeds OR circuits R13 to R20, from which they are put onto bus R1 which feeds the A and B registers. The ingating to the A and B registers is controlled by signals G17 and G18 whose generation was described earlier.

FIG. 26 depicts circuits for remembering when an AOP is waiting for data from the PSCF. The AOP-A waiting latch S3 and triggers S4 are on when AOP-A is waiting to receive data from the PSCF. They are turned on by the start AOP-A signal C1 and remain on until either reset AOP-A signal K1 is received, or until the appropriate indications that the data are received. In the most straight forward situations, T5 is off and the AOP-A waiting trigger S4 will be reset whenever the C2 ID signal T4 designates AOP-A causing the signal on S5 to go off and when the signal S6 is also off indicating that during the C2 cycle there was no fetch delayed signal, no reject delayed fetch, and no sequencing reject. The signal T5 is on whenever AOP-A is participating in SRC fetching, which involves multiple doublewords and involves shifting other than by zero and in which it is not the last AOP in the chain. In that situation, some of the data (which must be gated into operand buffer A) will be provided at the time that the next AOP in the chain receives its data and it is not permitted for operand buffer A to be used by the E function A15 until that data is there. Therefore, in that situation it is not desired to turn off the AOP-A waiting condition until the next AOP receives its data. At the time that the next AOP receives its data, the AOP-A ID will be presented at P3 because it is the predecessor of that AOP and that will cause signal S7 to go off and (if signal T5 is present) that will cause AOP-A waiting to be turned off. This logic is duplicated in identical manner for AOP-B through AOP-F.

The circuit S8 determines when it is necessary to stop the E function clock. If the signal L1 is on, which indicates that the data from OP-A is needed at the present time by the E FCT A15, and the signal S9 is on indicating that the operand fetch block A9 is still waiting for the data from the PSCF, this will cause the E function clock to be stopped. This condition will remain every cycle until the data is received from the PSCF. The clock will also be stopped if the signal L1 indicating that the data is needed by the E function is on and if signal T11 is also on, which indicates that AOP-A is the most recently started AOP in either the SRC or the DST chain and that there is no current fetch being made in that chain. Although the AOP's are not necessarily waiting for data in response to that fetch, if the E function were allowed to proceed and ingate the data, that would cause AOP-A to be reset and that would cause the address in AOP-A to be lost. The address would then not be available for starting the next AOP in that chain when the SRC or DST logic was ready to do so. Therefore, in order to preserve that address, the E function clock is also stopped in this situation. Either of these conditions for any of the other five AOP's will also cause the E function clock to be stopped.

Figure 27:
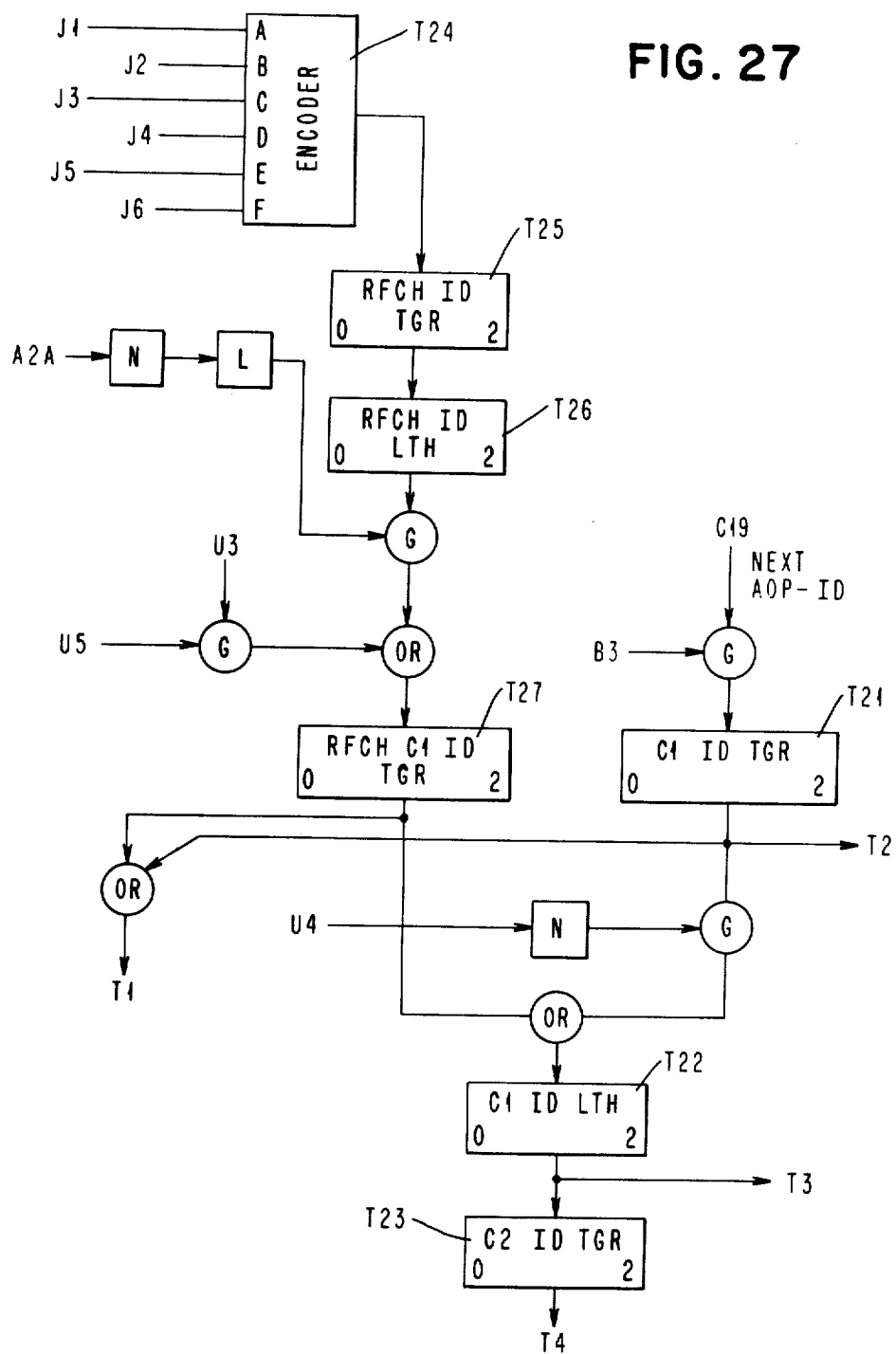
FIGS. 27, 28 and 29 show C1/C2 IDS and need ingating status bits.

FIG. 27 depicts circuits for remembering when data is to be returned from the PSCF. When a new AOP is started, the signal B3 causes the ID of the next AOP being started from line C19 to be gated into the C1 ID trigger T21. A non-zero ID in that trigger indicates that an AOP has just been started and that the PSCF is in the first cache cycle of processing the fetch for it. That ID normally passes through into the C1 ID latch T22 and from there into the C2 ID trigger T23 on the following cycle. If during the cycle that a particular ID is in T23, a fetch delay, or fetch rejected, or sequencing reject signal are present, this indicates the disposition of the fetch, and the controls for that AOP will have to take the appropriate action to handle it. If none of those signals is received, this indicates that the data which was fetched will be available on BDBO at latch time of this cycle.

When the time comes for a fetch which has been rejected to be refetched, a signal will appear on J1 through J6 for the AOP that is associated with the fetch. That signal will be encoded by T24 into the ID of that AOP which will be placed into the refetch ID trigger T25 and from there into latch T26. When a non-zero ID appears in trigger T25, it indicates that the address incrementer is being used to perform a refetch for the particular AOP. If the PSCF busy signal A2A is not present during that cycle, then we know that the PSCF will take the request and process it and the ID will be allowed to pass from latch T26 to the refetch C1 ID triggers T27 which indicate that the PSCF is in the C1 cycle of processing that request. From there, an OR circuit receives the ID from triggers T27 and T21 and passes its output to latch T22. The way the controls are set up, T21 and T27 are mutually exclusive and can never both have non-zero ID's, so there is no difficulty in using an OR rather than selection logic. Whenever a fetch is delayed, the ID of the AOP that it is associated with is remembered in the advance ID latch and is presented on U3. Two cycles before the data is returned, the PSCF provides an advance signal which, after being latched, is presented on U5 and gates the ID of that AOP into the refetch C1 ID trigger T27 from where it follows through the normal C1, C2 ID path and causes the data to be ingated at the time it reaches T23.

Figure 28:
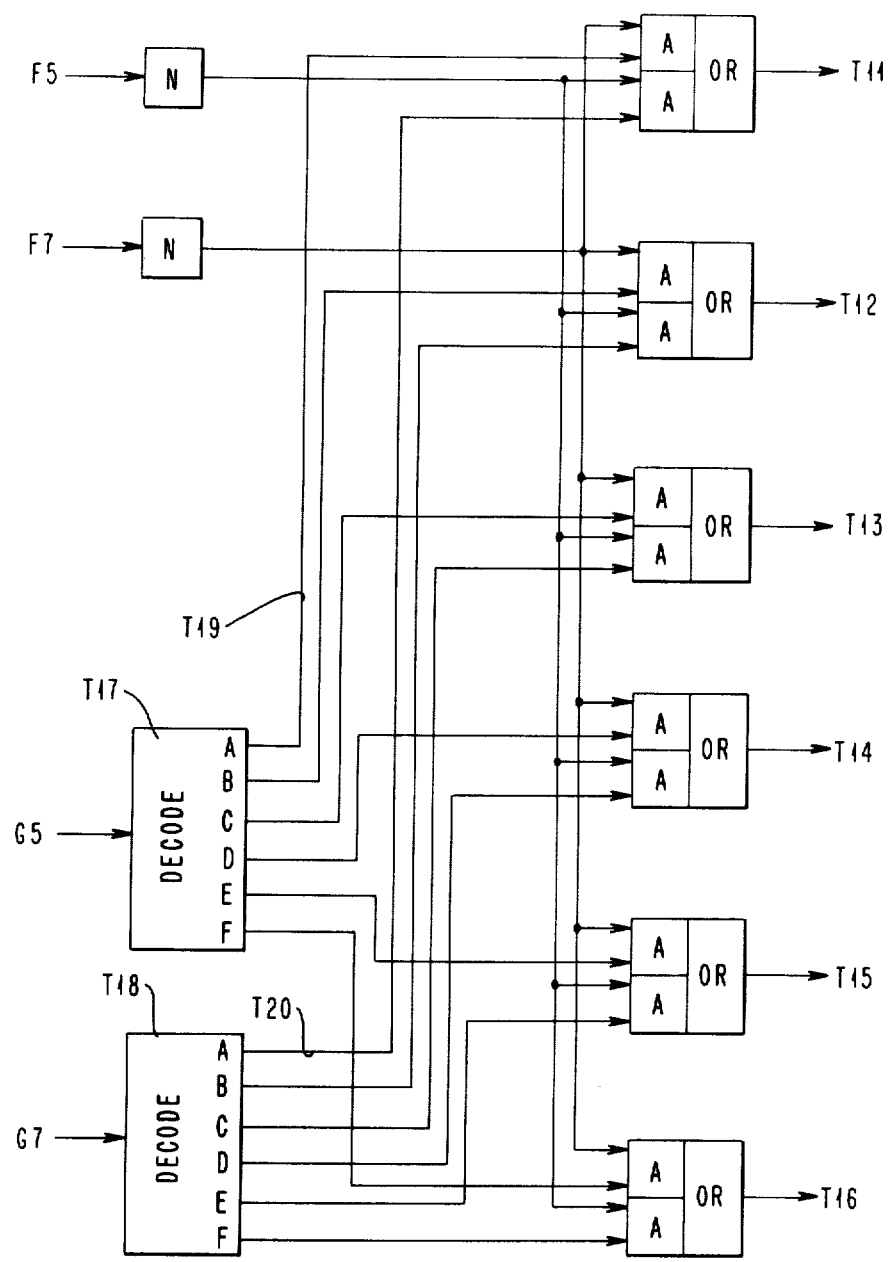

FIG. 28 illustrates circuits which determine when an AOP may not be reset because it is the last one in a chain. The ID presented on G5 identifies the last AOP which was started in the SRC chain if there are more which need to be started. If the most recently started AOP was the last one in the chain, then zero is presented on this ID. Signal G7 provides the same information for DST. Thus, if decoder T17 puts out a signal on T19, it indicates that AOP-A is the last one in the chain and that there is a need to start up another one. If that signal is present and there is no signal on F7 indicating that a new AOP is being started in the SRC chain, then signal T11 will come on indicating that if AOP-A is needed by the E function, it is not permitted to complete the ingate at this time. Similarly, T11 is turned on if decoder T18 produces a signal T20 indicating that AOP-A is the most recently started AOP in the DST chain and there is no signal F5 indicating that a new AOP is being started for DST.

Figure 29:
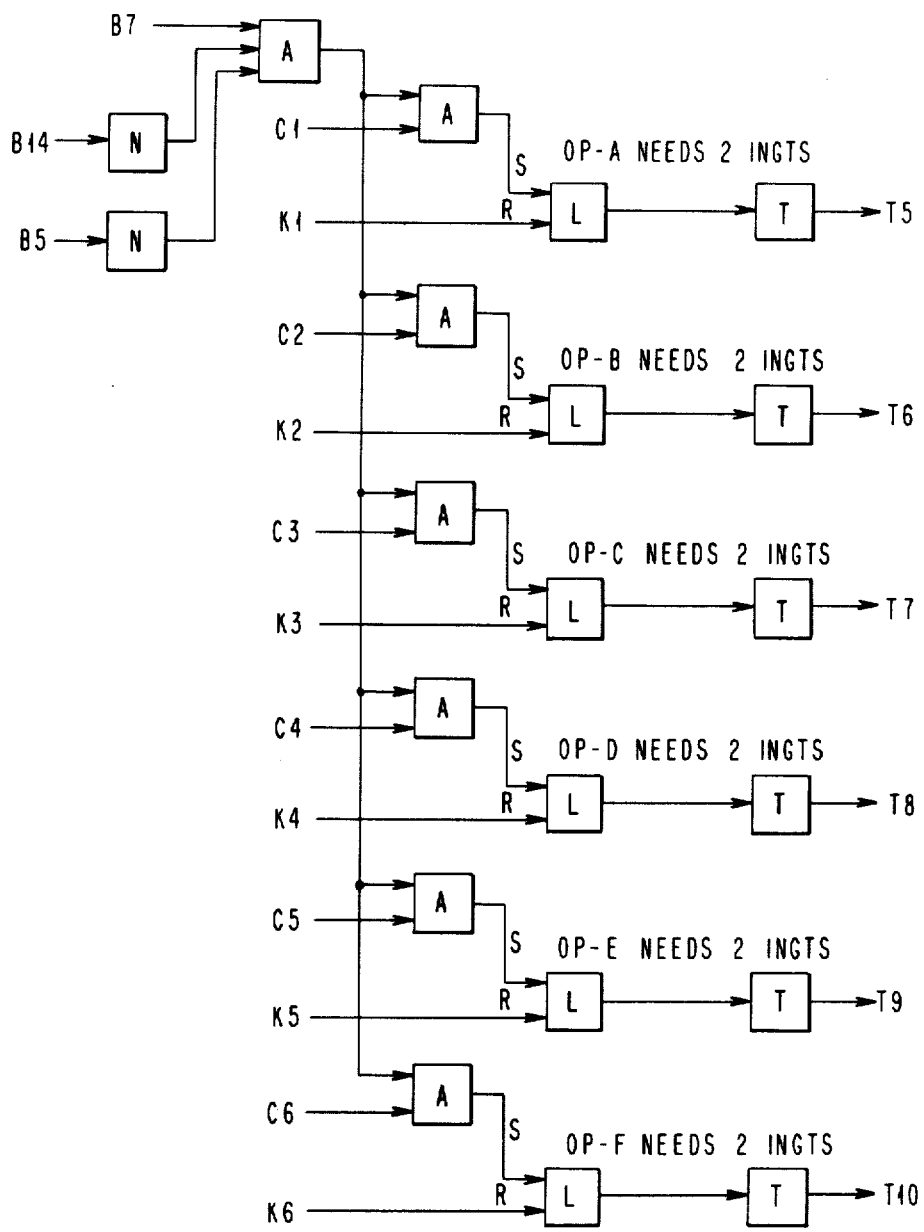

FIG. 29 depicts the logic circuits which remember whether or not an AOP needs to wait for a second ingate from its successor AOP before turning off its waiting trigger. There are six status bits, one for each AOP which are set at the time the AOP is started if a SRC fetch is indicated and the shift amount is not zero and it is not the last fetch. They are reset when the AOP is reset.

Figures 30, 30A:
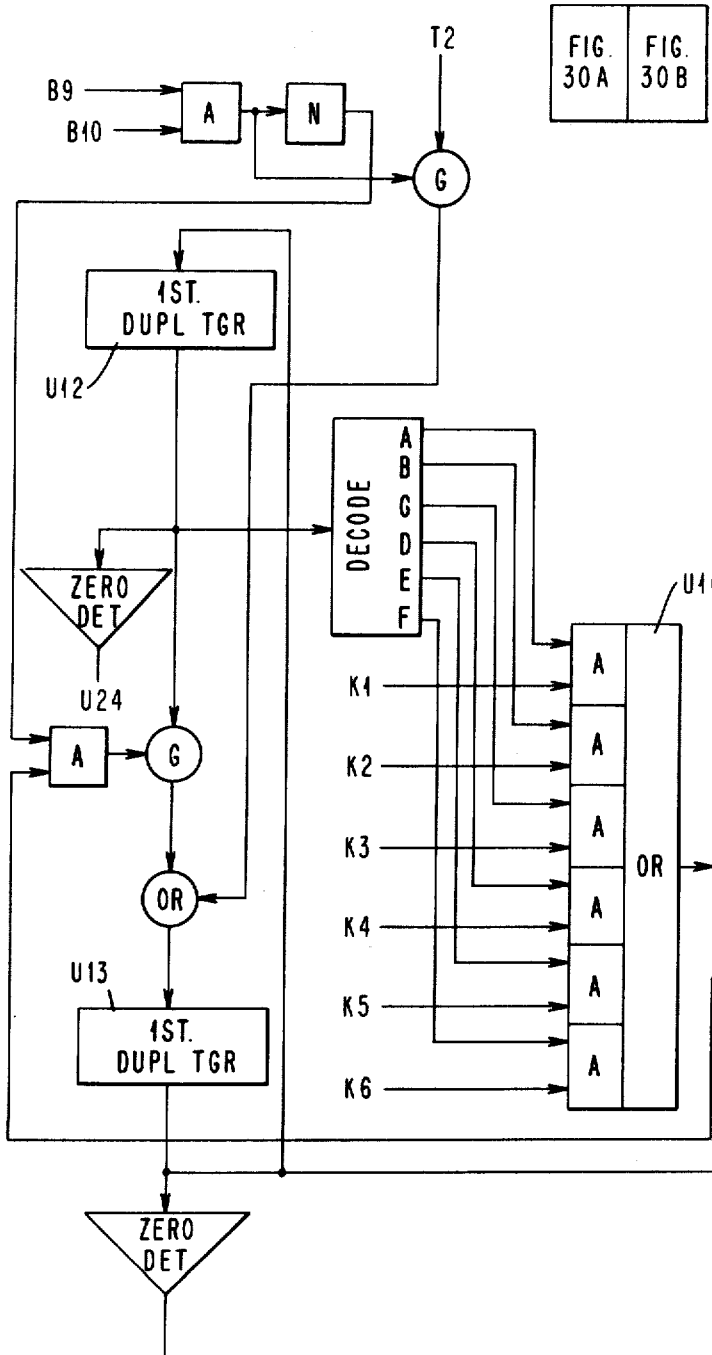
FIGS. 30A and 30B illustrate advance ID and DUP FCH ID.
Figure 30B:
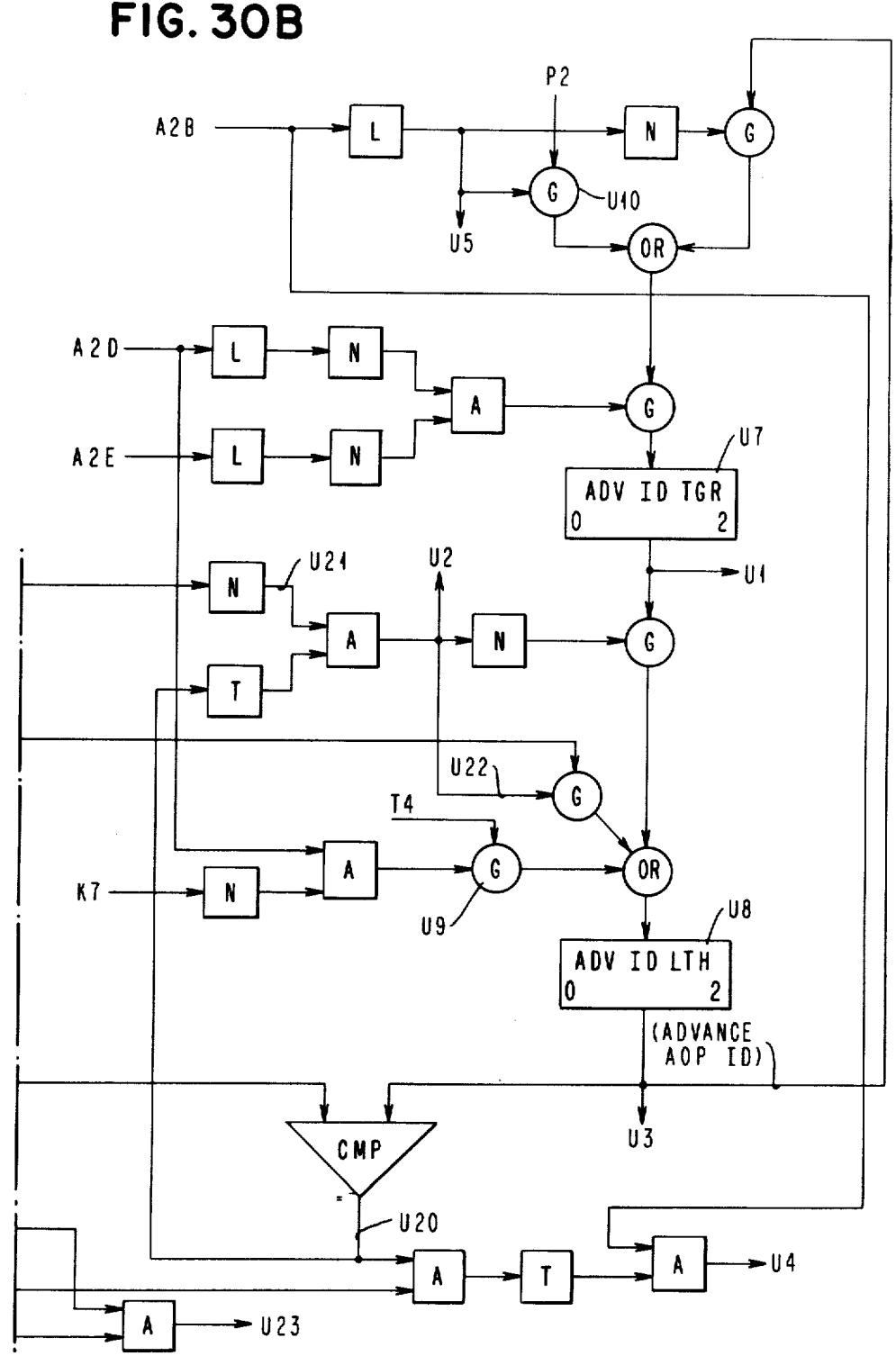

FIGS. 30A and B provide logic circuits related to the handling of delayed fetches and makes sure that the returned data is directed to the correct operand buffer. The Advance ID trigger U7 and latch U8 hold the ID of the OP buffer which is to receive the data that is being returned on a delayed fetch. During the C2 cycle of a fetch request, if a fetch delayed signal A2D is received and there is no sequencing reject K7, then the C2 ID signal T4 (which identifies the AOP using that cycle) is gated into U8, the advance ID latch via a gate U9 in FIG. 30A. This ID will normally remain in the advance ID trigger and latch until the advance signal is received from the PSCF, at which time it is gated into the refetch C1 ID trigger T27 as described previously. The advance ID latch U8 continually compares against all of the previous ID's as described earlier and returns on signal P2 the ID of the next AOP in the chain. When the PSCF advance signal is received, it gates this ID of the next AOP via gate U10 into the advance ID trigger. Then, if the PSCF sends another advance for the next higher doubleword, the ID of the AOP to which it goes will be found in the advance ID trigger U7 and latch U8 at the time that the advance is received.

If there is no next AOP in the chain, then the ID which will be returned on P2 will be zero and that will cause the advance ID trigger and latch to be reset to zero, indicating that (as far as the operand fetching logic is concerned) there is no longer any outstanding delayed fetch. The advance ID trigger U7 and latch U8 are also reset to zero if the fetch in progress signal A2E from the PSCF goes away. This covers the situation where the IPPF has more operand buffers chained together than doublewords are returned by the PSCF.

In a situation where a duplicate fetch is required, the following complication can occur. The first fetch is performed for the first doubleword in the chain and encounters a delayed fetch signal in the PSCF. Subsequently, when the PSCF returns data, it returns multiple doublewords. If nothing special were done, what would happen would be that the first doubleword would be ingated to the AOP associated with the initial fetch and the next doubleword (for the address +8) would be placed in the next AOP, and so forth. However, in this case, we said a duplicate fetch was involved. Therefore, the next AOP was attempting to fetch from the same location (not that location +8), and therefore it would be wrong to receive in response to that request the contents of the doubleword at the location +8.

To handle this situation, we have the first duplicate ID trigger U12 and latch U13 and the second duplicate ID trigger U14 and latch U15. They are used to hold respectively, the ID of the AOP which made the first request and the ID of the AOP which duplicated the request. The first duplicate ID latch U13 is set by the value of the C1 ID trigger T2 when a signal B9 indicates that the source field is present, and a signal B10 indicates that a duplicate fetch situation is present. It remains set until circuit U16 produces an output which indicates that the AOP designated by that ID has just received a reset signal. At that time, the first duplicate ID trigger and latch are reset to zero. At such time as the first duplicate ID is set to a non-zero value, but the second duplicate ID is still zero, as indicated by signals U18 and U19 respectively; it is known that the next SRC fetch which is to be performed should be a duplicate fetch. When this SRC fetch occurs as indicated by signal F8, this causes an output from AND circuit U17, which in turn causes the ID of the AOP that is being started by signal C19 to be gated into the second duplicate ID trigger. It remains there until reset by the signal produced by U16, which is the same signal that resets the first duplicate ID. If the first duplicate ID is equal to the advance ID, then we potentially have the situation described earlier, and this is recognized by compare circuit U20 producing an equal output. If that occurs, and if at the same time the second duplicate ID is not zero as indicated by signal U21, then signal U22, the AND of those two conditions, causes the second duplicate ID trigger to be gated into the advance ID latch. Thus, what has happened in this case is the following. A duplicate fetch situation existed and the first fetch was initiated by the first AOP of the duplicate pair and this caused a delayed fetch. The AOP associated with the second duplicate fetch was initiated and its ID was gated into the advance ID latch U8 in place of the first one. Then, when the PSCF provides the data, the data which was originally requested by the first AOP will in fact be considered as belonging to the second AOP, and the first operand buffer will receive all of the data it needs by the normal mechanism of ingating those bytes that were shifted off to the left into the previous AOP. Subsequent doublewords which may be returned by the PSCF will be gated into subsequent AOP's.

Figure 31C:
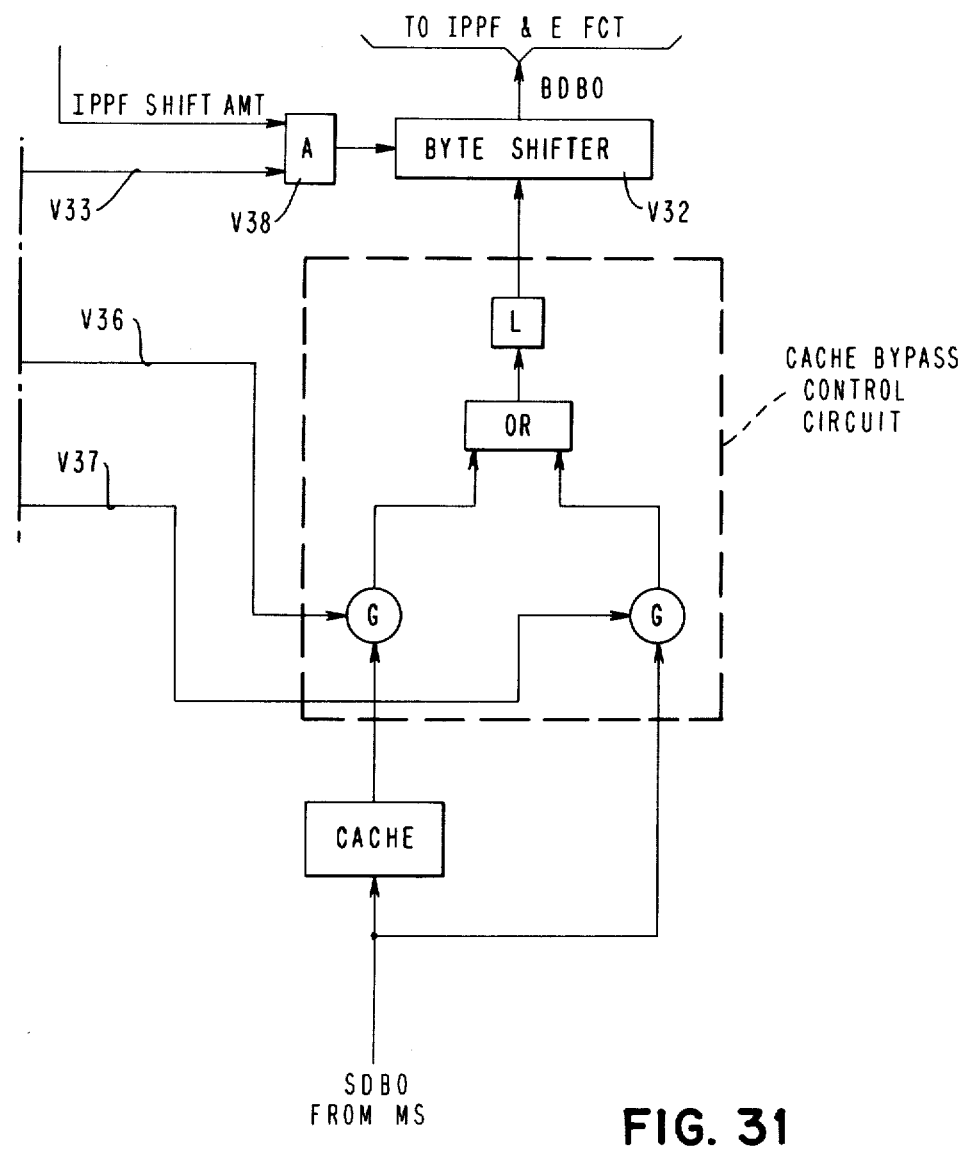
FIGS. 31A, 31B and 31C represent PSCF controls.
Figure 31:
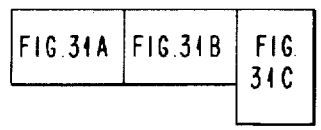
Figure 31A:
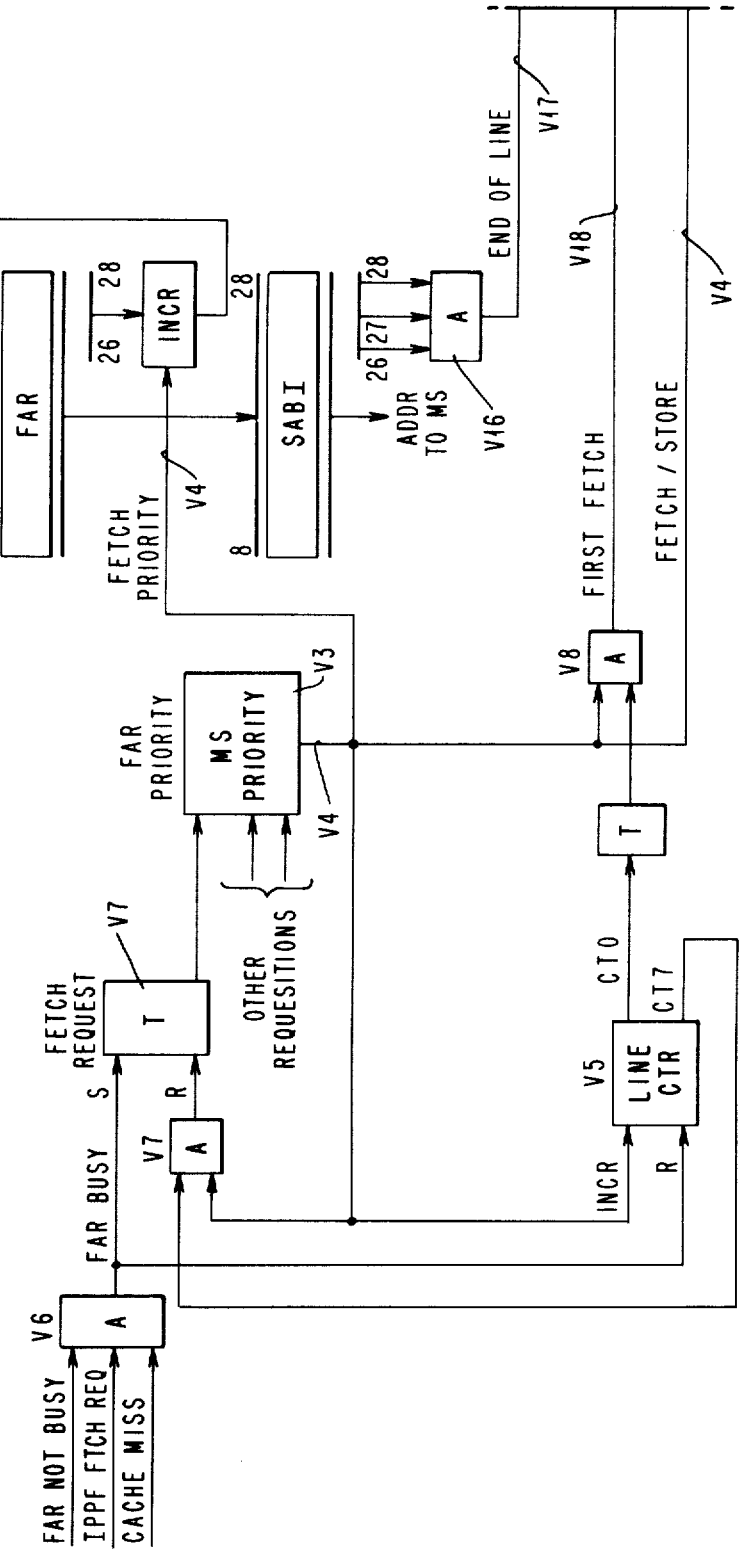
Figure 31B:
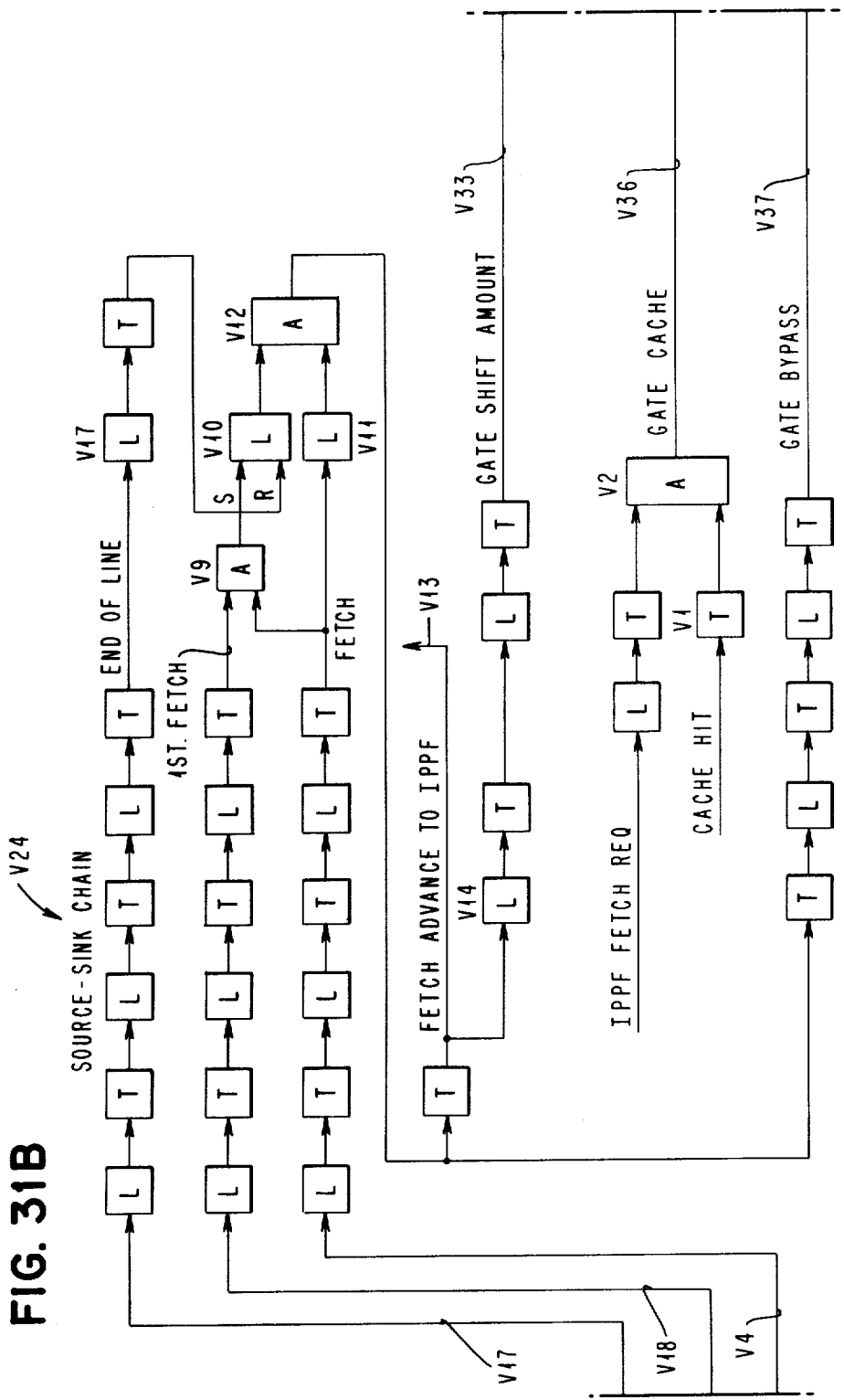

The bypass and shifter controls are shown in FIGS. 31A, B and C, which are in PSCF block A13 in FIG. 1. In FIG. 31A, fetch address register (FAR) receives a request address from PRAL in operand fetch block A9 for each doubleword (DW) to be fetched for each operand. The fetch request is made to main storage if the data is not in the cache, i.e. cache miss (or the translated address is not in a directory lookaside table (DLAT) which is not shown in the drawings). With most fetch requests, the data is in the cache and the cache hit line sets trigger V1 in FIG. 31B, which enables AND gate V2 to pass a timed fetch C1 signal caused by the cache access. The output V36 gates the data from the cache through OR circuit V28 and the BDBO latch V29 to the byte shifter V32 by the shift amount sent by the IPPF and received by AND gate 38 which is gated by a timed fetch advance signal. The output of shifter V32 is provided to the IPPF for a selected buffer OP.

If a cache miss occurs and the data is to be obtained from main storage (MS), a line of eight DW's are fetched from MS. The FAR addresses of the DW's in the line are incremented by a three bit incrementer V20, as each DW request gets an MS fetch priority signal from line V4.

Fetching is started at the requested DW causing the cache miss and proceeds to the end of the line (i.e. highest addressed DW in the line), and then goes to the DW at the beginning of the line and continues until eight DW's are fetched, which is determined by a line counter V5. As each request gets priority to select a DW from main storage, the FAR address is placed on the storage address bus in (SABI) register and sent to main storage.

The fetch priority signal results from an AND circuit V6 receiving a cache miss signal during an IPPF fetch request signal and a FAR not busy signal. AND circuit V6 then provides a FAR busy signal which sets a fetch request latch V15. The fetch request latch V15 outputs the request to an MS priority circuit V3, which determines when the fetch priority line V4 is activated, and outputs a fetch priority pulse for each DW to be fetched.

Line counter V5 is reset to count (CT) 0 by the FAR busy signal output of AND gate V6, and is incremented each time a fetch priority signal is provided on line V4. When counter V5 reaches count 7, it enables an AND circuit V7 to reset the fetch request trigger and stop any further fetch requests on line V4 until the next IPPF fetch request.

The first fetch request for the line passes through an AND circuit V8 which outputs the first fetch signal to a source-sink timing chain V24 which provides the timing needed for MS control signals to synchronize the control signals with the time delay involved in obtaining the fetched data from MS. Chain 24 provides a three cycle delay.

Also, each fetch priority signal on line V4 enters another path in the source-sink timing chain to indicate the request is for a fetch (and not for a store). It is outputted from chain V24 to an AND circuit V9 which simultaneously receives the first fetch signal from chain V24 to set a latch V10. The sequence of fetch signals then pass through a latch V11 which delays each by ½ cycle and applies it to AND circuit V12 which passes the 3½ cycle delayed fetch signal to provide the fetch advance signals V13 to the IPPF. The fetch advance signals are also provided through two more cycles of latch and trigger delays to line V33 which enables an AND circuit V38 to pass the IPPF shift amount signal to a byte shifter V32, which output the 8 byte fetched DW to the IPPF and E function circuits.

The fetch advance signals on line V13 and the DW's from byte shifter V32 end after the advance signal for the DW at the end of the line is outputted from line V13. The end of the line signal is detected by an AND gate V16 when it senses that all of bits 26, 27 and 28 are 1's in the fetch request address in SABI being provided to MS. The output of gate V16 is inputted to an end of line path in the source-sink timing chain V24. The end of line signal is outputted from chain V24 through a one cycle delay latch V17 and trigger to reset latch V10 and disable AND circuit V12 to block any further fetch advance signals and any corresponding DW's from the shifter.

A cache bypass path is provided for DW's fetched from main storage from the first request through the end of the line. Hence, the DW's fetched from MS which are provided to the cache are also provided to a cache bypass path having a gate 27. The bypass path gate 27 is enabled for DW's from the first request through the end of the line and is disabled thereafter for DW's to the end of the line. This is done by transmitting the fetch advance signals from the output of AND circuit V12 through triggers and latches causing a 2½ cycle delay to line V37 which controls the enablement of bypass gate V27.

The shifter described in the embodiment performs a left end-around shift by byte. That is, it shifts to the left by byte, and any bytes shifted off the left end are reintroduced at the right end. It was described as a left shift for clarity of understanding. It will be recognized however, that such a shifter could equally well be described as performing a right end-around shift by byte where the bytes are shifted to the right with any bytes shifted off the right end being reintroduced at the left end. If when described as a left shifter, it shifts by an amount N, then when described as a right shifter, it shifts by 8 minus N to perform the equivalent function.

While the invention has been particularly shown and described with references to preferred embodiments thereof, it will be understood by those skilled in the art that the foregoing and other changes in form and details may be made therein without departing from the spirit and scope of the invention.

I claim:

1. Alignment controls for operands in a variable field length (VFL) instruction being decoded by an instruction decoder, comprising:
   a floating set of operand address pairs (AOPs), each AOP including a subline request register and a subline buffer register, any AOP being assignable to any subline in an instruction being decoded,
   means for dynamically selecting nonassigned AOPs in the set and assigning an AOP for fetching each subline in an operand of the instruction being decoded, the operand requiring the fetching of one or more sublines from storage, the assignment of AOPs to sublines being done at the time each next subline in the operand is detected to be required,
   the subline request register in a first assigned AOP for the operand receiving an operand address for the operand from the instruction decoder, the operand address providing the first subline address of the operand,
   incrementing means for incrementing the operand address by a subline length to obtain a next subline address which is inserted into a next assigned AOP for fetching a next subline of the operand,
   means for transferring each subline address from the incrementing means to storage as a fetch request, and
   storage control means for controlling the fetching for each subline address and sending the fetched subline to the subline buffer register in the AOP containing the subline address of the fetch request.

2. Alignment controls as defined in claim 1, the storage control means further comprising:
   cache means from which a subline may be fetched with the fetch request if the requested subline is resident in the cache means, and
   main storage means from which a line may be fetched containing a requested line when a requested subline is not resident in the cache.

3. Alignment controls as defined in claim 2, the storage control means further comprising:
   bypass means around the cache means for connecting the main storage means to a selected AOP containing the subline address of a subline requested for transfer from the main storage means.

4. In an instruction handling unit for a data processing system handling VFL instructions having at least one operand, the operand contained in one or more sublines in storage, comprising:
   an instruction decoder for decoding an operand address in an instruction and the length of the operand,
   a plurality of address operand pairs (AOPs), each AOP having a subline request register and a subline buffer register, the AOPs being dynamically assignable in any available order for fetching sublines in an operand as the sublines are required by the instruction handling unit,
   means for selecting a non-busy AOP as a first AOP for the operand to receive a first subline of the operand, means for transferring the address of the operand to the first AOP, the selecting means selecting a next non-busy AOP as the next AOP for each next subline required for the operand, and incrementing means inserting into the subline address register in the next AOP a next subline address generated by incrementing a subline length to the subline address of an immediate previously selected AOP, request means for transferring the subline address in each AOP to a storage control as a fetch request to storage to fetch a subline, byte aligning means operating on each fetched subline to shift the bytes in the subline to a requested position, means for receiving shifted bytes of each fetched subline and inserting the fetched subline into the subline buffer register of the AOP containing the subline address of the fetched subline, and means for resetting each AOP to a non-busy state when the AOP transfer its subline to an execution unit, whereby as soon as an AOP is reset to non-busy state, the AOP is selectable for handling any other subline of the same or another operand.

5. In an instruction handling unit as defined in claim 4, in which an instruction being coded by the instruction decoder has a source (SRC) operand address and a destination (DST) operand address, further comprising:

each AOP selected by the selecting means for receiving a fetched subline of the SRC operand being designated as a SRC AOP, each AOP selected by the selecting means for receiving a fetched subline of the DST operand being designated as a DST AOP, and an SRC-DST priority circuit means in the selecting means for dynamically assigning the AOPs to the SRC and DST operand sublines.

6. An instruction handling unit as defined in claim 5, in which the SRC-DST priority circuit means further comprises:

means for alternating the assignment of AOPs to the SRC and DST operands, as long as either the SRC and DST operands both have unassigned sublines.

7. In an instruction handling unit as defined in claim 6, further comprising:

detecting means in the execution unit for detecting that the first SRC AOP is filled with a fetched subline from storage, that a second SRC AOP has been selected and that execution of the prior instruction has completed, signalling means in the execution unit for signalling a transfer of the fetched subline in the first SRC AOP, means for sending the fetched subline from the first SRC AOP to the execution unit, the resetting means resetting the first SRC AOP to a non-busy state, and the sending means transferring a subline in each other selected AOP to the execution unit in the sequence of AOPs assigned for each operand as the AOPs are signalled by the signalling means.

8. An instruction handling unit as defined in claim 7, further comprising:

means for recognizing completion of selection of all AOPs for a current instruction by the selecting means, means for enabling the instruction decoder to decode a next instruction requiring an operand fetch as soon as the recognizing means indicates the completion of selection of all AOP's for the current instruction, the next instruction immediately following the current instruction in an instruction stream of a data processing system, whereby the execution unit operation continues with the current instruction to overlap the instruction decoder and AOP operations with the next instruction.

9. In an instruction handling unit as defined in claim 4, further comprising:

the selecting means including an incrementing means for generating a next address, means for transferring an address in a subline address register of an immediately previously selected AOP for the same operand to the incrementing means, the incrementing means adding the length of a subline to the address to generate the next subline address within an overall length for the same operand, and means for moving the next subline address from incrementing means to the subline address register in the next selected AOP.

10. In an instruction handling unit as defined in claim 4, further comprising:

shift amount generating means for receiving fetch addresses for a source operand and a destination operand from the instruction decoder to generate a byte shift amount required to align the source operand with the destination operand, the shift amount generating means indicating the existence of any end-around shifted byte to obtain an alignment, the byte shift amount being the number of byte positions required to move a byte from a byte position addressed by the source operand to a byte position addressed by the destination operand, an end-around shift being indicated when the shift amount generating means indicates the addressed source operand byte is moved over a subline boundary, shifting means receiving the byte shift amount from the shift amount generating means and shifting the bytes in each fetched subline of the source operand by the byte shift amount, and the selecting means selecting first and second AOPs as duplicate AOPs when the shift amount generating means indicates an end-around shift, the duplicate AOPs each receiving the address of the first subline of the source operand, whereby duplicate AOPs are not selected if no end-around shift is indicated.

11. In an instruction handling unit as defined in claim 4, in which the instruction decoder decodes a source (SRC) operand address and a destination (DST) operand address in the instruction being decoded, further comprising:

shift amount generating means for generating a byte shift amount for aligning the SRC operand with the DST operand for the instruction being decoded, shifting means receiving the byte shift amount for shifting each fetched subline of the SRC operand by the byte shift amount, and means for indicating the existence of any end-around shifted byte in the SRC operand when any shifted byte in the fetched subline is end-around shifted at the subline boundary, means for determining the number of sublines in the SRC operand from the length of the operand received from the instruction decoder, a previous SRC ID storage means receiving an identifier (ID) for the first AOP selected by the selecting means if there is more than one subline indicated for the SRC operand by the determining means, an SRC counter for receiving the number of sublines indicated for the SRC operand by the determining means, the selecting means selecting a second AOP for the first fetched subline as a duplicate AOP if the shift amount generating means indicates end-around shifted bytes in the first subline of the operand, the duplicate AOP receiving the subline address in the first AOP, an incrementer for generating an address to be ingated into each next selected AOP after the duplicate AOP is selected for the source operand, means for gating an address in the previous SRC ID store means to the incrementer and incrementing the address by the length of a subline and transferring the incremented address to each next selected AOP for a next subline request.

12. In an instruction handling unit as defined in claim 11, in which the selection of AOPs further comprises:

means for inputting an ID for each last selected AOP into the previous SRC ID storage means, means for subtracting one from the SRC counter for each AOP selected for the SRC operand, means for testing the SRC counter for zero count, and means for terminating the selection of AOPs for the respective SRC operand when the SRC counter contains zero.

13. In an instruction handling unit as defined in claim 12, further comprising:

the selecting means setting a busy trigger to busy state for each selected AOP, the selecting means selecting an AOP having a busy trigger in a non-busy state as the next selected AOP, a C1 ID register for receiving the ID of the last started AOP, and a C2 ID register for receiving the content of the C1 ID register.

14. In an instruction handling unit as defined in claim 13, further comprising:

a plurality of previous ID storage means comprising previous ID registers respectively having the IDs of each of the AOPs in the plurality of AOPs selected, each previous ID register receiving the ID of the AOP selected immediately prior to the respective AOP represented by a respective ID register, means for sensing if the previous ID register for the last selected AOP contains zero indicating that this AOP is the first in the chain or is a duplicate AOP, means for testing if the shift amount for the current operand is zero.

15. In an instruction handling unit as defined in claim 14, further comprising:

means for gating a next subline received from a storage control into the subline buffer register for the last selected AOP when the previous ID register for the last selected AOP when the previous ID register for the last selected AOP is zero or the shift amount is zero for the operand, and a buffer status bit associated with each subline buffer register in each AOP, means for turning off the buffer status bit when the associated subline buffer register receives a fetched subline.

16. In an instruction handling unit as defined in claim 4, further comprising:

each previous ID register comprising a previous ID latch which is actuated for the last selected AOP containing a non-zero ID value, and the shift amount for the current operand being non-zero, means for ingating end-around bytes in the subline received from a storage control into the subline buffer register of the AOP indicated by the content of the previous ID latch of the last started AOP, means for ingating the remaining bytes in the subline received from the storage control into the subline buffer register of the AOP which requested the remaining bytes, and means for resetting the buffer status bit associated with the AOP indicated by the previous ID latch for the last selected AOP to indicate that the subline buffer register has received a subline.

17. In an instruction handling unit as defined in claim 16, for an SRC operand, further comprising:

an OP outgate latch receiving the first SRC AOP ID for the operand, means for testing the buffer status bit for that AOP for determining if the requested subline of data has been received, and means for stopping a clock for the execution unit by one cycle if the subline has not been received by the AOP and for retesting the buffer status bit at the end of cycle, means for restarting the clock in the execution unit when the buffer status bit for the next required AOP indicates that the AOP contains a subline, means for transferring the subline from the AOP to a register in the execution unit, and the resetting means resetting the buffer status bit of the AOP to non-busy state.

18. In an instruction handling unit as defined in claim 17, further comprising:

means for comparing the ID of the first source AOP with the contents of all the previous ID latches for all AOP's, means for indicating the ID of the latch having a content comparing equal to the inputted source AOP ID to determine the next AOP in an operand chain, a source ID trigger being set to the ID represented by the ID latch having the equal content to indicate the next AOP from which the execution unit will expect a subline, the execution unit indicating that it is ready for the next source operand subline, an OP buffer outgate ID register receiving the equal compared source ID, and the OP buffer indicated by the outgate ID transferring its subline to the execution unit.

19. In an instruction handling unit as defined in claim 16, in which OP branch taken circuits are provided for handling a DST operand, further comprising:

an OP outgate latch receiving the ID of each AOP started for a DST operand, the execution unit signalling the need for the next DST subline, and means for transferring the ID of the current DST AOP to the OP outgate latch and transferring the subline of the current DST AOP to the execution unit.

20. In an instruction handling unit as defined in claim 13, further comprising:
prior refetch sensing means for indicating if any AOP was selected before the last selected AOP,
a sequencing reject trigger being turned on in response to a prior selected AOP needing a refetch.

21. In a processor which executes VFL instructions that fetch operands from storage, in which the unit of storage that is addressed by the instruction is a byte, in which bytes are organized into sublines and sublines are fetched from storage for the execution of the VFL instructions, in which an operand may include a sequence of one or more sublines, comprising:
a plurality of address operand pairs (AOPs), each AOP containing a subline request register for holding the storage address of a subline and a subline buffer for receiving the addressed subline,
an instruction decoding means for decoding an instruction and providing each operand address and the length of the operand,
a shift amount determining means which examines low order bits of the operand address to specify a byte alignment in each subline of the operand, and which indicates a shift amount including the existence of left end-around byte shifting which is required to cause a desired alignment, the shift amount being applied to shifting all sublines of the same operand,
a duplicate AOP determining means actuated by the existence of left end-around byte shifting for each subline of the operand to signal a requirement for a duplicate AOP,
a count determining means which receives the operand address and operand length to determine the number of sublines in the operand,
an AOP chaining means which allows the AOPs to be formed into an ordered chain for each operand while dynamically assigning a sequence of AOPs in the chain, the chain being updated dynamically as a next AOP is selected for a next subline at the end of the chain or removed from the beginning of the chain, each chain at any one time representing a part of (but not more than) the sublines of an operand,
an AOP busy means for indicating which AOPs are busy and which AOPs are dynamically available as non-busy AOPs,
an AOP selecting means which responds to decoding of an instruction requiring operand fetching, which selects an AOP for the first subline of the operand to start a chain consisting of one AOP, and which if more than one AOP is to be assigned, successively selects the required number of AOPs, adding each AOP assigned to the end of the chain for the operand, and assigning each AOP to the next higher storage subline than its predecessor subline, except that if a duplicate AOP is required then the second AOP in the chain is also assigned to the first storage subline,
storage fetching means which fetches the subline to which each selected AOP is assigned,
shifting means which receives a fetched subline of data from the storage fetching means and performs the left end-around byte shift in the amount signalled by the shift amount determining means for the operand,
operand buffer ingating means which causes those bytes from the shifting means which were not end-around byte shifted to be ingated to their corresponding byte positions in the subline buffer associated with the AOP which requested that subline and which causes those bytes from the shifting means which were end-around shifted to be ingated to their corresponding byte positions in the subline buffer associated with the immediately preceeding AOP selected in the chain of the operand for which that subline was fetched, except that if the AOP for which that subline was fetched is the first AOP in the chain, then all of the bytes from the shifting means are ingated to their corresponding byte positions in the subline buffer of the first AOP,
execution means for receiving data available from the subline buffers to execute an instruction,
subline buffer outgating means which causes the available contents of the subline buffers of the AOPs in a chain to be transferred to the execution means one at a time, in sequence from the beginning to the end of the chain, as required by the execution means with each AOP becoming non-busy after its subline is transferred, and
execution stopping means which stops the execution means whenever it requires a subline from a subline buffer not yet been provided by the storage fetching means until such time as the subline is provided by the storage fetching means.

22. In a processor as defined in claim 21, further comprising:
one or more additional AOP selecting means which can operate simultaneously to share the same plurality of AOPs,
whereby the speed of operation of the processor is increased.

* * * * *